US012777117B2

(12) United States Patent
Lauritzen

(10) Patent No.: US 12,777,117 B2
(45) Date of Patent: Oct. 27, 2026

(54) CRASH DETECTION USER INTERFACE

(71) Applicant: Apple Inc., Cupertino, CA (US)

(72) Inventor: Christopher D. Lauritzen, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 332 days.

(21) Appl. No.: 18/241,747

(22) Filed: Sep. 1, 2023

(65) Prior Publication Data

US 2024/0080389 A1 Mar. 7, 2024

Related U.S. Application Data

(60) Provisional application No. 63/404,155, filed on Sep. 6, 2022.

(51) Int. Cl.

| | |
|---|---|
| ***H04M 3/42*** | (2006.01) |
| ***B60R 21/013*** | (2006.01) |
| ***G06F 3/04842*** | (2022.01) |
| ***H04M 11/04*** | (2006.01) |

(52) U.S. Cl.

CPC ............ *H04M 3/42* (2013.01); *B60R 21/013* (2013.01); *G06F 3/04842* (2013.01); *H04M 11/045* (2013.01); *H04M 2242/04* (2013.01)

(58) Field of Classification Search

CPC .. H04M 3/42; H04M 11/045; H04M 2242/04; B60R 21/013; G06F 3/04842

See application file for complete search history.

(56) References Cited

U.S. PATENT DOCUMENTS

| | | | |
|---|---|---|---|
| 5,146,231 | A | 9/1992 | Ghaem et al. |
| 5,303,286 | A | 4/1994 | Wiedeman |
| 5,446,465 | A | 8/1995 | Diefes et al. |
| 5,583,514 | A | 12/1996 | Fulop |
| 5,587,717 | A | 12/1996 | Jang |
| 5,812,932 | A | 9/1998 | Wiedeman et al. |
| 5,863,057 | A | 1/1999 | Wessels |
| 5,937,349 | A | 8/1999 | Andresen |
| 5,995,041 | A | 11/1999 | Bradley et al. |
| 6,006,068 | A | 12/1999 | Elkin et al. |
| 6,052,587 | A | 4/2000 | Moraes et al. |
| 6,108,538 | A | 8/2000 | Blasiak et al. |
| 6,147,644 | A | 11/2000 | Castles et al. |
| 6,157,896 | A | 12/2000 | Castles et al. |
| 6,169,881 | B1 | 1/2001 | Astrom et al. |
| 6,208,858 | B1 | 3/2001 | Antonio et al. |
| 6,240,366 | B1 | 5/2001 | Nagatsuma et al. |
| 6,263,280 | B1 | 7/2001 | Stingone, Jr. |

(Continued)

FOREIGN PATENT DOCUMENTS

| | | | |
|---|---|---|---|
| CN | 101938287 | A | 1/2011 |
| CN | 102215295 | A | 10/2011 |

(Continued)

OTHER PUBLICATIONS

Final Office Action received for U.S. Appl. No. 18/622,524, mailed on Oct. 7, 2025, 13 pages.

(Continued)

*Primary Examiner* — Andrae S Allison

(74) *Attorney, Agent, or Firm* — YHE Law LLP

(57) ABSTRACT

The present disclosure generally relates to techniques and user interfaces for initiating communication in the event of a crash.

48 Claims, 31 Drawing Sheets

(56) References Cited

U.S. PATENT DOCUMENTS 6,272,316 B1 8/2001 Wiedeman et al.
6,278,861 B1 8/2001 Ward et al.
6,317,689 B1 11/2001 Lee
6,397,054 B1 5/2002 Hoirup et al.
6,549,848 B1 4/2003 Green et al.
6,580,452 B1 6/2003 Gangitano
6,690,934 B1 2/2004 Conrad et al.
6,763,226 B1 7/2004 Mczeal, Jr.
6,992,991 B2 1/2006 Duske et al.
7,184,744 B1 2/2007 Schnabel
7,233,795 B1 6/2007 Ryden
7,738,912 B1 6/2010 Hawkins et al.
7,890,134 B2 2/2011 Richardson et al.
8,249,585 B2 8/2012 Tronc et al.
8,254,970 B1 8/2012 Oshinsky et al.
8,521,122 B2 8/2013 Scott et al.
8,554,170 B2 10/2013 Franz et al.
8,676,121 B1 3/2014 Monte et al.
8,688,450 B2 4/2014 Lloyd et al.
8,855,012 B1 10/2014 Suri
8,890,685 B1 11/2014 Sookman et al.
9,037,164 B2 5/2015 Keerthi
9,235,923 B1 1/2016 Robinson et al.
9,369,832 B1 6/2016 Noble et al.
9,418,537 B2 8/2016 Cahill
9,503,177 B1 11/2016 Shi et al.
9,521,378 B1 12/2016 Palaganas et al.
9,769,639 B2 9/2017 Cole et al.
10,116,893 B1 10/2018 Reis et al.
10,459,504 B2 10/2019 Veloso et al.
10,560,562 B1 2/2020 Tandon
10,608,978 B2 3/2020 Koum et al.
10,645,561 B1 5/2020 Guo et al.
10,791,536 B1 9/2020 Murphy
10,797,785 B1 10/2020 Rhee
10,853,410 B2 12/2020 Herz
10,959,074 B1 3/2021 Shuman et al.
10,999,158 B2 5/2021 Kramar et al.
11,003,315 B2 5/2021 Sung et al.
11,349,559 B1 5/2022 Reuss et al.
11,735,037 B2 * 8/2023 Matus .................. G06V 20/584
701/117
11,938,880 B2 * 3/2024 Jones ...................... B60R 21/01
2001/0043011 A1 * 11/2001 Ugusa ................. B60R 21/0133
307/121
2002/0000931 A1 1/2002 Petronic et al.
2002/0006117 A1 1/2002 Duske et al.
2002/0131330 A1 9/2002 Zion et al.
2003/0054814 A1 3/2003 Karabinis et al.
2003/0083816 A1 5/2003 Imakado et al.
2004/0166811 A1 8/2004 Moon
2004/0183281 A1 * 9/2004 Stopczynski ......... B60R 21/013
280/730.1
2004/0257275 A1 12/2004 Yee et al.
2005/0085215 A1 4/2005 Kokko et al.
2006/0017612 A1 1/2006 Nagatani
2006/0030334 A1 2/2006 Hashimoto
2006/0095563 A1 5/2006 Benjamin et al.
2006/0247915 A1 11/2006 Bradford et al.
2006/0258365 A1 11/2006 Cha et al.
2007/0109186 A1 5/2007 Fujiwara et al.
2007/0123252 A1 5/2007 Tronc et al.
2007/0130606 A1 6/2007 Jeong
2007/0142028 A1 6/2007 Ayoub et al.
2007/0188380 A1 8/2007 Duong et al.
2007/0216572 A1 9/2007 Schnabel
2008/0076410 A1 3/2008 Beyer
2008/0166011 A1 7/2008 Sever et al.
2008/0168290 A1 7/2008 Jobs et al.
2008/0186135 A1 8/2008 Boling et al.
2008/0303715 A1 12/2008 Wang et al.
2008/0313686 A1 12/2008 Matvey
2009/0049905 A1 2/2009 Lawhite et al.
2009/0135062 A1 5/2009 Hori
2009/0191854 A1 7/2009 Beason
2009/0191893 A1 7/2009 Smith
2009/0205041 A1 8/2009 Michalske
2009/0241072 A1 9/2009 Chaudhri et al.
2009/0262033 A1 10/2009 King et al.
2009/0267828 A1 10/2009 Kobayashi et al.
2009/0279674 A1 11/2009 Roberts
2010/0083159 A1 4/2010 Mountain et al.
2010/0085255 A1 4/2010 Wakabayashi
2010/0113020 A1 5/2010 Subramanian et al.
2010/0162169 A1 6/2010 Skarp
2010/0167672 A1 7/2010 Ahn et al.
2010/0257490 A1 10/2010 Lyon et al.
2010/0271312 A1 10/2010 Alameh et al.
2010/0311385 A1 12/2010 Hurwitz
2011/0088003 A1 4/2011 Swink et al.
2011/0092158 A1 4/2011 Plamondon
2011/0136428 A1 6/2011 Ritter
2011/0228721 A1 9/2011 Shinohara et al.
2011/0230161 A1 9/2011 Newman
2011/0248948 A1 10/2011 Griffin et al.
2011/0291974 A1 12/2011 Son et al.
2011/0306292 A1 12/2011 Wilson et al.
2012/0015622 A1 1/2012 Kuz et al.
2012/0068899 A1 3/2012 Ayotte et al.
2012/0135715 A1 5/2012 Kang et al.
2012/0140767 A1 6/2012 Brothers et al.
2012/0237002 A1 9/2012 Sennett et al.
2012/0239822 A1 9/2012 Poulson et al.
2012/0302200 A1 11/2012 Esbensen
2013/0045708 A1 2/2013 Nguyen et al.
2013/0088455 A1 4/2013 Jeong
2013/0127665 A1 5/2013 Miller et al.
2013/0135146 A1 5/2013 Ransom et al.
2013/0183924 A1 7/2013 Saigh et al.
2013/0197951 A1 8/2013 Watson et al.
2013/0205350 A1 8/2013 Ling et al.
2013/0225118 A1 8/2013 Jang et al.
2013/0231077 A1 9/2013 Cahill
2013/0271319 A1 10/2013 Trerise
2013/0271320 A1 10/2013 Trerise
2013/0295872 A1 11/2013 Guday et al.
2013/0301521 A1 11/2013 Abdi
2013/0326642 A1 12/2013 Haj et al.
2013/0332026 A1 * 12/2013 McKown ............. G08B 25/001
701/33.7
2014/0022192 A1 1/2014 Hatanaka
2014/0024333 A1 * 1/2014 Stadtlander ....... H04M 1/72457
455/404.1
2014/0028601 A1 1/2014 Moore et al.
2014/0071060 A1 3/2014 Santos-Gomez
2014/0134969 A1 5/2014 Jin et al.
2014/0177396 A1 6/2014 Lee et al.
2014/0213214 A1 7/2014 Reis
2014/0237393 A1 8/2014 Van Wie et al.
2014/0245783 A1 9/2014 Proud et al.
2014/0283142 A1 9/2014 Shepherd et al.
2014/0327629 A1 11/2014 Jobs et al.
2014/0370841 A1 12/2014 Roberts et al.
2015/0011220 A1 1/2015 Buckle et al.
2015/0018040 A1 1/2015 He et al.
2015/0052618 A1 2/2015 Michalske
2015/0063428 A1 3/2015 Lever
2015/0065077 A1 3/2015 Kim et al.
2015/0079923 A1 * 3/2015 McNeil ................. H04W 4/027
455/404.2
2015/0097687 A1 4/2015 Sloo et al.
2015/0137972 A1 5/2015 Nepo
2015/0187146 A1 * 7/2015 Chen ........................ G07C 5/02
701/31.5
2015/0208220 A1 7/2015 Hulan
2015/0257126 A1 9/2015 Herz
2015/0271317 A1 9/2015 Nelson et al.
2015/0319284 A1 11/2015 Leonessi
2015/0338524 A1 11/2015 Ben Moshe et al.
2015/0350296 A1 12/2015 Yang et al.
2015/0358790 A1 12/2015 Nasserbakht
2016/0056525 A1 2/2016 Hansryd et al.
2016/0057595 A1 2/2016 Ahmed et al.
2016/0065669 A1 3/2016 Van Dijkman et al.

(56) References Cited

U.S. PATENT DOCUMENTS

| | | | | |
|---|---|---|---|---|
| 2016/0088455 | A1 | 3/2016 | Bozik et al. | |
| 2016/0183098 | A1 | 6/2016 | Lim | |
| 2016/0192163 | A1 | 6/2016 | Miner et al. | |
| 2016/0227023 | A1 | 8/2016 | Maly et al. | |
| 2016/0277903 | A1 | 9/2016 | Poosala et al. | |
| 2016/0302083 | A1 | 10/2016 | Durick et al. | |
| 2016/0306051 | A1 | 10/2016 | Hirabayashi et al. | |
| 2016/0373910 | A1* | 12/2016 | Moss | G06F 9/453 |
| 2016/0374047 | A1 | 12/2016 | Reis | |
| 2017/0006620 | A1 | 1/2017 | Reis | |
| 2017/0021260 | A1 | 1/2017 | Willett et al. | |
| 2017/0026110 | A1 | 1/2017 | Richardson et al. | |
| 2017/0045623 | A1 | 2/2017 | Zlogar et al. | |
| 2017/0053461 | A1 | 2/2017 | Pal et al. | |
| 2017/0069191 | A1 | 3/2017 | Erkkila | |
| 2017/0085600 | A1 | 3/2017 | Carter et al. | |
| 2017/0150060 | A1 | 5/2017 | Herz | |
| 2017/0171636 | A1 | 6/2017 | Devlin et al. | |
| 2017/0180964 | A1 | 6/2017 | Mehta et al. | |
| 2017/0232963 | A1* | 8/2017 | Pal | H04W 4/027 280/801.1 |
| 2017/0330436 | A1 | 11/2017 | Williams et al. | |
| 2017/0357411 | A1 | 12/2017 | Williams et al. | |
| 2018/0032234 | A1 | 2/2018 | Michalske | |
| 2018/0040951 | A1 | 2/2018 | Uchiyama | |
| 2018/0088242 | A1 | 3/2018 | Eagling | |
| 2018/0092057 | A1 | 3/2018 | Yamashita et al. | |
| 2018/0176362 | A1 | 6/2018 | Cohen | |
| 2018/0192264 | A1 | 7/2018 | Kwok et al. | |
| 2018/0270000 | A1 | 9/2018 | Reis et al. | |
| 2018/0310159 | A1* | 10/2018 | Katz | H04W 4/90 |
| 2018/0316416 | A1 | 11/2018 | Reis et al. | |
| 2018/0316885 | A1 | 11/2018 | Reis et al. | |
| 2018/0338237 | A1 | 11/2018 | Maheswaranathan | |
| 2018/0338334 | A1 | 11/2018 | Jin et al. | |
| 2019/0020992 | A1 | 1/2019 | Romano | |
| 2019/0049592 | A1 | 2/2019 | Koontz et al. | |
| 2019/0190591 | A1 | 6/2019 | Wang et al. | |
| 2019/0200684 | A1* | 7/2019 | Ballstaedt | A42B 3/30 |
| 2019/0208394 | A1* | 7/2019 | Onissah | H04M 1/72412 |
| 2019/0279447 | A1* | 9/2019 | Ricci | G06Q 10/00 |
| 2019/0280788 | A1 | 9/2019 | Hardy et al. | |
| 2019/0387092 | A1 | 12/2019 | Tessier | |
| 2020/0025944 | A1 | 1/2020 | Mellier et al. | |
| 2020/0053641 | A1 | 2/2020 | Lee et al. | |
| 2020/0117900 | A1 | 4/2020 | Deng et al. | |
| 2020/0119984 | A1 | 4/2020 | Bouvet et al. | |
| 2020/0132644 | A1 | 4/2020 | Micalizzi et al. | |
| 2020/0135005 | A1* | 4/2020 | Katz | H04M 7/0021 |
| 2020/0187295 | A1 | 6/2020 | Li et al. | |
| 2020/0196209 | A1 | 6/2020 | Cui et al. | |
| 2020/0244673 | A1 | 7/2020 | Stockdale et al. | |
| 2020/0252780 | A1 | 8/2020 | Mcclendon et al. | |
| 2020/0304444 | A1 | 9/2020 | Aneja et al. | |
| 2020/0367069 | A1 | 11/2020 | Struhsaker et al. | |
| 2020/0383153 | A1 | 12/2020 | Agarwal et al. | |
| 2021/0006287 | A1 | 1/2021 | Peeters et al. | |
| 2021/0011173 | A1 | 1/2021 | Rhee | |
| 2021/0051444 | A1 | 2/2021 | Ryu et al. | |
| 2021/0058149 | A1 | 2/2021 | Nuttall et al. | |
| 2021/0110682 | A1 | 4/2021 | Howard et al. | |
| 2021/0120394 | A1 | 4/2021 | Martin et al. | |
| 2021/0144539 | A1 | 5/2021 | Edge et al. | |
| 2021/0168581 | A1 | 6/2021 | Van Den Dungen | |
| 2021/0175963 | A1 | 6/2021 | Chang et al. | |
| 2021/0243072 | A1 | 8/2021 | Peterson et al. | |
| 2021/0311203 | A1 | 10/2021 | Reis et al. | |
| 2021/0311613 | A1 | 10/2021 | Williams et al. | |
| 2022/0066048 | A1 | 3/2022 | Diggelen et al. | |
| 2022/0091737 | A1 | 3/2022 | Bower et al. | |
| 2022/0108595 | A1 | 4/2022 | Jiang et al. | |
| 2022/0116105 | A1 | 4/2022 | Robinson et al. | |
| 2022/0256631 | A1 | 8/2022 | Jain et al. | |
| 2022/0359064 | A1 | 11/2022 | Pierson et al. | |
| 2023/0063173 | A1 | 3/2023 | Caro et al. | |
| 2023/0065219 | A1 | 3/2023 | Caro et al. | |
| 2023/0066232 | A1 | 3/2023 | Caro et al. | |
| 2023/0081032 | A1 | 3/2023 | Ardaud et al. | |
| 2023/0308538 | A1 | 9/2023 | Caro et al. | |
| 2023/0328171 | A1 | 10/2023 | Caro et al. | |
| 2024/0071197 | A1* | 2/2024 | Bongberg | A61B 5/7282 |
| 2024/0074701 | A1* | 3/2024 | Hite | A61B 5/6805 |
| 2024/0241627 | A1 | 7/2024 | Williams et al. | |
| 2024/0406700 | A1 | 12/2024 | Paul et al. | |
| 2025/0085827 | A1 | 3/2025 | Caro et al. | |
| 2025/0159074 | A1 | 5/2025 | Caro et al. | |

FOREIGN PATENT DOCUMENTS

| | | | |
|---|---|---|---|
| CN | 102752448 | A | 10/2012 |
| CN | 102905244 | A | 1/2013 |
| CN | 101938287 | B | 6/2013 |
| CN | 103297610 | A | 9/2013 |
| CN | 104168367 | A | 11/2014 |
| CN | 105554225 | A | 5/2016 |
| CN | 108718447 | A | 10/2018 |
| EP | 0963061 | A2 | 12/1999 |
| EP | 2981000 | A1 | 2/2016 |
| EP | 3248180 | A1 | 11/2017 |
| EP | 3676972 | B1 | 2/2022 |
| JP | 9-172401 | A | 6/1997 |
| JP | 10-191423 | A | 7/1998 |
| JP | 2000-40990 | A | 2/2000 |
| JP | 2001-320449 | A | 11/2001 |
| JP | 2002-197577 | A | 7/2002 |
| JP | 2003-75525 | A | 3/2003 |
| JP | 2004-96265 | A | 3/2004 |
| JP | 2004-328289 | A | 11/2004 |
| JP | 4465365 | B2 | 5/2010 |
| JP | 4501833 | B2 | 7/2010 |
| JP | 2013-140164 | A | 7/2013 |
| JP | 2013-239979 | A | 11/2013 |
| JP | 2016-15624 | A | 1/2016 |
| JP | 2018-532298 | A | 11/2018 |
| JP | 2019-505117 | A | 2/2019 |
| JP | 2021-40276 | A | 3/2021 |
| JP | 6853820 | B2 | 3/2021 |
| KR | 10-2514692 | B1 | 3/2023 |
| WO | 2010/064716 | A1 | 6/2010 |
| WO | 2014/200731 | A1 | 12/2014 |
| WO | 2015/062237 | A1 | 5/2015 |
| WO | 2015/192277 | A1 | 12/2015 |
| WO | 2016/116814 | A1 | 7/2016 |
| WO | 2019/118020 | A1 | 6/2019 |
| WO | 2023/034323 | A1 | 3/2023 |

OTHER PUBLICATIONS

Letter Restarting Period for Response received for U.S. Appl. No. 18/201,411, mailed on Sep. 23, 2025, 24 pages.

Applicant-Initiated Interview Summary received for U.S. Appl. No. 17/899,510, mailed on Jan. 4, 2024, 2 pages.

Applicant-Initiated Interview Summary received for U.S. Appl. No. 17/899,510, mailed on Jun. 5, 2024, 2 pages.

Applicant-Initiated Interview Summary received for U.S. Appl. No. 17/899,510, mailed on Nov. 22, 2023, 2 pages.

Corrected Notice of Allowance received for U.S. Appl. No. 17/899,530, mailed on Nov. 8, 2023, 3 pages.

Decision to Grant received for European Patent Application No. 22197456.1, mailed on Aug. 29, 2024, 3 pages.

Final Office Action received for U.S. Appl. No. 17/899,510, mailed on Nov. 30, 2023, 21 pages.

Intention to Grant received for European Patent Application No. 17810730.6, mailed on Jun. 11, 2024, 9 pages.

Intention to Grant received for European Patent Application No. 22197456.1, mailed on Apr. 16, 2024, 9 pages.

International Preliminary Report on Patentability received for PCT Patent Application No. PCT/US2022/042069, mailed on Mar. 14, 2024, 15 pages.

International Preliminary Report on Patentability received for PCT Patent Application No. PCT/US2022/043183, mailed on Mar. 28, 2024, 12 pages.

(56) References Cited

OTHER PUBLICATIONS

International Search Report and Written Opinion received for PCT Patent Application No. PCT/US2023/032051, mailed on Mar. 4, 2024, 19 pages.
Invitation to Pay Additional Fees and Partial International Search Report received for PCT Patent Application No. PCT/US2023/032051, mailed on Jan. 8, 2024, 10 pages.
Non-Final Office Action received for U.S. Appl. No. 17/899,510, mailed on Mar. 27, 2024, 22 pages.
Non-Final Office Action received for U.S. Appl. No. 17/899,510, mailed on Oct. 26, 2023, 18 pages.
Notice of Acceptance received for Australian Patent Application No. 2022235630, mailed on Sep. 28, 2023, 3 pages.
Notice of Allowance received for Japanese Patent Application No. 2022-557929, mailed on Aug. 5, 2024, 5 pages (1 page of English Translation and 4 pages of Official Copy).
Notice of Allowance received for U.S. Appl. No. 17/349,191, mailed on Nov. 29, 2023, 8 pages.
Notice of Allowance received for U.S. Appl. No. 17/899,510, mailed-on Sep. 11, 2024, 20 pages.
Notice of Allowance received for U.S. Appl. No. 17/899,530, mailed on Oct. 19, 2023, 13 pages.
Office Action received for Japanese Patent Application No. 2022-557929, mailed on Mar. 29, 2024, 8 pages (4 pages of English Translation and 4 pages of Official Copy).
Office Action received for Japanese Patent Application No. 2023-001269, mailed on Mar. 22, 2024, 14 pages (7 pages of English Translation and 7 pages of Official Copy).
Office Action received for Japanese Patent Application No. 2023-001270, mailed on Mar. 22, 2024, 10 pages (5 pages of English Translation and 5 pages of Official Copy).
Result of Consultation received for European Patent Application No. 17810730.6, mailed on May 2, 2024, 4 pages.
Notice of Allowance received for Japanese Patent Application No. 2023-001270, mailed on Sep. 30, 2024, 4 pages (1 page of English Translation and 3 pages of Official Copy).
Corrected Notice of Allowance received for U.S. Appl. No. 17/899,510, mailed on Oct. 21, 2024, 16 pages.
Decision to Grant received for European Patent Application No. 17810730.6, mailed on Oct. 17, 2024, 2 pages.
Extended European Search Report received for European Patent Application No. 24204114.3, mailed on Dec. 23, 2024, 10 pages.
Extended European Search Report received for European Patent Application No. 24204790.0, mailed on Jan. 13, 2025, 9 pages.
Non-Final Office Action received for U.S. Appl. No. 17/941,400, mailed on Apr. 9, 2025, 17 pages.
Corrected Notice of Allowance received for U.S. Appl. No. 17/899,510, mailed on Oct. 1, 2024, 3 pages.
Office Action received for Australian Patent Application No. 2023270278, mailed on Sep. 17, 2024, 3 pages.
Ofice Action received for Japanese Patent Application No. 2023-001269, mailed on Sep. 20, 2024, 9 pages (4 pages of English Translation and 5 pages of Official Copy).
Notice of Allowance received for Japanese Patent Application No. 2023-001269, mailed on Feb. 25, 2025, 5 pages (1 page of English Translation and 4 pages of Official Copy).
Office Action received for Japanese Patent Application No. 2024-515962, mailed on Mar. 3, 2025, 6 pages (3 pages of English Translation and 3 pages of Official Copy).
Notice of Acceptance received for Australian Patent Application No. 2023270278, mailed on Oct. 30, 2024, 3 pages.
Applicant-Initiated Interview Summary received for U.S. Appl. No. 17/941,400, mailed on Apr. 28, 2025, 2 pages.
Board Opinion received for Chinese Patent Application No. 201780033617.5, mailed on Apr. 17, 2025, 16 pages (9 pages of English Translation and 7 pages of Official Copy).
Notice of Allowance received for Japanese Patent Application No. 2024-515962, mailed on Apr. 18, 2025, 4 pages (1 page of English Translation and 3 pages of Official Copy).
Intention to Grant received for European Patent Application No. 22785843.8, mailed on Mar. 19, 2025, 8 pages.
International Preliminary Report on Patentability received for PCT Patent Application No. PCT/US2023/032051, mailed on Mar. 20, 2025, 13 pages.
Non-Final Office Action received for U.S. Appl. No. 18/622,524, mailed on Mar. 18, 2025, 18 pages.
Notice of Allowance received for U.S. Appl. No. 17/898,342, mailed on Mar. 28, 2025, 10 pages.
Applicant-Initiated Interview Summary received for U.S. Appl. No. 18/201,411, mailed on Aug. 21, 2025, 5 pages.
Corrected Notice of Allowance received for U.S. Appl. No. 17/898,342, mailed on Aug. 8, 2025, 3 pages.
Corrected Notice of Allowance received for U.S. Appl. No. 17/941,400, mailed on Aug. 26, 2025, 2 pages.
Non-Final Office Action received for U.S. Appl. No. 18/201,411, mailed on Aug. 11, 2025, 18 pages.
Notice of Allowance received for U.S. Appl. No. 17/941,400, mailed on Aug. 18, 2025, 9 pages,.
Final Office Action received for U.S. Appl. No. 17/941,400, mailed on Jul. 17, 2025, 8 pages.
Intention to Grant received for European Patent Application No. 22197430.6, mailed on Jul. 22, 2025, 12 pages.
Intention to Grant received for European Patent Application No. 22785843.8, mailed on Jul. 10, 2025, 8 pages.
Notice of Allowance received for U.S. Appl. No. 17/898,342, mailed on Jul. 29, 2025, 9 pages.
Corrected Notice of Allowance received for U.S. Appl. No. 17/899,510, mailed on Dec. 10, 2024, 3 pages.
Non-Final Office Action received for U.S. Appl. No. 17/898,342, mailed on Dec. 12, 2024, 12 pages.
Office Action received for European Patent Application No. 22197430.6, mailed on Dec. 3, 2024, 8 pages.
International Search Report and Written Opinion received for PCT Patent Application No. PCT/US2024/032052, mailed on Oct. 8, 2024, 11 pages.
Office Action received for European Patent Application No. 22769872.7, mailed on Nov. 15, 2024, 11 pages.
Final Office Action received for U.S. Appl. No. 18/201,411, mailed on Sep. 17, 2025, 24 pages.
Office Action received for Japanese Patent Application No. 2024-186863, mailed on Sep. 1, 2025, 8 pages (4 pages of English Translation and 4 pages of Official Copy).
Applicant-Initiated Interview Summary received for U.S. Appl. No. 18/622,524. mailed on Jun. 5, 2025, 4 pages.
Board Decision received for Chinese Patent Application No. 201780033617.5, mailed on May 30, 2025, 17 pages (1 page of English Translation and 16 pages of Official Copy).
Notice of Allowance received for Japanese Patent Application No. 2025-048996, mailed on Jun. 23, 2025, 5 pages (1 page of English Translation and 4 pages of Official Copy).
Applicant Initiated Interview Summary received for U.S. Appl. No. 17/899,510, mailed on Apr. 27, 2023, 2 pages.
Applicant-Initiated Interview Summary received for U.S. Appl. No. 17/349,191, mailed on Aug. 1, 2023, 5 pages.
Applicant-Initiated Interview Summary received for U.S. Appl. No. 17/349,191, mailed on Feb. 15, 2023, 3 pages.
Applicant-Initiated Interview Summary received for U.S. Appl. No. 17/349,191, mailed on Feb. 21, 2023, 3 pages.
Applicant-Initiated Interview Summary received for U.S. Appl. No. 17/899,315, mailed on Jan. 24, 2023, 3 pages.
Applicant-Initiated Interview Summary received for U.S. Appl. No. 17/899,510, mailed on Aug. 2, 2023, 2 pages.
Applicant-Initiated Interview Summary received for U.S. Appl. No. 17/899,530, mailed on Apr. 3, 2023, 5 pages.
Applicant-Initiated Interview Summary received for U.S. Appl. No. 17/899,530, mailed on Feb. 3, 2023, 6 pages.
Applicant-Initiated Interview Summary received for U.S. Appl. No. 17/899,530, mailed on Jul. 3, 2023, 6 pages.
Certificate of Examination received for Australian Patent Application No. 2019101260, mailed on Mar. 25, 2020, 2 pages.

(56) References Cited

OTHER PUBLICATIONS

Chand et al., "A mobile application for Women's Safety: WoSApp", TENCON 2015-2015 IEEE Region 10 Conference doi:10.1109/TENCON.2015.7373171., Nov. 1-4, 2015, 5 pages.
Clark Mitchell, "Qualcomm's going toe-to-toe with Apple's satellite messaging feature". Available online at: https://www.theverge.com/2023/1/5/23538207/qualcomm-satellite-messaging-snapdragon-android, Jan. 6, 2023, 18 pages.
Decision on Appeal received for U.S. Appl. No. 15/424,186, mailed on May 7, 2021, 12 pages.
Examiner's Answer to Appeal Brief received for U.S. Appl. No. 15/424,186, mailed on Oct. 7, 2020, 8 pages.
Extended European Search Report received for European Patent Application No. 17810730.6, mailed on Nov. 29, 2019, 12 pages.
Extended European Search Report received for European Patent Application No. 22197430.6, mailed on Jan. 26, 2023, 8 pages.
Extended European Search Report received for European Patent Application No. 22197456.1, mailed on Feb. 2, 2023, 9 pages.
Exultationpictures, "Align Satellite Dish on Astra 19.2 with the App Satellite Finder (Pro) and DUR Line SF4000", Online available at: https://www.youtube.com/watch?v=n5EEZ6rcYcQ, Mar. 29, 2021, 2 pages.
Faiz et al., "Smart vehicle accident detection and alarming system using a smartphone", 2015 International Conference on Computer and Information Engineering (ICCIE), Doi: 10.1109/CCIE.2015.7399319., Nov. 26-27, 2015, pp. 66-69.
Fernandes et al., "Mobile Application for Automatic Accident Detection and Multimodal Alert", 2015 IEEE 81st Vehicular Technology Conference (VTC Spring), Doi: 10.1109NTCSpring.2015.7145935., May 11-14, 2015, 5 pages.
Final Office Action received for U.S. Appl. No. 15/424,186, mailed on Aug. 9, 2019, 18 pages.
Final Office Action received for U.S. Appl. No. 17/349,191, mailed on Jun. 28, 2023, 15 pages.
Final Office Action received for U.S. Appl. No. 17/899,510, mailed on Jun. 2, 2023, 15 pages.
Final Office Action received for U.S. Appl. No. 17/899,530, mailed on Mar. 8, 2023, 68 pages.
Inso et al., "Play it safe a personal security application on Android platform", 2016 Fifth ICT International Student Project Conference (ICT-ISPC), Doi: 10.1109/ICTISPC.2016.7519254., May 27-28, 2016, 4 pages.
International Preliminary Report on Patentability received for PCT Patent Application No. PCT/US2017/035155, mailed on Dec. 20, 2018, 15 pages.
International Search Report and Written Opinion received for PCT Patent Application No. PCT/US2017/035155, mailed on Oct. 2, 2017, 19 pages.
International Search Report and Written Opinion received for PCT Patent Application No. PCT/US2022/042069, mailed on Feb. 14, 2023, 22 pages.
International Search Report and Written Opinion received for PCT Patent Application No. PCT/US2022/043183, mailed on Jan. 23, 2023, 17 pages.
Invitation To Pay Additional Fees and Partial International Search Report received for PCT Patent Application No. PCT/US2022/042069, mailed on Dec. 22, 2022, 14 pages.
Invitation to Pay Additional Fees received for PCT Patent Application No. PCT/US2017/035155, mailed on Aug. 3, 2017, 2 pages.
Invitation To Pay Additional Fees received for PCT Patent Application No. PCT/US2022/043183, mailed on Nov. 30, 2022, 10 pages.
Non-Final Office Action received for U.S. Appl. No. 15/424,186, mailed on Jan. 11, 2019, 15 pages.
Non-Final Office Action received for U.S. Appl. No. 17/349,191, mailed on Dec. 21, 2022, 13 pages.
Non-Final Office Action received for U.S. Appl. No. 17/899,315, mailed on Dec. 22, 2022, 20 pages.
Non-Final Office Action received for U.S. Appl. No. 17/899,315, mailed on Nov. 4, 2022, 20 pages.
Non-Final Office Action received for U.S. Appl. No. 17/899,510, mailed on Mar. 16, 2023, 16 pages.
Non-Final Office Action received for U.S. Appl. No. 17/899,530, mailed on Jan. 3, 2023, 67 pages.
Non-Final Office Action received for U.S. Appl. No. 17/899,530, mailed on May 25, 2023, 68 pages.
Notice of Acceptance received for Australian Patent Application No. 2019250182, mailed on Mar. 11, 2021, 3 pages.
Notice of Acceptance received for Australian Patent Application No. 2023204622, mailed on Aug. 10, 2023, 3 pages.
Notice of Allowance received for U.S. Appl. No. 17/899,315, mailed on Feb. 24, 2023, 9 pages.
Office Action received for Australian Patent Application No. 2017277838, mailed on Aug. 20, 2019, 3 pages.
Office Action received for Australian Patent Application No. 2017277838, mailed on Jun. 5, 2019, 3 pages.
Office Action received for Australian Patent Application No. 2019101260, mailed on Dec. 16, 2019, 3 pages.
Office Action received for Australian Patent Application No. 2019250182, mailed on Aug. 18, 2020, 4 pages.
Office Action received for Australian Patent Application No. 2019250182, mailed on Dec. 2, 2020, 5 pages.
Office Action received for Australian Patent Application No. 2022235630, mailed on Jul. 21, 2023, 6 pages.
Office Action received for Australian Patent Application No. 2022235630, mailed on May 17, 2023, 3 pages.
Office Action received for Chinese Patent Application No. 201780033617.5, mailed on Apr. 2, 2021, 24 pages (13 pages of English Translation and 11 pages of Official Copy).
Office Action received for Chinese Patent Application No. 201780033617.5, mailed on Apr. 20, 2020, 24 pages (13 pages of English Translation and 11 pages of Official Copy).
Office Action received for Chinese Patent Application No. 201780033617.5, mailed on Sep. 29, 2020, 26 pages (15 pages of English Translation and 11 pages of Official Copy).
Office Action received for Chinese Patent Application No. 201780033617.5, mailed on Sep. 30, 2021, 16 pages (10 pages of English Translation and 6 pages of Official Copy).
Office Action received for European Patent Application No. 17810730.6, mailed on Aug. 18, 2021, 12 pages.
Office Action received for European Patent Application No. 17810730.6, mailed on Jul. 6, 2023, 13 pages.
Peters Jay, "The iPhone 13's rumored satellite link sounds like it's just for emergencies", The Verge, Available online at: https://apple.news/AxX1QS6IT2m8I8PPKtL52Q, Aug. 30, 2021, 2 pages.
Record of Oral Hearing received for U.S. Appl. No. 15/424,186, mailed on May 10, 2021, 12 pages.
Office Action received for European Patent Application No. 23782659.9, mailed on Aug. 14, 2026, 7 pages.

* cited by examiner

CRASH DETECTION USER INTERFACE

CROSS-REFERENCE TO RELATED APPLICATIONS

This application claims priority to U.S. Provisional Application No. 63/404,155, entitled "CRASH DETECTION USER INTERFACE," filed Sep. 6, 2022, and also relates to U.S. Provisional Application No. 63/400,732, entitled "METHODS AND INTERFACES FOR INITIATING COMMUNICATIONS," filed Aug. 24, 2022, the contents of which are hereby incorporated by reference in their entirety.

FIELD

The present disclosure relates generally to computer user interfaces, and more specifically to techniques for initiating communication in the event of a crash.

BACKGROUND

Electronic devices are used to send various types of communication, such as phone calls and text messages, using cellular communication. Some electronic devices are capable of detecting motion using sensors such as accelerometers and gyroscopes.

BRIEF SUMMARY

Some techniques for initiating communication in the event of a crash using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for initiating communication in the event of a crash. Such methods and interfaces optionally complement or replace other methods for initiating communication in the event of a crash. Such methods and interfaces reduce the cognitive burden on a user and produce a more efficient human-machine interface. For battery-operated computing devices, such methods and interfaces conserve power and increase the time between battery charges.

In accordance with some embodiments, a method is described. The method comprises: at a computer system that is in communication with a display generation component and one or more input devices: obtaining data indicating that a crash has occurred; in response to obtaining the data indicating that a crash has occurred, displaying, via the display generation component, a call option; and in accordance with a determination that the call option has been selected via the one or more input devices, initiating a process to call a predetermined number associated with the call option.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: obtaining data indicating that a crash has occurred; in response to obtaining the data indicating that a crash has occurred, displaying, via the display generation component, a call option; and in accordance with a determination that the call option has been selected via the one or more input devices, initiating a process to call a predetermined number associated with the call option.

In accordance with some embodiments, a transitory computer-readable storage medium is described. The transitory computer-readable storage medium stores one or more programs configured to be executed by one or more processors of a computer system that is in communication with a display generation component and one or more input devices, the one or more programs including instructions for: obtaining data indicating that a crash has occurred; in response to obtaining the data indicating that a crash has occurred, displaying, via the display generation component, a call option; and in accordance with a determination that the call option has been selected via the one or more input devices, initiating a process to call a predetermined number associated with the call option.

In accordance with some embodiments, a computer system configured to communicate with a display generation component and one or more input devices is described. The computer system comprises: one or more processors; and memory storing one or more programs configured to be executed by the one or more processors, the one or more programs including instructions for: obtaining data indicating that a crash has occurred; in response to obtaining the data indicating that a crash has occurred, displaying, via the display generation component, a call option; and in accordance with a determination that the call option has been selected via the one or more input devices, initiating a process to call a predetermined number associated with the call option.

In accordance with some embodiments, a computer system configured to communicate with a display generation component and one or more input devices is described. The computer system comprises: means for obtaining data indicating that a crash has occurred; means for, in response to obtaining the data indicating that a crash has occurred, displaying, via the display generation component, a call option; and means for, in accordance with a determination that the call option has been selected via the one or more input devices, initiating a process to call a predetermined number associated with the call option.

In accordance with some embodiments, a computer program product is described. The computer program product comprises one or more programs configured to be executed by one or more processors of a computer system that is in communication with a display generation component and one or more input devices, the one or more programs including instructions for: obtaining data indicating that a crash has occurred; in response to obtaining the data indicating that a crash has occurred, displaying, via the display generation component, a call option; and in accordance with a determination that the call option has been selected via the one or more input devices, initiating a process to call a predetermined number associated with the call option.

In accordance with some embodiments, a method is described. The method comprises: at a computer system that is in communication with a display generation component and one or more input devices: obtaining data indicating that a crash has occurred; and in response to obtaining the data indicating that a crash has occurred: in accordance with a determination that a terrestrial wireless communication network is not reachable by the computer system, displaying, via the display generation component, a non-terrestrial wireless communication option that, when selected via the one or more input devices, initiates a process for communicating via a non-terrestrial wireless communication network; and in accordance with a determination that a terrestrial wireless communication network is reachable by the computer system, forgoing display of the non-terrestrial wireless communication option.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: obtaining data indicating that a crash has occurred; and in response to obtaining the data indicating that a crash has occurred: in accordance with a determination that a terrestrial wireless communication network is not reachable by the computer system, displaying, via the display generation component, a non-terrestrial wireless communication option that, when selected via the one or more input devices, initiates a process for communicating via a non-terrestrial wireless communication network; and in accordance with a determination that a terrestrial wireless communication network is reachable by the computer system, forgoing display of the non-terrestrial wireless communication option.

In accordance with some embodiments, a transitory computer-readable storage medium is described. The transitory computer-readable storage medium stores one or more programs configured to be executed by one or more processors of a computer system that is in communication with a display generation component and one or more input devices, the one or more programs including instructions for: obtaining data indicating that a crash has occurred; and in response to obtaining the data indicating that a crash has occurred: in accordance with a determination that a terrestrial wireless communication network is not reachable by the computer system, displaying, via the display generation component, a non-terrestrial wireless communication option that, when selected via the one or more input devices, initiates a process for communicating via a non-terrestrial wireless communication network; and in accordance with a determination that a terrestrial wireless communication network is reachable by the computer system, forgoing display of the non-terrestrial wireless communication option.

In accordance with some embodiments, a computer system configured to communicate with a display generation component and one or more input devices is described. The computer system comprises: one or more processors; and memory storing one or more programs configured to be executed by the one or more processors, the one or more programs including instructions for: obtaining data indicating that a crash has occurred; and in response to obtaining the data indicating that a crash has occurred: in accordance with a determination that a terrestrial wireless communication network is not reachable by the computer system, displaying, via the display generation component, a non-terrestrial wireless communication option that, when selected via the one or more input devices, initiates a process for communicating via a non-terrestrial wireless communication network; and in accordance with a determination that a terrestrial wireless communication network is reachable by the computer system, forgoing display of the non-terrestrial wireless communication option.

In accordance with some embodiments, a computer system configured to communicate with a display generation component and one or more input devices is described. The computer system comprises: means for obtaining data indicating that a crash has occurred; and means for, in response to obtaining the data indicating that a crash has occurred: in accordance with a determination that a terrestrial wireless communication network is not reachable by the computer system, displaying, via the display generation component, a non-terrestrial wireless communication option that, when selected via the one or more input devices, initiates a process for communicating via a non-terrestrial wireless communication network; and in accordance with a determination that a terrestrial wireless communication network is reachable by the computer system, forgoing display of the non-terrestrial wireless communication option.

In accordance with some embodiments, a computer program product is described. The computer program product comprises one or more programs configured to be executed by one or more processors of a computer system that is in communication with a display generation component and one or more input devices, the one or more programs including instructions for: obtaining data indicating that a crash has occurred; and in response to obtaining the data indicating that a crash has occurred: in accordance with a determination that a terrestrial wireless communication network is not reachable by the computer system, displaying, via the display generation component, a non-terrestrial wireless communication option that, when selected via the one or more input devices, initiates a process for communicating via a non-terrestrial wireless communication network; and in accordance with a determination that a terrestrial wireless communication network is reachable by the computer system, forgoing display of the non-terrestrial wireless communication option.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for initiating communication in the event of a crash, thereby increasing the effectiveness, efficiency, and user satisfaction with such devices. Such methods and interfaces may complement or replace other methods for initiating communication in the event of a crash.

DESCRIPTION OF THE FIGURES

For a better understanding of the various described embodiments, reference should be made to the Description of Embodiments below, in conjunction with the following drawings in which like reference numerals refer to corresponding parts throughout the figures.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for initiating communication in the event of a crash. For example, in some embodiments, an electronic device automatically provides an option to initiate communication with an emergency number when a crash is detected. For example, in some embodiments, if a crash is detected when a cellular communication network is not available, an electronic device provides user interfaces for communicating via an alternative communication network (e.g., a satellite communication network). Such techniques can reduce the cognitive burden on a user who initiates communication in the event of a crash, thereby enhancing productivity. Further, such techniques can reduce processor and battery power otherwise wasted on redundant user inputs.

Figure 6A:
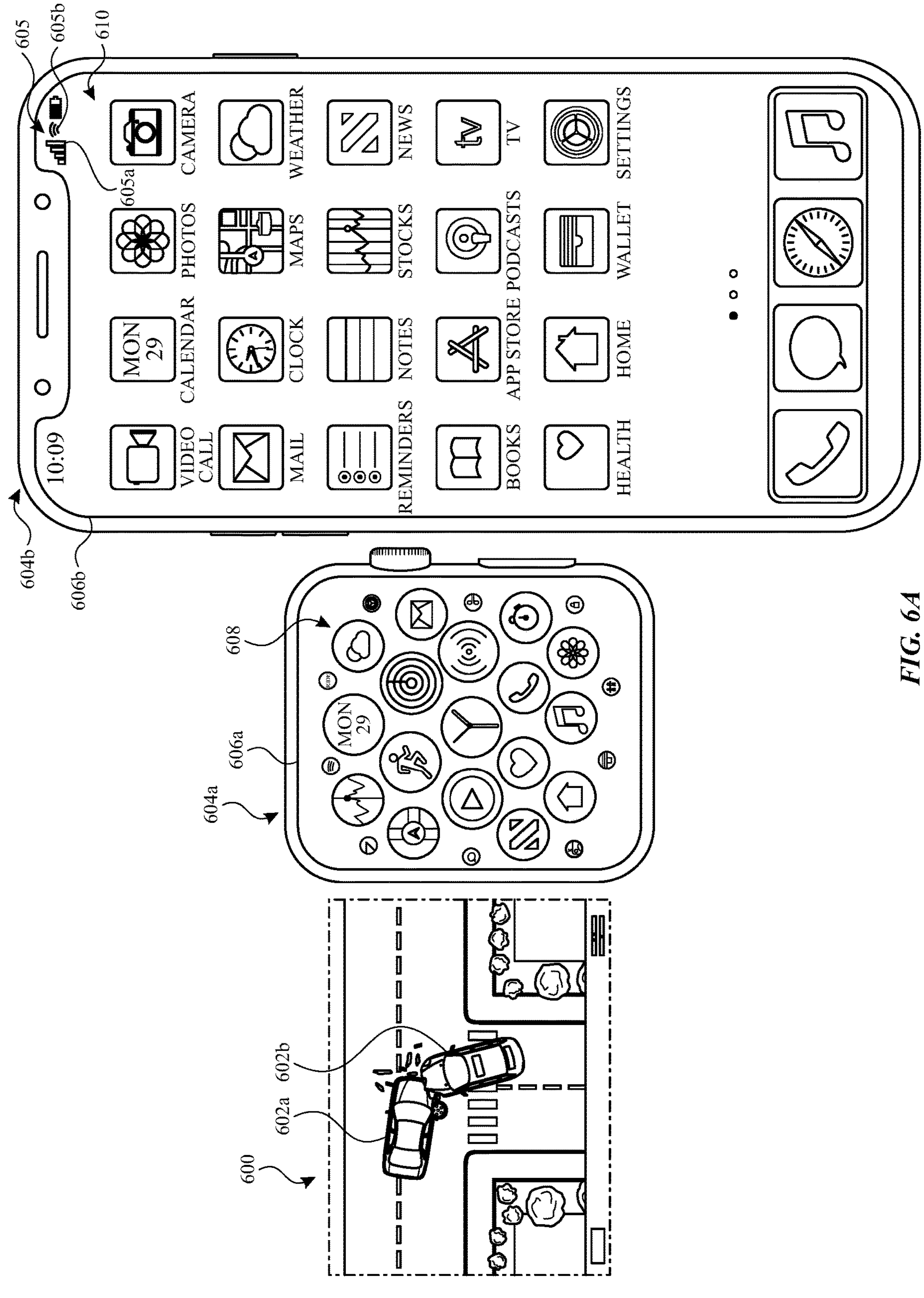
FIGS. 6A-6AA illustrate exemplary user interfaces for initiating communication using an electronic device in the event of a crash in accordance with some embodiments.
Figure 7:
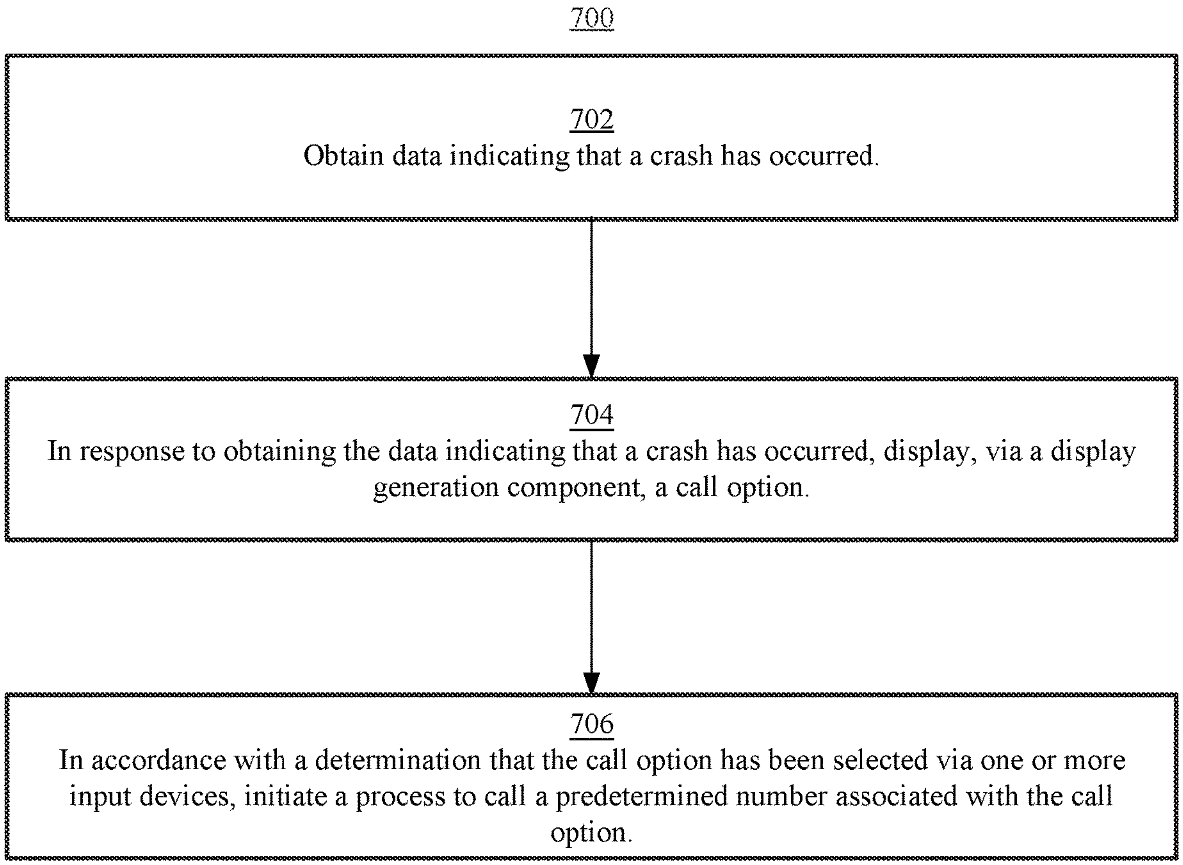
FIG. 7 is a flow diagram illustrating methods for initiating communication using an electronic device in the event of a crash in accordance with some embodiments.
Figure 8B:
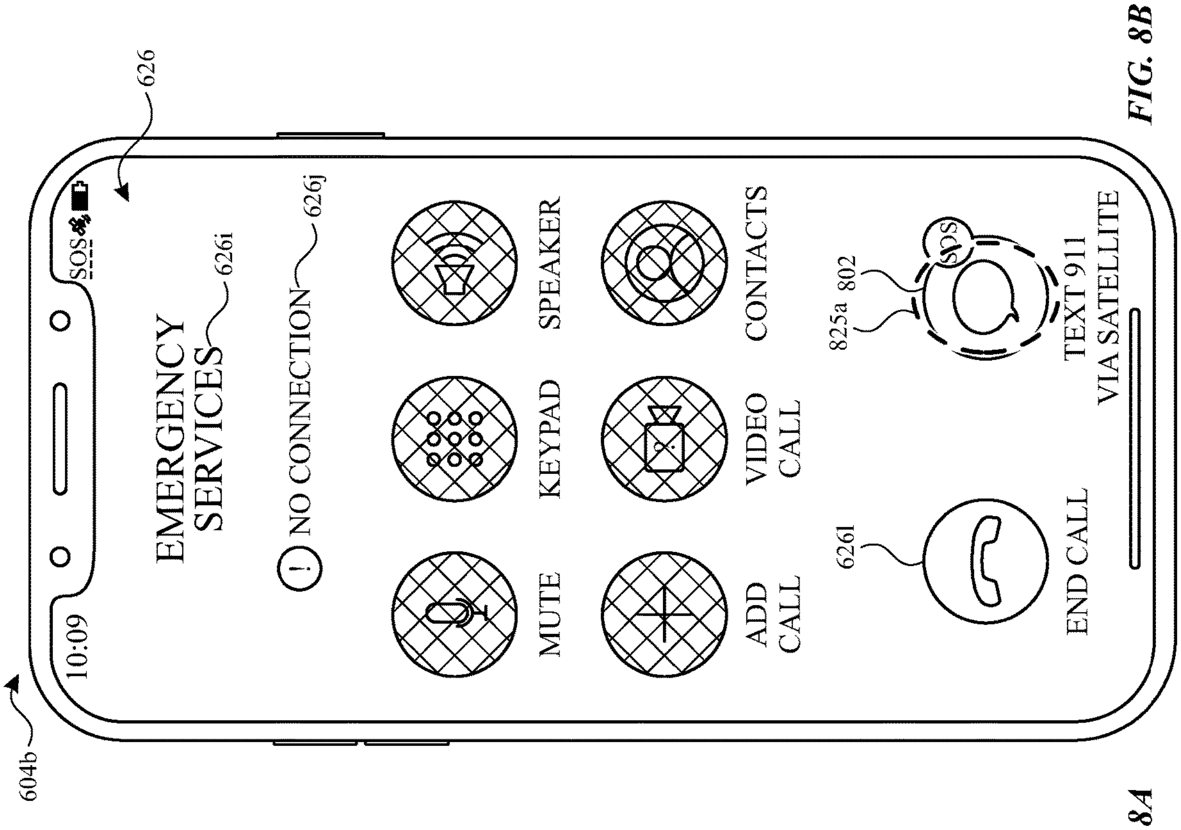
FIGS. 8A-8N illustrate exemplary user interfaces for sending a communication using an alternative communication network in the event of a crash in accordance with some embodiments.
Figure 8A:
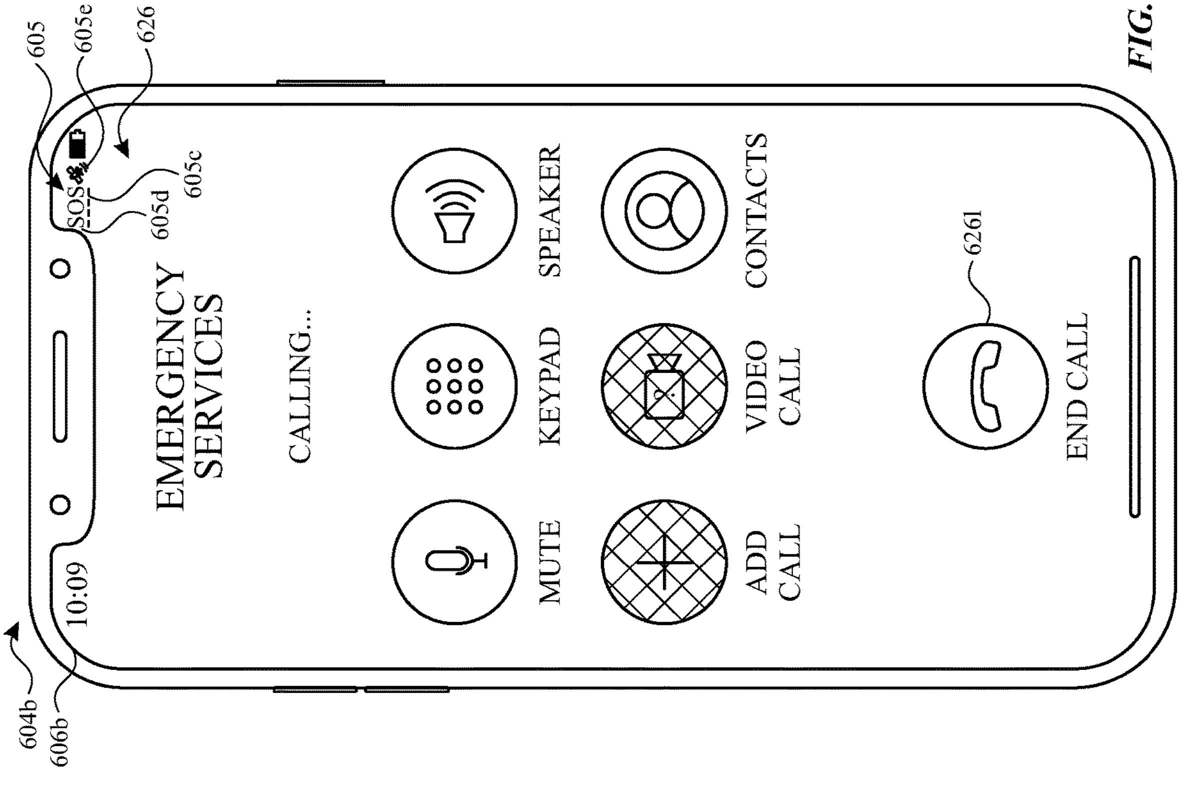
Figure 8D:
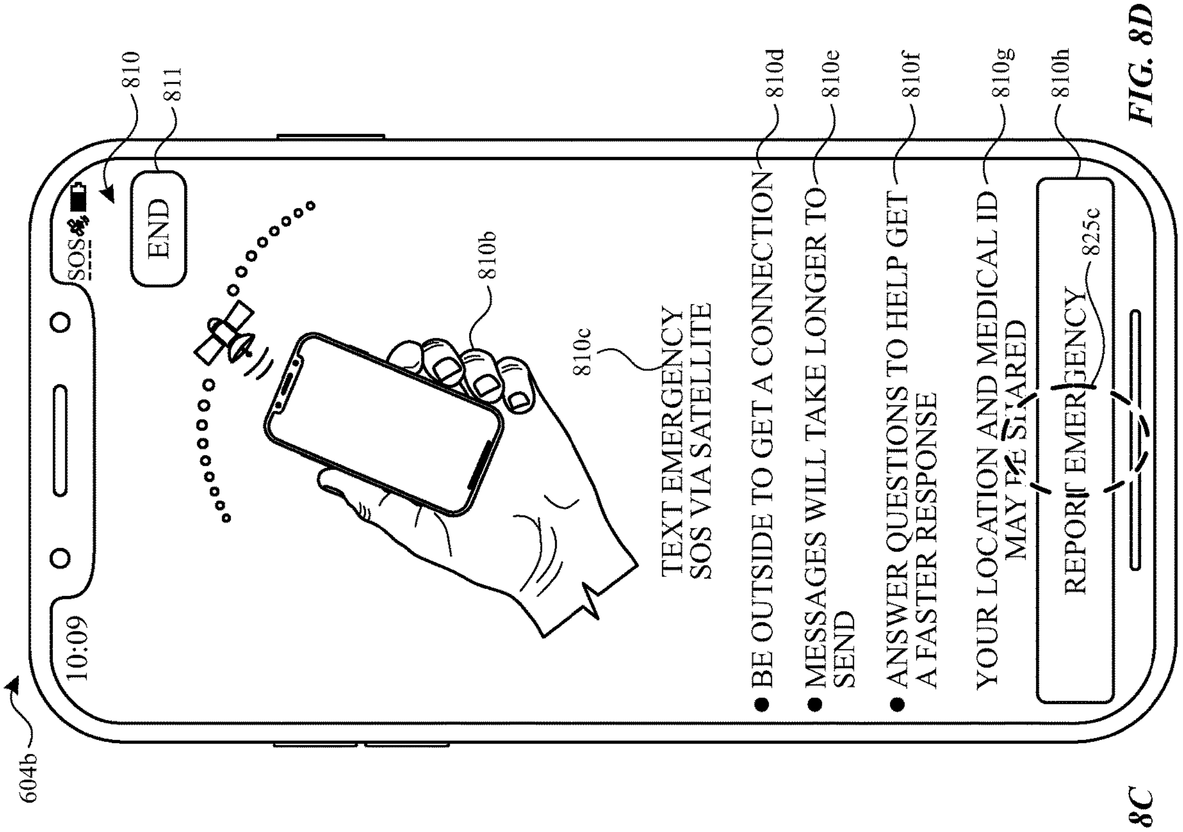

Below, FIGS. 1A-1B, 2, 3, 4A-4B, and 5A-5B provide a description of exemplary devices for performing the techniques for initiating communication in the event of a crash. FIGS. 6A-6AA illustrate exemplary user interfaces for initiating communication in the event of a crash. FIG. 7 is a flow diagram illustrating methods of initiating communication in the event of a crash in accordance with some embodiments. The user interfaces in FIGS. 6A-6AA are used to illustrate the processes described below, including the processes in FIG. 7. FIGS. 8A-8N illustrate exemplary user interfaces for sending a communication using an alternative communication network in the event of a crash. FIG. 9 is a flow diagram illustrating methods of sending a communication using an alternative communication network in the event of a crash in accordance with some embodiments. The user interfaces in FIGS. 8A-8N are used to illustrate the processes described below, including the processes in FIG. 9.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently. Reducing the number of inputs needed to perform an operation and providing clear feedback to the user enable the user to use the device more quickly and efficiently, which is particularly important in emergency situations and/or when a crash has occurred for several reasons. Using a device efficiently conserves battery life, which is important in emergency situations because some emergency communication features use satellite communications that can use significant energy (e.g., more energy than cellular communications) and because opportunities to recharge the device in an emergency may be limited (e.g., because a user has been involved in a crash). User interfaces that clearly indicate how to use a device quickly and efficiently are particularly important in emergency situations or when a crash has occurred because a user may be stressed and more prone to making mistakes. In an emergency situation and/or when a crash has occurred, reducing errors by providing clear instructions and feedback saves time communicating with emergency services, which can improve the likelihood that emergency assistance will be provided more quickly.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms “first,” “second,” etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
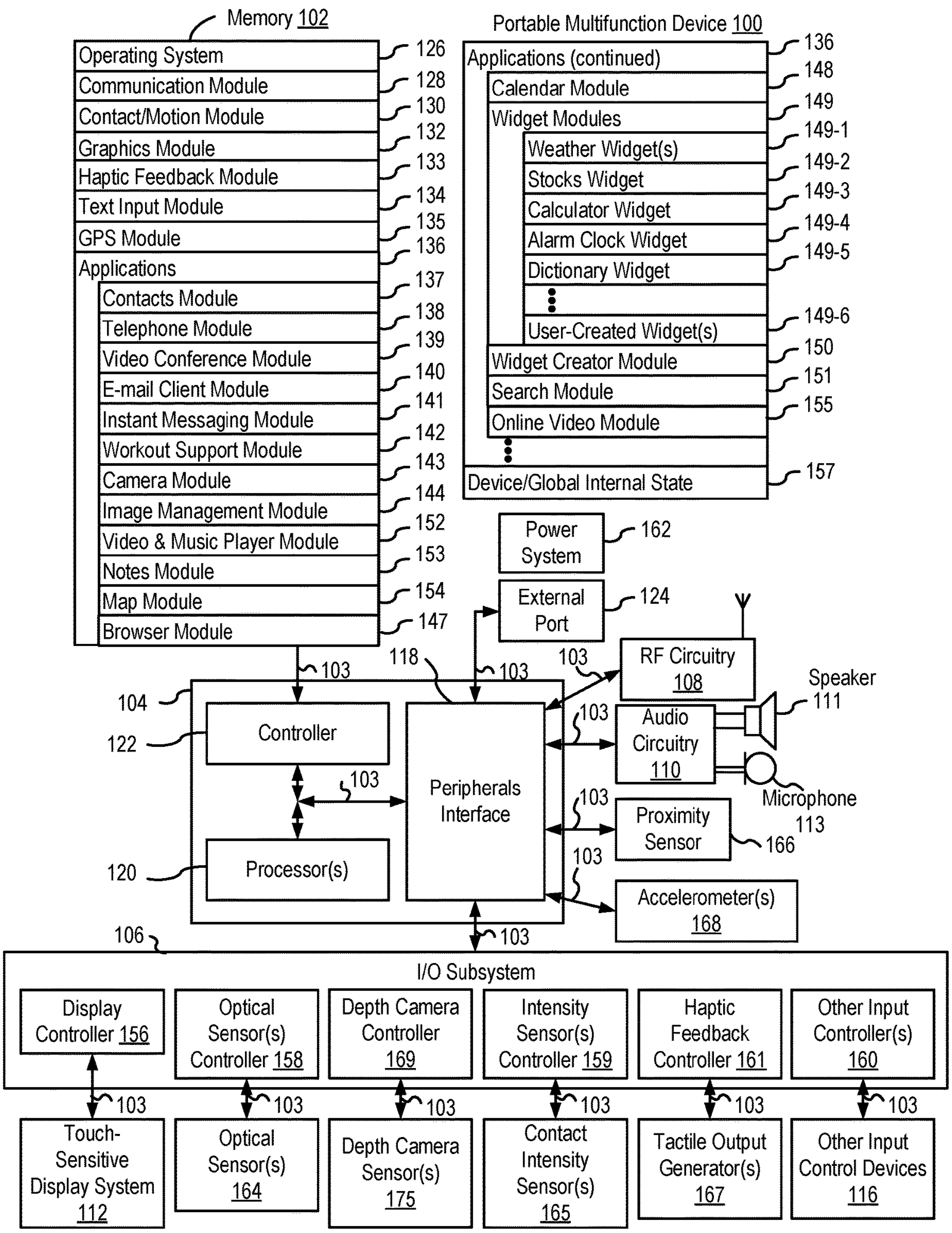
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6)

U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
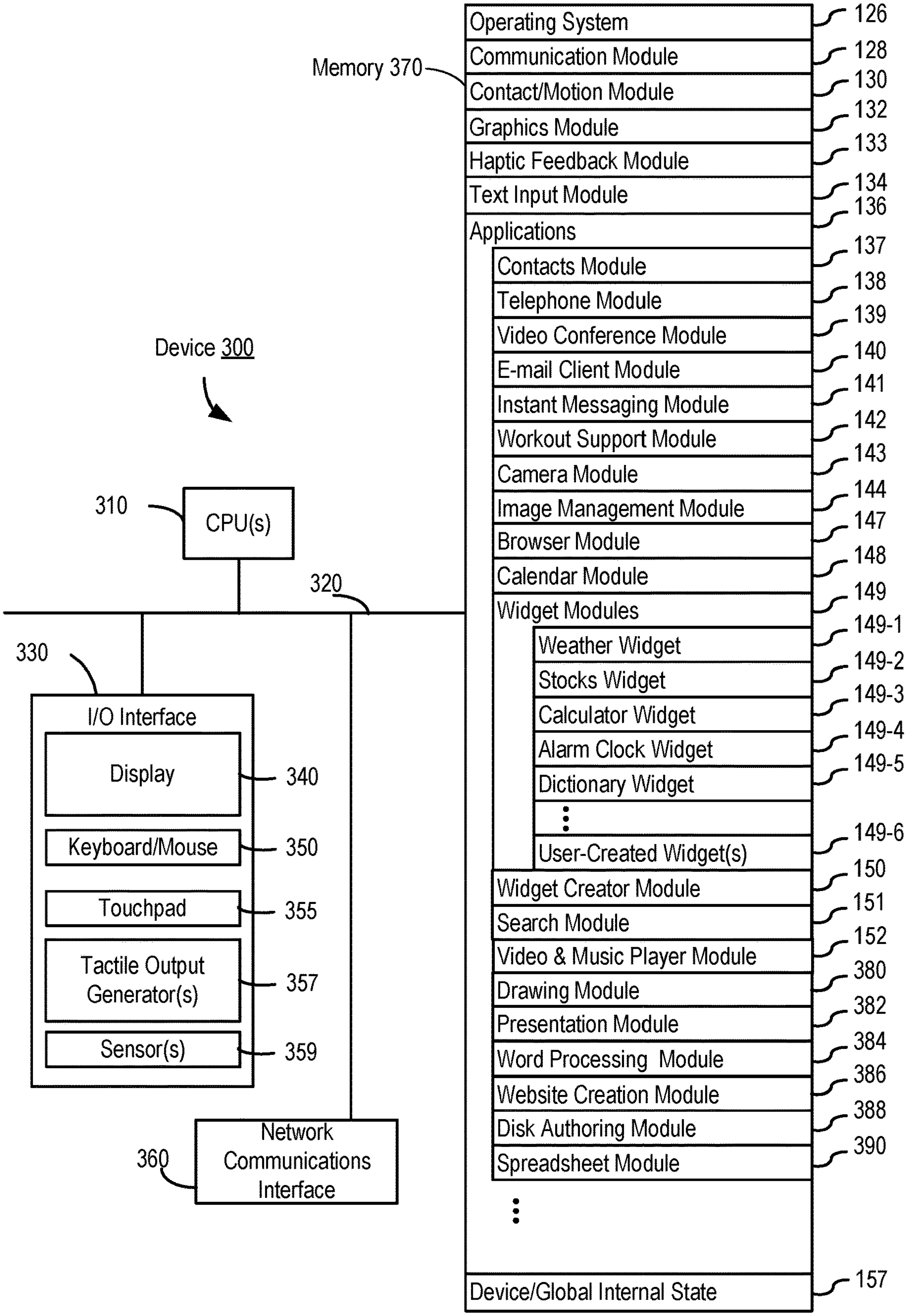
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo!Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
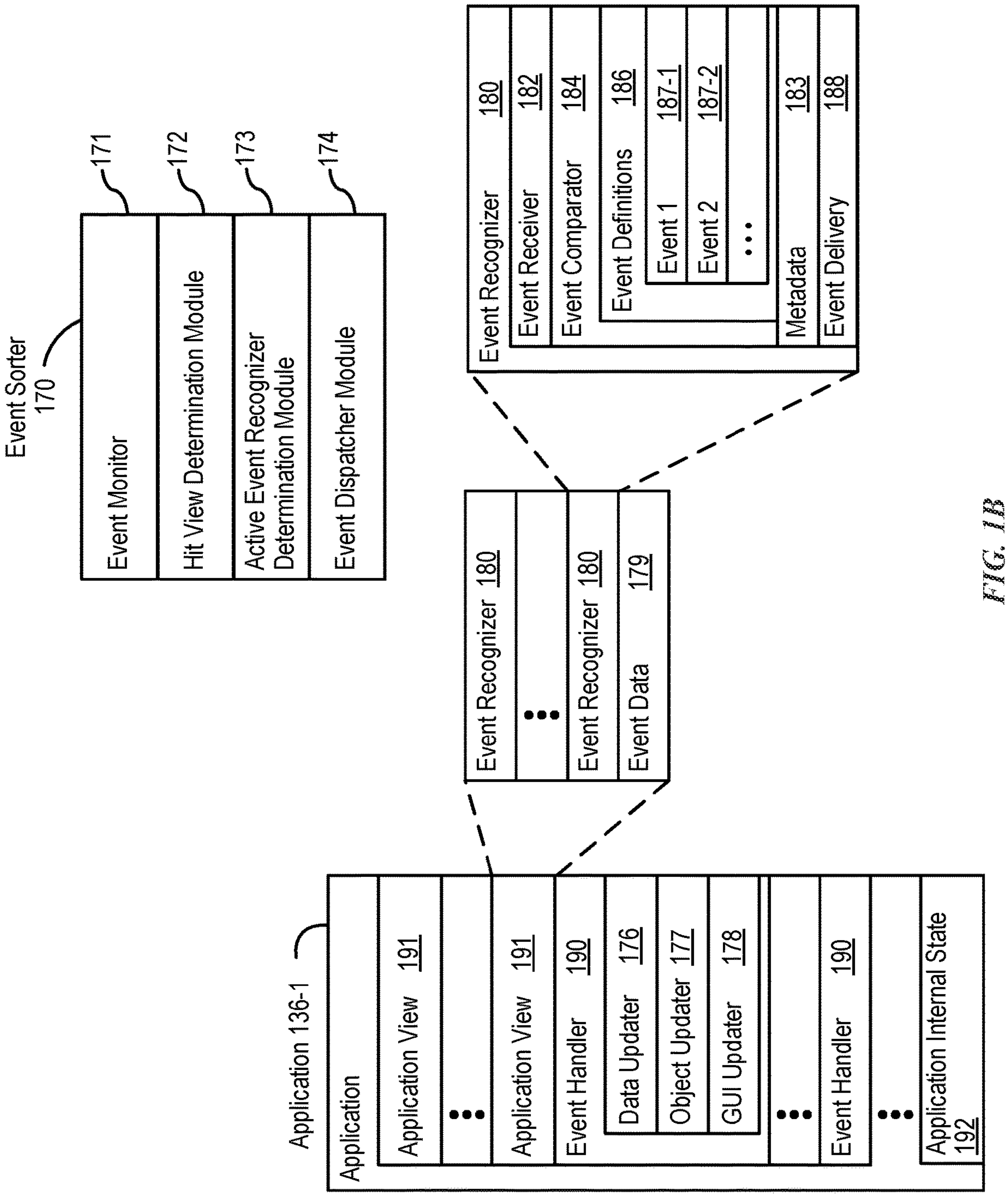
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and/or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
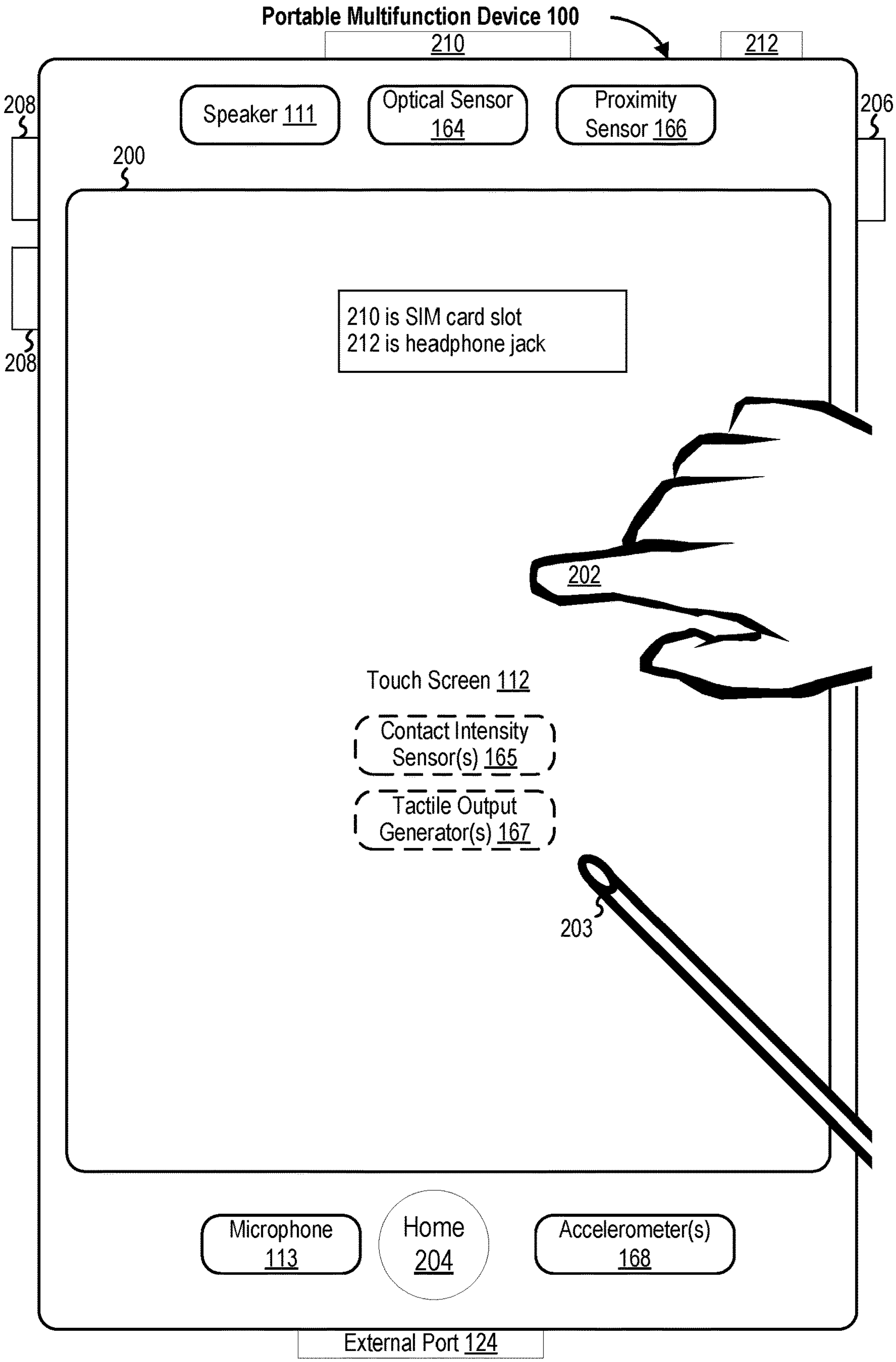
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
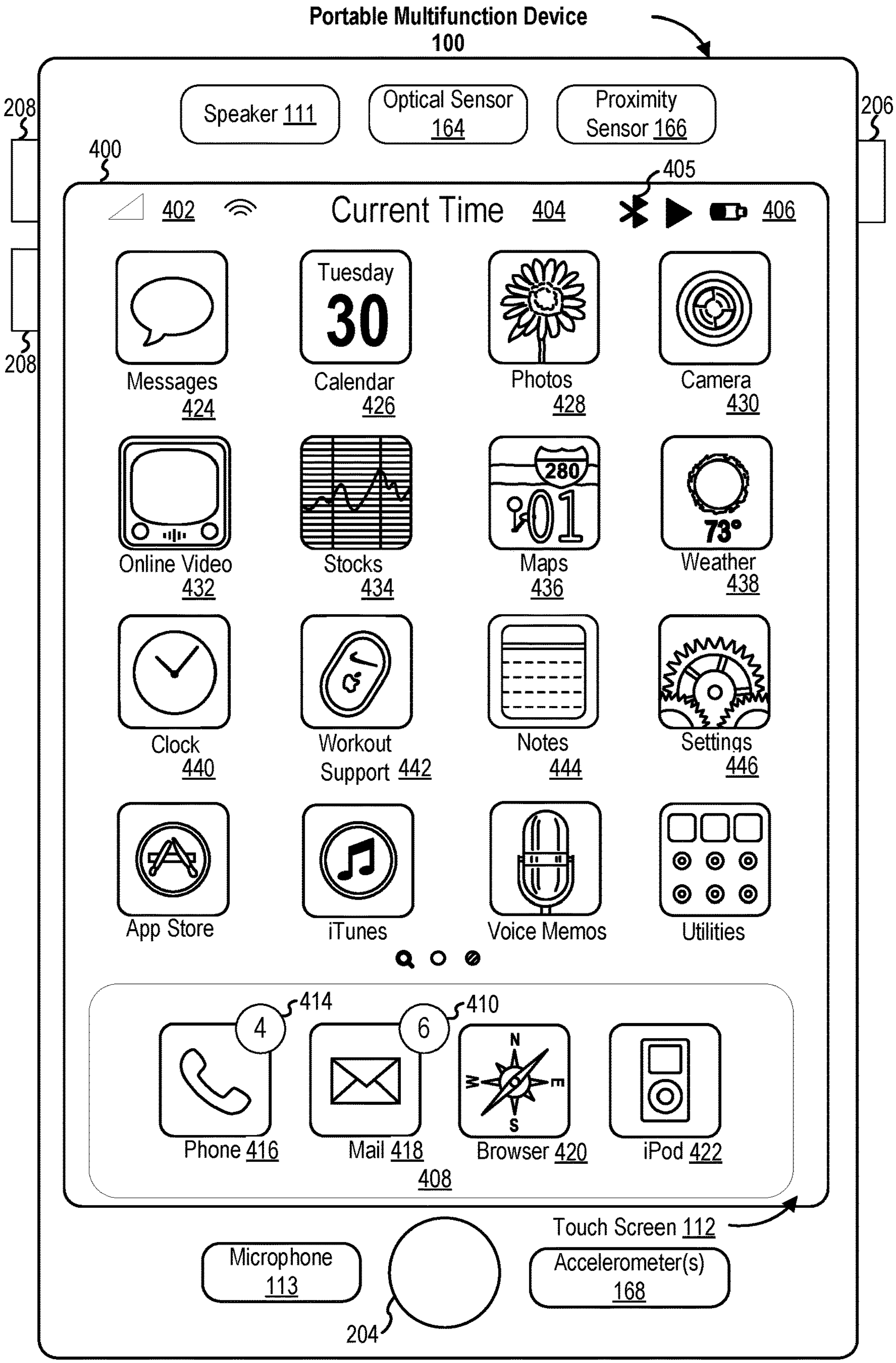
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and Icons for other applications, such as:
- Icon 424 for IM module 141, labeled "Messages;"
- Icon 426 for calendar module 148, labeled "Calendar;"
- Icon 428 for image management module 144, labeled "Photos;"
- Icon 430 for camera module 143, labeled "Camera;"
- Icon 432 for online video module 155, labeled "Online Video;"
- Icon 434 for stocks widget 149-2, labeled "Stocks;"
- Icon 436 for map module 154, labeled "Maps;"
- Icon 438 for weather widget 149-1, labeled "Weather;"
- Icon 440 for alarm clock widget 149-4, labeled "Clock;"
- Icon 442 for workout support module 142, labeled "Workout Support;"
- Icon 444 for notes module 153, labeled "Notes;" and
- Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
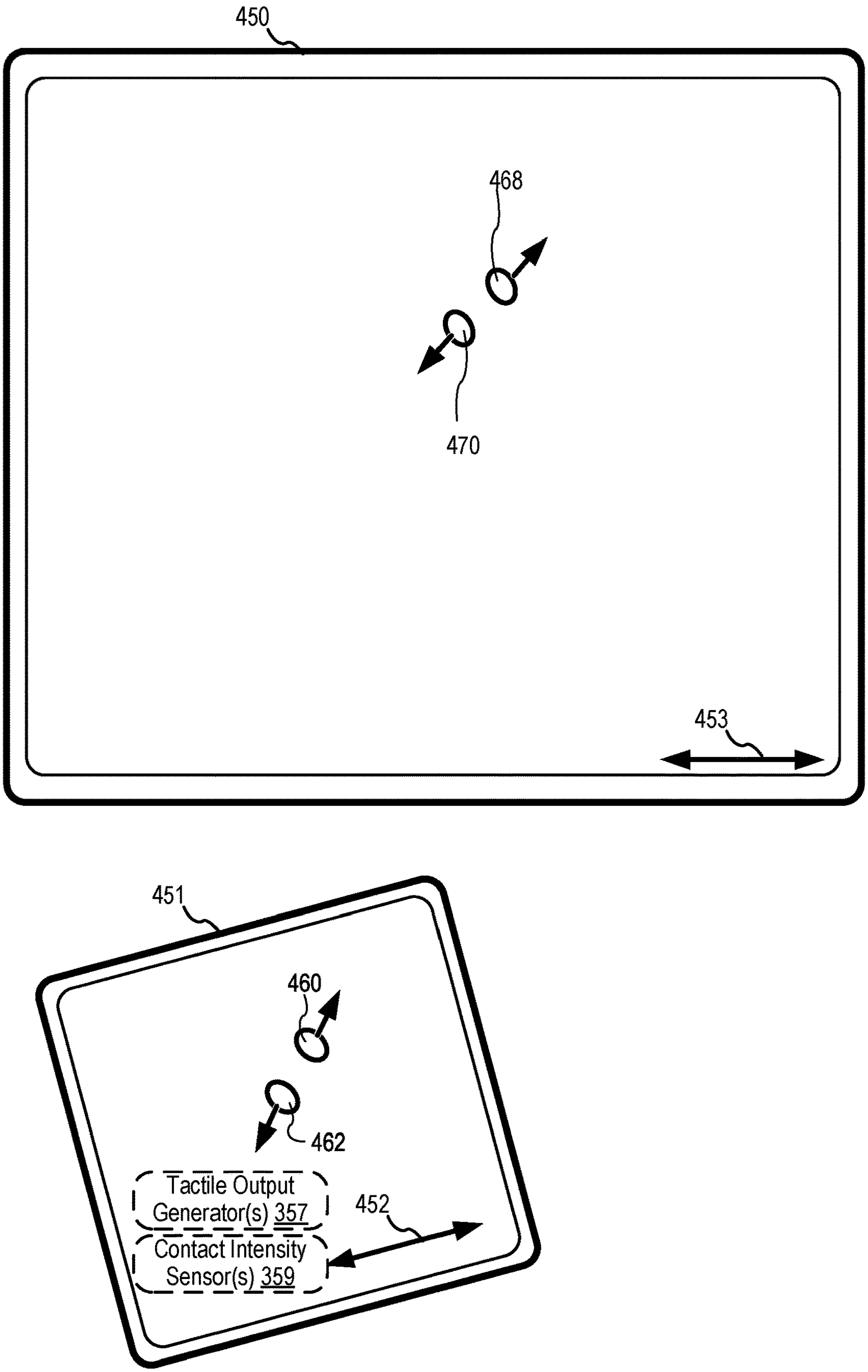
FIG. 4B illustrates an exemplary user interface for a multifunction device with a touch-sensitive surface that is separate from the display in accordance with some embodiments.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., touch-sensitive surface 451 in FIG. 4B) has a primary axis (e.g., 452 in FIG. 4B) that corresponds to a primary axis (e.g., 453 in FIG. 4B) on the display (e.g., display 450). In accordance with these embodiments, the device detects contacts (e.g., contact 460 and contact 462 in FIG. 4B) with the touch-sensitive surface 451 at locations that correspond to respective locations on the display (e.g., in FIG. 4B, contact 460 corresponds to 468 and contact 462 corresponds to 470). In this way, user inputs (e.g., contacts 460 and 462, and movements thereof) detected by the device on the touch-sensitive surface (e.g., touch-sensitive surface 451 in FIG. 4B) are used by the device to manipulate the user interface on the display (e.g., Are the display 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
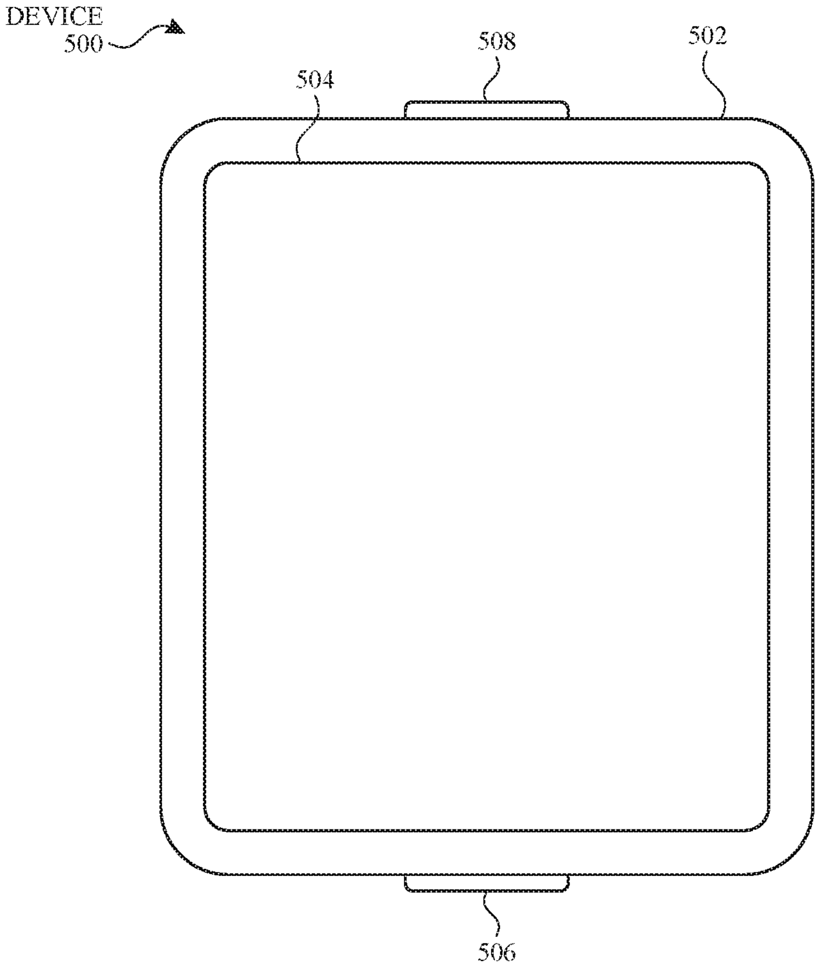
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
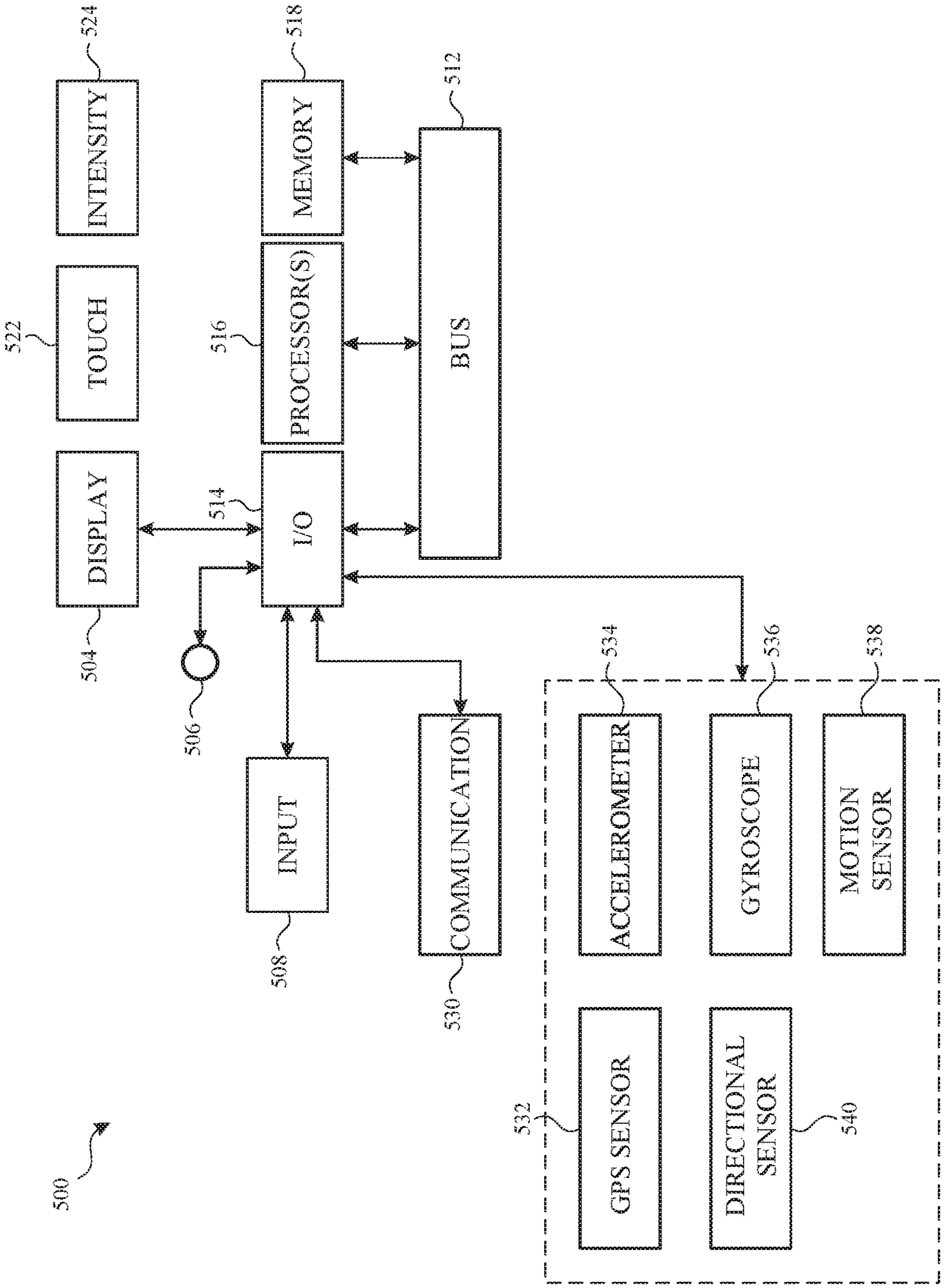
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including methods 700 and 900 (FIGS. 7 and 9). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, the computer system is in a locked state or an unlocked state. In the locked state, the computer system is powered on and operational but is prevented from performing a predefined set of operations in response to user input. The predefined set of operations optionally includes navigation between user interfaces, activation or deactivation of a predefined set of functions, and activation or deactivation of certain applications. The locked state can be used to prevent unintentional or unauthorized use of some functionality of the computer system or activation or deactivation of some functions on the computer system. In some embodiments, in the unlocked state, the computer system is powered on and operational and is not prevented from performing at least a portion of the predefined set of operations that cannot be performed while in the locked state. When the computer system is in the locked state, the computer system is said to be locked. When the computer system is in the unlocked state, the computer is said to be unlocked. In some embodiments, the computer system in the locked state optionally responds to a limited set of user inputs, including input that corresponds to an attempt to transition the computer system to the unlocked state or input that corresponds to powering the computer system off.

Attention is now directed towards embodiments of user interfaces ("UI") and associated processes that are implemented on an electronic device, such as portable multifunction device 100, device 300, or device 500.

FIGS. 6A-6AA illustrate exemplary user interfaces for initiating communication using a computer system in the event of a crash, in accordance with some embodiments. The user interfaces in these figures are used to illustrate the processes described below, including the processes in FIG. 7.

FIG. 6A illustrates diagram 600 of a crash involving vehicle 602*a* and vehicle 602*b*. Computer system 604*a* (e.g., a smartwatch) and/or computer system 604*b* (e.g., a smartphone) are located in vehicle 602*a* at the time of the crash. In some embodiments, computer system 604*a* and computer system 604*b* are in communication with each other via wireless and/or wired communication such as, e.g., a Wi-Fi network, Bluetooth communication, and/or a near-field communication protocol.

In the embodiment illustrated in FIG. 6A, at the time of the crash, computer system 604*a* is displaying user interface 608 on display 606*a* (e.g., a touch-sensitive display), and computer system 604*b* is displaying user interface 610 on display 606*b* (e.g., a touch-sensitive display). User interface 608 (e.g., a home screen or application springboard) includes application icons that can be selected (e.g., tapped and/or otherwise selected) to open corresponding applications on computer system 604*a*. User interface 610 (e.g., a home screen or application springboard) includes application icons that can be selected (e.g., tapped and/or otherwise selected) to open corresponding applications on computer system 604*b*.

Although FIG. 6A illustrates computer system 604*a* and computer system 604*b* displaying user interface 608 and user interface 610, respectively, at the time of the crash, in some embodiments, the techniques described herein are applied when computer system 604*a* and/or computer system 604*b* are displaying other user interfaces at the time of the crash, such as, e.g., a clock face user interface, a wake user interface (e.g., a user interface displayed when a computer system comes out of a disabled or low-power state), a lock user interface, and/or a user interface of an application (e.g., an email application, web browsing application, maps application, navigation application, media playback application, or settings application). In some embodiments, the techniques described herein are applied when display 606*a* and/or display 606*b* are powered off, deactivated, de-energized, in a sleep state, in a dimmed state, and/or in a low-power state.

Computer system 604*b* displays network status indicator 605, which includes cellular status indicator 605*a* and internet status indicator 605*b*. Cellular status indicator 605*a* displays an indication of a current status of a connection of computer system 604*b* with a cellular communication network. For example, an appearance of cellular status indicator 605*a* can indicate whether or not computer system 604*b* is connected to a cellular communication network and/or the strength of the signal between computer system 604*b* and the cellular communication network. Internet status indicator 605*b* displays an indication of an internet communication network that computer system 604*b* can use to connect to the internet (e.g., a Wi-Fi network, LTE, 3G, 4G, or 5G). For example, an appearance of internet status indicator 605*b* can indicate whether or not a network is available for computer system 604*b* to connect to the internet, the network that computer system 604*b* can use to connect to the internet (if an internet communication network is available), and/or the strength of the signal between computer system 604*b* and the internet communication network.

In some embodiments, computer system 604*a* can independently connect to a cellular communication network and/or an internet communication network (e.g., without computer system 604*b*) in order to perform communication. In some embodiments, computer system 604*a* can connect to a cellular communication network and/or an internet communication network via computer system 604*b* in order to perform communication (e.g., computer system 604*a* cannot independently connect to a cellular communication network and/or an internet communication network). In some embodiments, computer system 604*a* displays network status indicator 605, cellular status indicator 605*a*, and/or internet status indicator 605*b* based on the ability of computer system 604*a* to connect to a cellular communication network and/or an internet communication network (e.g., either independently and/or via computer system 604*b*).

In FIG. 6A, computer system 604*a* and/or computer system 604*b* obtains an indication that a crash has been detected. In some embodiments, computer system 604*a* detects an indication (e.g., motion and/or sound) of the crash and/or determines that the crash has occurred. In some embodiments, computer system 604*a* sends data to computer system 604*b* that indicates that the crash has occurred. In some embodiments, computer system 604*b* detects an indication (e.g., motion and/or sound) of the crash and/or determines that the crash has occurred. In some embodiments, computer system 604*b* sends data to computer system 604*a* that indicates that the crash has occurred.

FIGS. 6B-6H illustrate exemplary user interfaces displayed by computer system 604*a* after a crash is detected, in accordance with some embodiments.

Figure 6B:
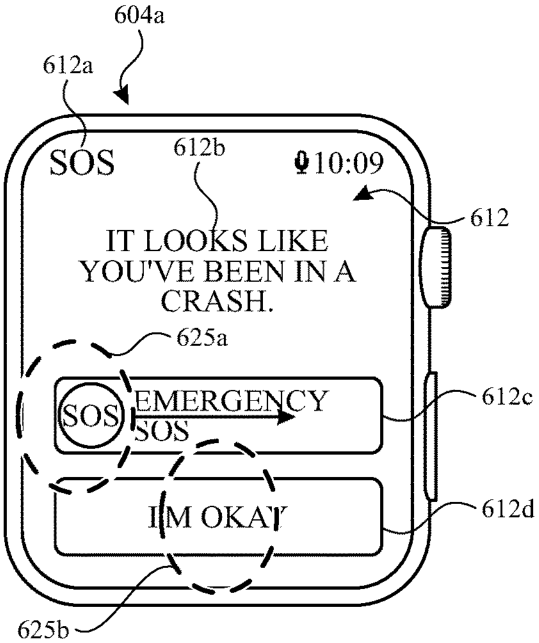

In response to obtaining an indication that the crash has been detected, computer system 604*a* displays crash detection interface 612 as shown in FIG. 6B. Crash detection interface 612 includes emergency interface indicator 612*a* (e.g., "SOS"), crash detection indicator 612*b*, communication option 612*c*, and confirmation option 612*d*. Crash detection indicator 612*b* includes an indication, such as text (e.g., "It looks like you've been in a crash"), a graphic, animation, color, and/or font, that a crash has occurred. In response to detecting selection 625*b* of confirmation option 612*d*, computer system 604*a* ceases display of crash detection interface 612 (e.g., computer system 604*a* returns to user interface 608).

Figure 6C:
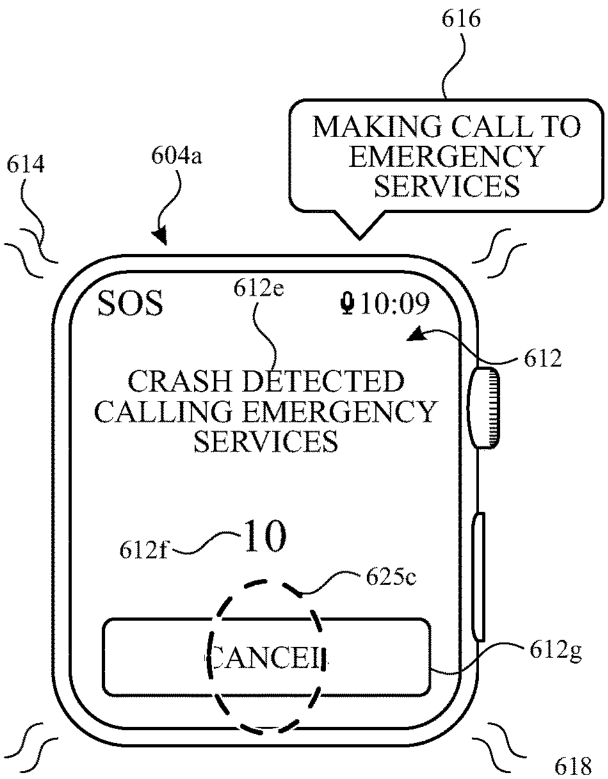

In accordance with (or, optionally, in response to) a determination that a time threshold is satisfied without detecting an input (e.g., without detecting selection of communication option 612*c* or selection of confirmation option 612*d*), computer system 604*a* displays communication alert 612*e*, countdown 612*f*, and cancel option 612*g*, as shown in FIG. 6C. Communication alert 612*e* indicates that a call to emergency services has been or will be initiated, and countdown 612*f* indicates an amount of time (e.g., number of seconds) until the call to emergency services will be placed.

In accordance with (or, optionally, in response to) a determination that a time threshold is satisfied without detecting an input, computer system 604*a* outputs a non-visual indication that a call to emergency services has been or will be initiated. For example, in FIG. 6C, computer system 604*a* outputs haptic 614 and/or audio output 616 (e.g., "Making call to emergency services").

In some embodiments, computer system 604*a* displays communication alert 612*e*, displays countdown 612*f*, displays cancel option 612*g*, and/or outputs a non-visual indication that a call to emergency services has been or will be initiated in accordance with (or, optionally, in response to) a determination that a threshold amount of time has passed since obtaining the indication that a crash has been detected (e.g., that crash detection interface 612 has been displayed for a threshold amount of time) without detecting an input. Outputting a non-visual indication that a call to emergency services has been or will be initiated is particularly helpful in an emergency situation such as a crash in which a user may be distracted and/or unable to view display 606*a* of computer system 604*a*.

In some embodiments, in response to detecting selection 625*c* of cancel option 612*g*, computer system 604*a* ceases or pauses the process of initiating a call to emergency services. For example, in response to detecting selection 625*c* of cancel option 612*g*, computer system 604*a* ceases countdown 612*f* and displays crash detection interface 612 as shown in FIG. 6B or FIG. 6H (e.g., displays crash detection indicator 612*b*, crash detection indicator 612*p*, and/or communication option 612*c*) or user interface 608.

In response to a determination that countdown 612*f* has ended, computer system 604*a* initiates (or attempts to initiate) a call to emergency services (e.g., directly or via computer system 604*b*). In some embodiments, computer system 604*a* initiates (or attempts to initiate) a call to emergency services in response to detecting selection 625*a* of communication option 612*c*. In some embodiments, selection of communication option 612*c* requires moving an element (e.g., the SOS circle in 612*c*) from a first position (e.g., a left side of 612*c*) to a predetermined second position (e.g., a right side of 612*c*), which can help prevent accidental selection of communication option 612*c*. For example, in some embodiments, communication option 612*c* is not selected if the element is not moved to the predetermined second position (e.g., not moved far enough to the right). In FIG. 6B, selection 625*a* includes a contact on display 606*a* that moves from left to right on communication option 612*c* sufficient to select communication option 612*c*.

Figure 6D:
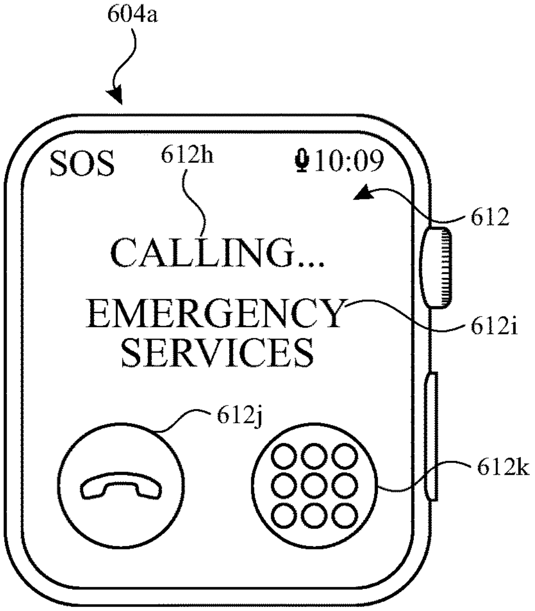

In some embodiments, as shown in FIG. 6D, initiating the call to emergency services includes displaying call status indicator 612*h*, call recipient indicator 612*i*, end call option 612*j*, and call menu option 612*k* (e.g., displaying a phone call interface or an interface of a phone application). Call status indicator 612*h* includes an indication, such as text (e.g., "Calling", "Attempting to connect", or "Connecting"), a graphic, animation, color, and/or font, that indicates a current status of the call. Call recipient indicator 612*i* includes an indication of the recipient of the call, such as text (e.g., "Emergency Services") and/or a graphical representation (e.g., an image of the recipient, an icon associated with the recipient, and/or initials of the recipient). In some embodiments, in response to detecting selection of end call option 612*j* (e.g., a tap on end call option 612*j* and/or other input selecting end call option 612*j*), computer system 604*a* ends the call or stops attempting to initiate the call. Call menu option 612*k*, when selected, causes computer system 604*a* to display selectable options that, when selected, perform corresponding functions related to a call (e.g., mute, display keypad, enable/disable speaker, and/or display contacts).

Figure 6E:
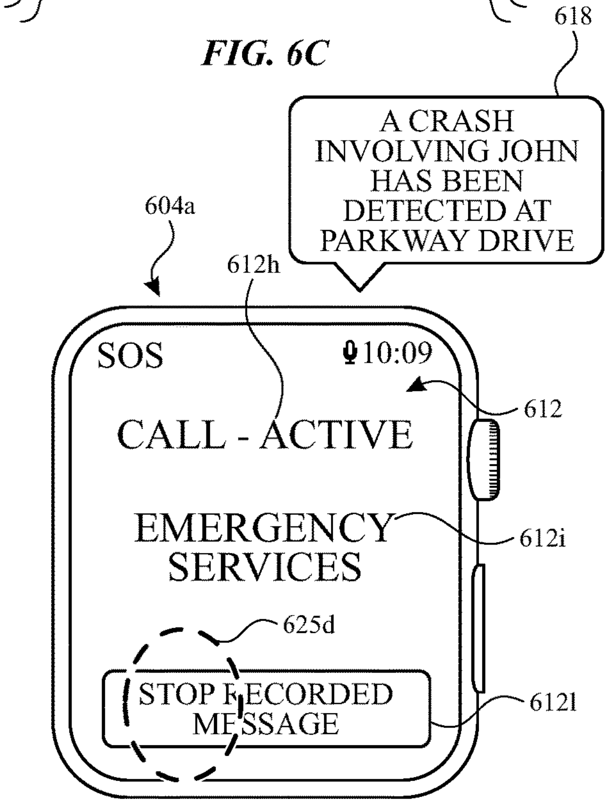

In response to establishing the call with emergency services (e.g., when emergency services answers the call and/or the call becomes active), computer system 604*a* updates call status indicator 612*h* (e.g., to "Call—Active") as shown in FIG. 6E.

In some embodiments, as shown in FIG. 6E, when the call to emergency services is established, computer system 604*a* plays message 618 on the call to emergency services. In some embodiments, message 618 is based on circumstances of the crash. For example, message 618 can indicate that a crash has occurred and include information about the crash, such as, e.g., one or more people who are involved in the crash and/or a location of the crash (e.g., "A crash involving John has been detected at Parkway Drive"). In some embodiments, computer system 604*a* plays message 618 only if the call to emergency services was initiated automatically (e.g., without detecting user input such as selection of communication option 612*c*). Playing message 618 when the call is initiated automatically enables computer system 604*a* to provide information about the crash to emergency services in the event that a user of computer system 604*a* is unable to provide information (e.g., is injured and/or unable to locate computer system 604*a*) and/or does not know that the call has been placed.

In some embodiments, when computer system 604*a* plays message 618, computer system 604*a* displays stop message option 612*l*, as shown in FIG. 6E. In some embodiments, displaying stop message option 612*l* includes ceasing display of (e.g., removing) end call option 612*j* and/or call menu option 612*k* (e.g., replacing end call option 612*j* and/or call menu option 612*k* with stop message option 612*l*).

Figure 6F:
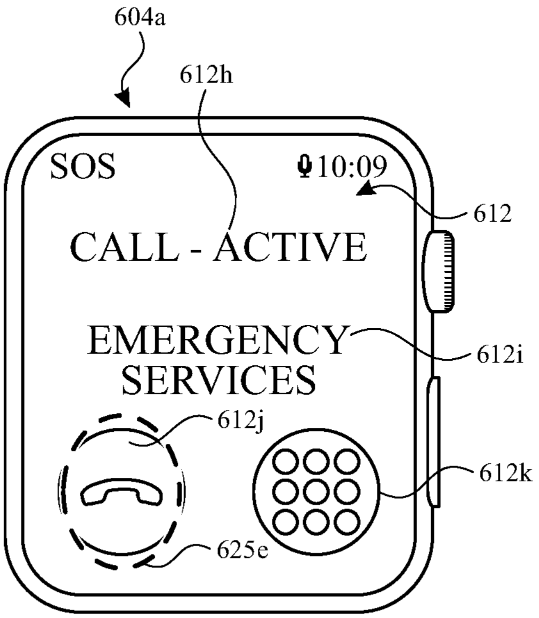

In response to detecting selection 625*d* of stop message option 612*l*, computer system 604*a* stops playing message 618. In some embodiments, in response to detecting selection 625*d* of stop message option 612*l*, computer system 604*a* ceases display of stop message option 612*l* and, optionally, displays (e.g., re-displays) end call option 612*j* and/or call menu option 612*k*, as shown in FIG. 6F.

In response to detecting selection 625*f* of end call option 612*j*, computer system 604*a* initiates a process for ending the call with emergency services. In some embodiments, in response to detecting selection 625*f* of end call option 612*j*, computer system 604*a* ends the call with emergency services without detecting further input. In some embodiments, in response to detecting selection 625*f* of end call option 612*j*, computer system 604*a* displays prompt 612*m* (e.g., "End Call?), which prompts a user to confirm whether or not to end the call with emergency services while maintaining the call with emergency services. Along with prompt 612*m*, computer system 604*a* displays continue call option 612*n* for continuing the call with emergency services and confirm option 612*o* for ending the call with emergency services. In response to detecting selection of continue call option 612*n* (e.g., a tap on continue call option 612*n* and/or other input selecting continue call option 612*n*), computer system 604*a* continues the call with emergency services and, optionally, displays (e.g., returns to) crash detection interface 612 as displayed in FIG. 6F. In response to detecting selection 625*f* of confirm option 612*n*, computer system 604*a* ends the call with emergency services.

In some embodiments, after ending the call with emergency services (e.g., in response to selection 625*e* in FIG. 6F or selection 625*f* in FIG. 6G), computer system 604*a* displays an indication that a crash was detected and, optionally, an indication of a device that detected the crash and/or an indication of when the crash was detected. For example, as shown in FIG. 6H, after ending the call with emergency services, computer system 604*a* displays crash detection indicator 612*p* (e.g., "Phone detected a crash 1 minute ago"), which indicates that a crash was detected, that the crash was detected by computer system 604*b*, and that the crash was detected one minute ago.

In some embodiments, after ending the call with emergency services (e.g., in response to selection 625*e* in FIG. 6F or selection 625*f* in FIG. 6G), computer system 604*a* provides an option to initiate (e.g., re-initiate) communication with emergency services and/or an option to provide information a user associated with computer system 604*a* that can be relevant to a medical condition of the user. For example, as shown in FIG. 6H, after ending the call with emergency services, computer system 604*a* displays communication option 612*c* and medical ID option 612*q*. In response to detecting selection of communication option 612*c* (e.g., a tap or swipe on communication option 612*c* and/or other input selecting communication option 612*c*), computer system 604*a* attempts to initiate (e.g., re-initiate) a call to emergency services. In response to detecting selection of (e.g., a tap and/or swipe on) medical ID option 612*q*, computer system 604*a* displays information of a user associated with computer system 604*a* that can be relevant to a medical condition of the user (e.g., name, age, weight, height, blood type, medications, allergies, medical conditions, a designated contact, and/or contact information of the designated contact).

Figure 6G:
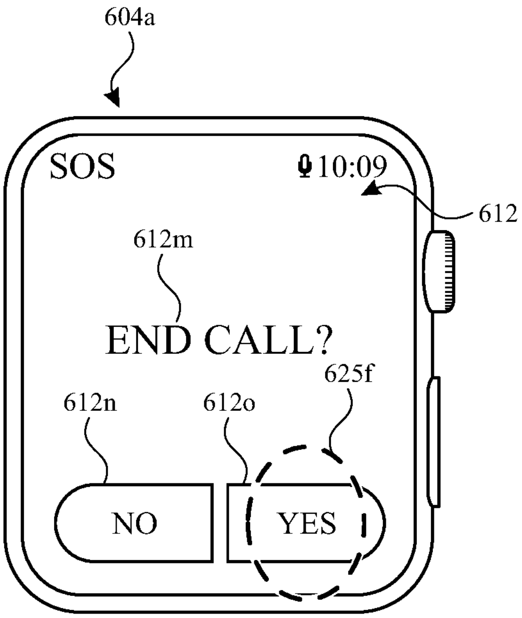
Figure 6H:
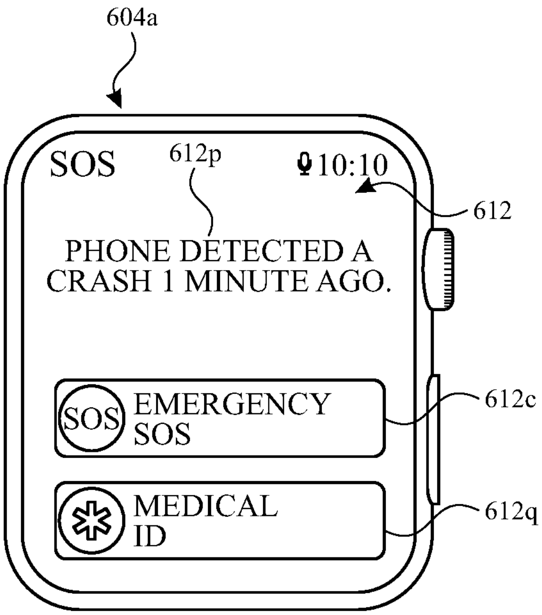
Figure 6I:
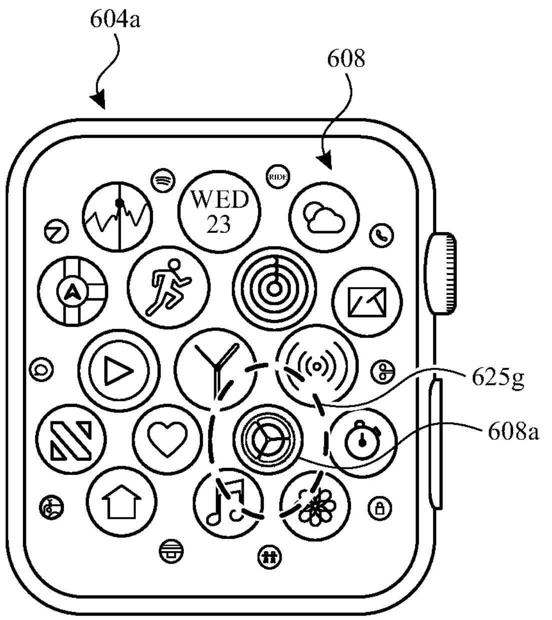
Figure 6J:
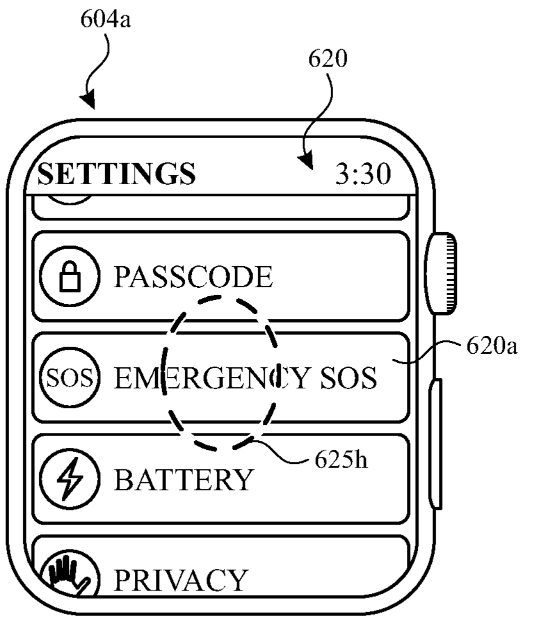
Figure 6K:
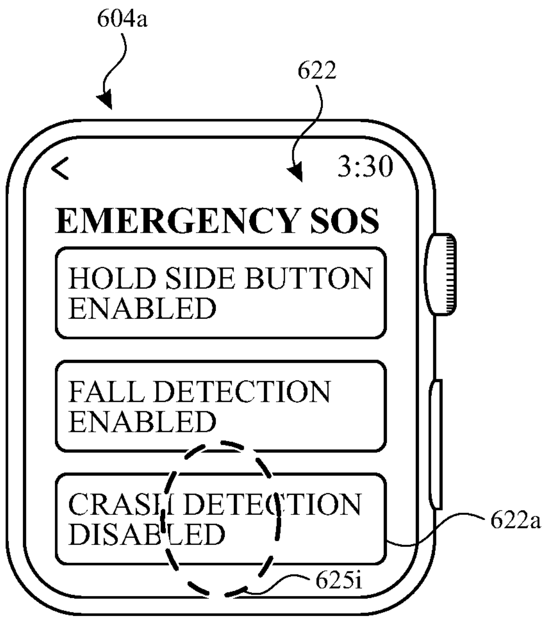

FIGS. 6I-6L illustrate exemplary user interfaces for enabling and/or disabling a crash detection feature, such as the feature described with reference to FIGS. 6A-6H. In FIG. 6I, computer system 604*a* displays user interface 608. In response to detecting selection 625*g* of settings application icon 608*a*, computer system 604*a* displays settings interface 620 as shown in FIG. 6J. Settings interface 620 includes a menu of items associated with various features, functions, and/or applications of computer system 604*a*, including emergency settings option 620*a*. In response to detecting selection 625*h* of emergency settings option 620*a*, computer system 604*a* displays emergency settings interface 622 as shown in FIG. 6K. Emergency settings interface 622 includes options associated with various emergency features of computer system 604*a*, including crash detection settings option 622*a*. The options included in emergency settings interface 622 include an indication (e.g., text and/or a graphical representation) of the emergency feature associated with the option (e.g., "Hold side button" to call emergency services or to display an option to call emergency services, "Fall Detection", and "Crash Detection) and an indication of a status of the feature (e.g., enabled or disabled). For example, in FIG. 6K, crash detection settings option 622*a* includes the text "Crash Detection" to indicate the feature associated with crash detection settings option 622*a* and the text "Disabled" to indicate that the crash detection feature is disabled (e.g., turned off and/or inactive).

Figure 6L:
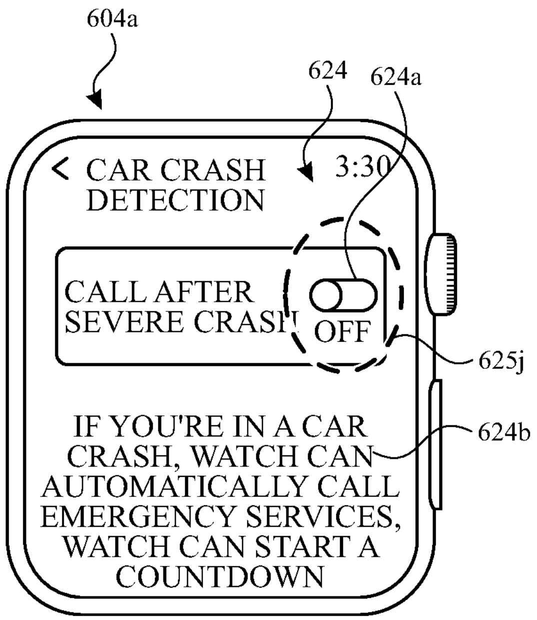

In response to detecting selection 625*i* of crash detection settings option 622*a*, computer system 604*a* displays a user interface for selecting, setting, and/or changing one or more settings and/or parameters associated with a crash detection feature of computer system 604*a*. In some embodiments, the crash detection feature of computer system 604*a* includes the ability of computer system 604*a* to detect a crash, to determine that a crash has occurred, and/or to perform the features described with reference to FIGS. 6B-6H after a crash is detected, such as making a call to emergency services (e.g., in response to obtaining an indication that a crash has occurred or been detected). For example, as shown in FIG. 6L, in response to detecting selection 625*i* of crash detection settings option 622*a*, computer system 604*a* displays crash detection settings interface 624, which includes crash detection state option 624*a* (e.g., a toggle button and/or a switch) and feature description 624*b*. Feature description 624*b* describes the crash detection feature associated with crash detection settings interface 624 and/or crash detection settings option 622*a* (e.g., "If you're in a car crash, watch can automatically call emergency services. Watch can start a countdown and call emergency services when the countdown expires."). In response to detection selection 625*j* of crash detection state option 624*a*, computer system 604*a* sets a state of the crash detection feature. For example, in FIG. 6L, since the crash detection feature is in a disabled (or off) state, computer system 604*a* enables (or turns on) the crash detection feature in response to detecting selection of crash detection state option 624*a* and, optionally, changes the appearance of crash detection state option 624*a* (e.g., moves the circle to the right side of crash detection state option 624*a* and/or changes the text "OFF" to "ON").

FIGS. 6M-6Q illustrate exemplary user interfaces displayed by computer system 604*b* after a crash is detected, in accordance with some embodiments. In some embodiments, the user interfaces displayed in FIGS. 6M-6Q are displayed in addition to, concurrently with, or instead of the user interfaces displayed by computer system 604*a* described with reference to FIGS. 6B-6H.

Figure 6M:
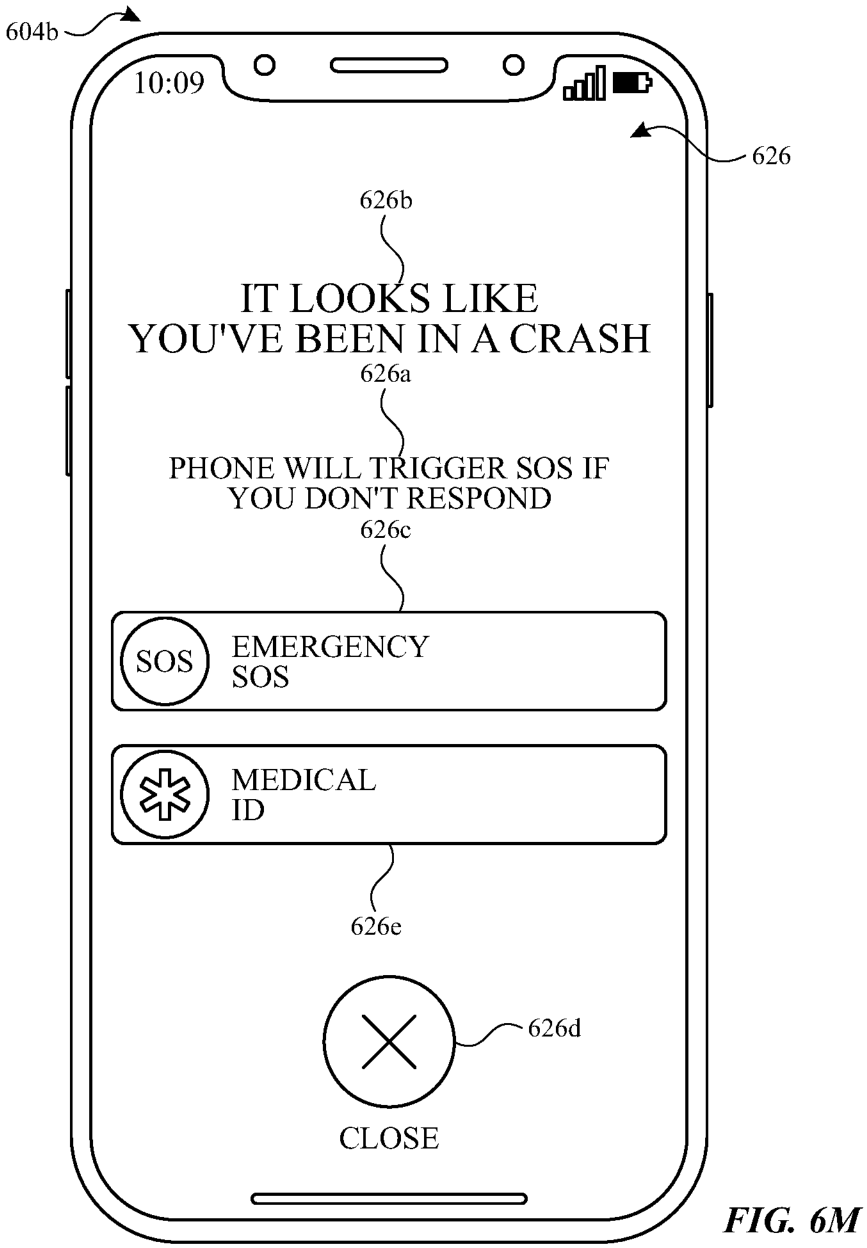

In response to obtaining an indication that the crash has been detected, computer system 604*b* displays crash detection interface 626 as shown in FIG. 6M. Crash detection interface 626 includes response prompt 626*a*, crash detection indicator 626*b*, communication option 626*c*, medical ID option 626*e*, and close option 626*d*. Crash detection indicator 626*b* includes an indication, such as text (e.g., "It looks like you've been in a crash"), a graphic, animation, color, and/or font, that a crash has occurred (e.g., similar or the same as crash detection indicator 612*b*).

Response prompt 626*a* prompts a user to respond to the information and options displayed in crash detection interface 626 (e.g., to select communication option 626*c*, medical ID option 626*e*, or close option 626*d*) and informs the user that computer system 604*b* will initiate an emergency feature (e.g., initiate an SOS feature and/or automatically call emergency services) if computer system 604*b* does not detect a response. In response to detecting selection of (e.g., a tap and/or swipe on) medical ID option 626*e*, computer system 604*b* displays information of a user associated with computer system 604*a* that can be relevant to a medical condition of the user (e.g., name, age, weight, height, blood type, medications, allergies, medical conditions, a designated contact, and/or contact information of the designated contact). In response to detecting selection of close option 626*d* (e.g., a tap on close option 626*d* and/or other input selecting close option 626*d*), computer system 604*b* ceases display of crash detection interface 626 and, optionally, displays (e.g., returns to) user interface 610.

Figure 6N:
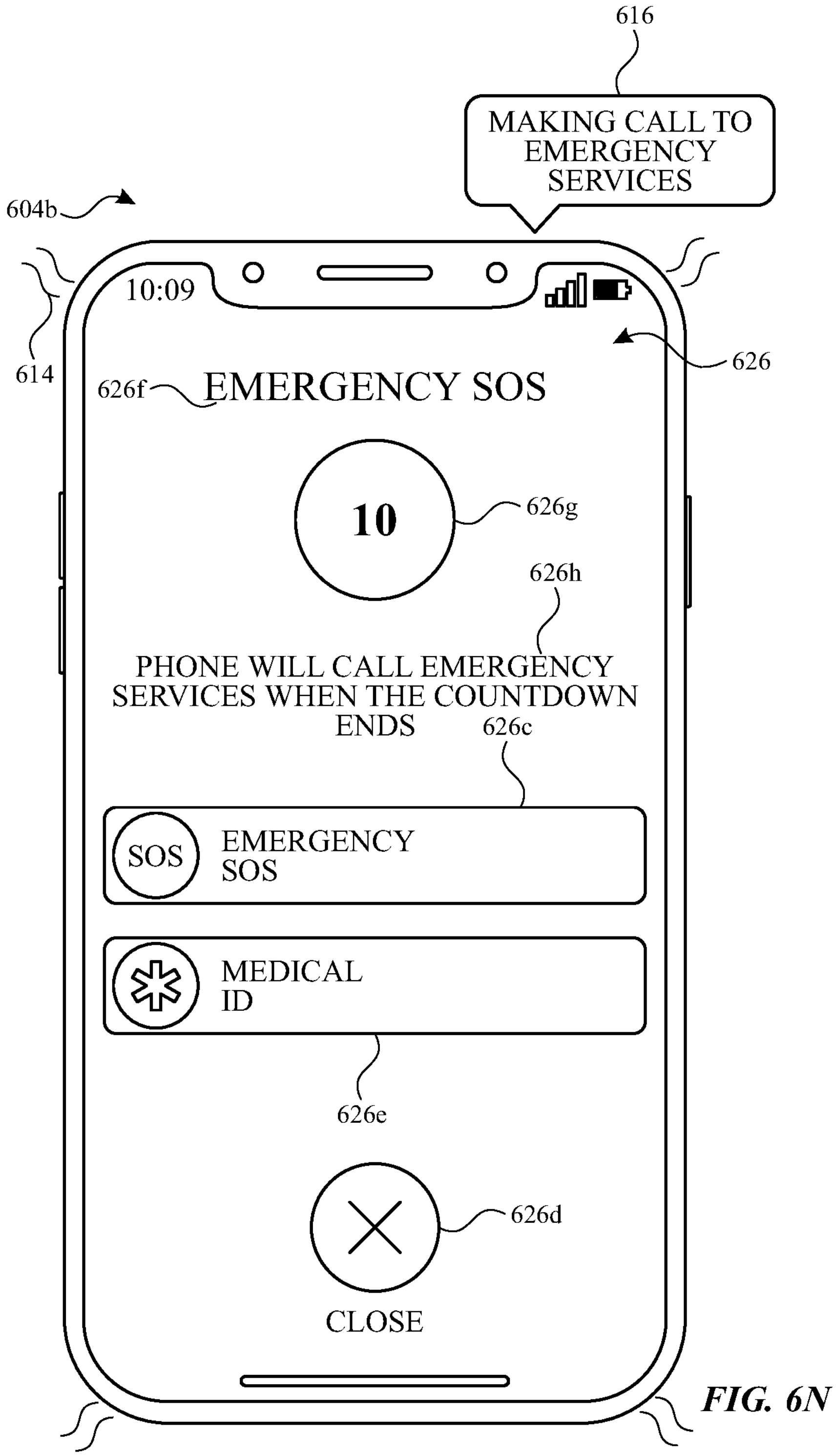

In accordance with (or, optionally, in response to) a determination that a time threshold is satisfied without detecting an input (e.g., without detecting selection of communication option 626*c* or selection of close option 626*d*), computer system 604*b* displays emergency communication indicator 626*f* (e.g., "Emergency SOS"), communication alert 626*h*, and countdown 626*g*, as shown in FIG. 6N. Communication alert 626*h* indicates that a call to emergency services has been or will be initiated (e.g., when countdown 626*g* ends), and countdown 626*g* indicates an amount of time (e.g., number of seconds) until the call to emergency services will be placed. In accordance with (or, optionally, in response to) a determination that a time threshold is satisfied without detecting an input, computer system 604*b* outputs a non-visual indication that a call to emergency services has been or will be initiated. For example, in FIG. 6N, computer system 604*b* outputs haptic 614 and/or audio output 616 (e.g., "Making call to emergency services") described above with reference to FIG. 6C.

Figure 6O:
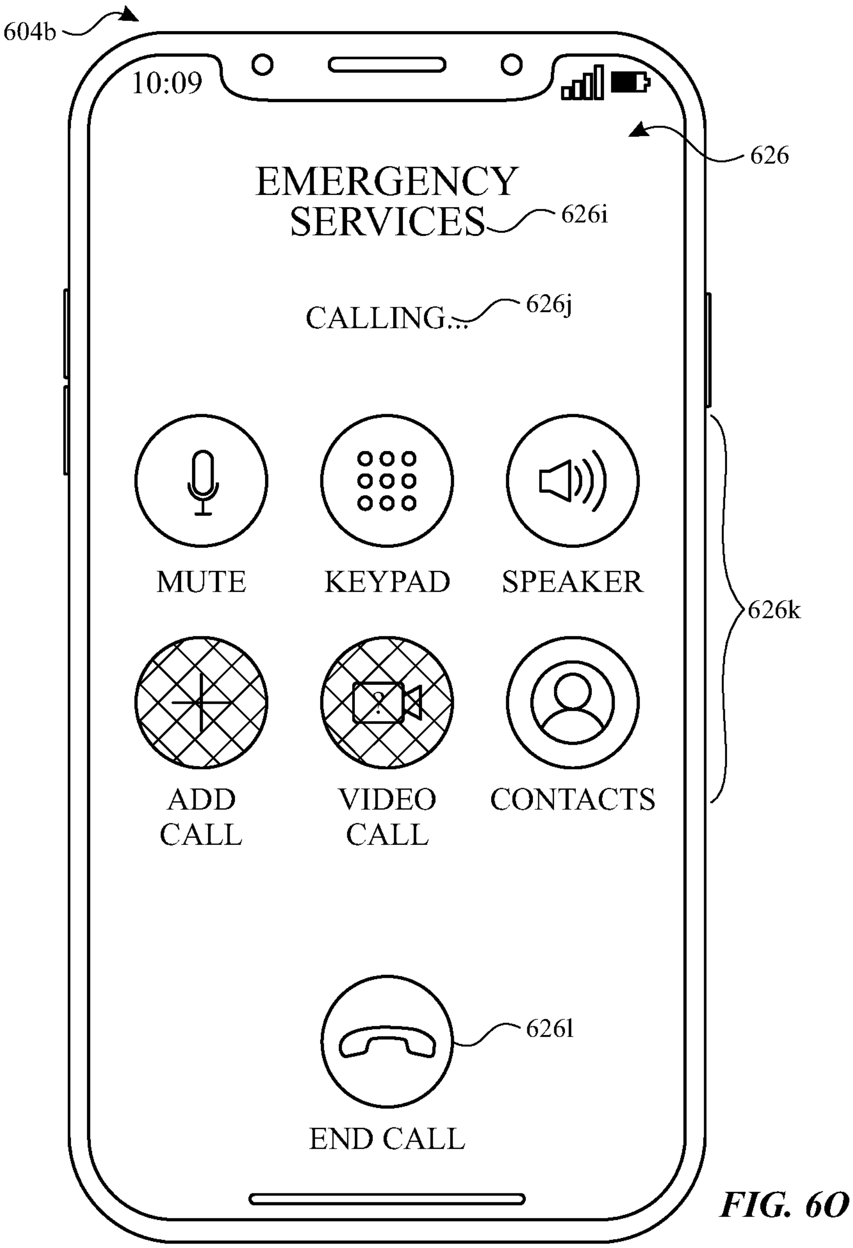

In response to a determination that countdown 626*g* has ended, computer system 604*b* initiates (or attempts to initiate) a call to emergency services. In some embodiments, computer system 604*b* initiates (or attempts to initiate) a call to emergency services in response to detecting selection of (e.g., a tap and/or swipe on) communication option 626*c* (e.g., in FIG. 6M or FIG. 6N). In some embodiments, as shown in FIG. 6O, initiating the call to emergency services includes displaying call status indicator 626*j*, call recipient indicator 626*i*, end call option 6261, and call management options 626*k* (e.g., displaying a call user interface or a user interface of a phone application). Call status indicator 626*j* includes an indication, such as text (e.g., "Calling", "Attempting to connect", or "Connecting"), a graphic, animation, color, and/or font, that indicates a current status of the call. Call recipient indicator 626*i* includes an indication of the recipient of the call, such as text (e.g., "Emergency Services") and/or a graphical representation (e.g., an image of the recipient, an icon associated with the recipient, and/or initials of the recipient). In some embodiments, in response to detecting selection of end call option 6261 (e.g., a tap on end call option 6261 and/or other input selecting end call option 6261), computer system 604*b* ends the call or stops attempting to initiate the call. Call management options 626*k* include selectable options for activating corresponding features related to the call (e.g., mute, display keypad, enable/disable speaker, add call, initiate video call, and/or display contacts).

Figure 6P:
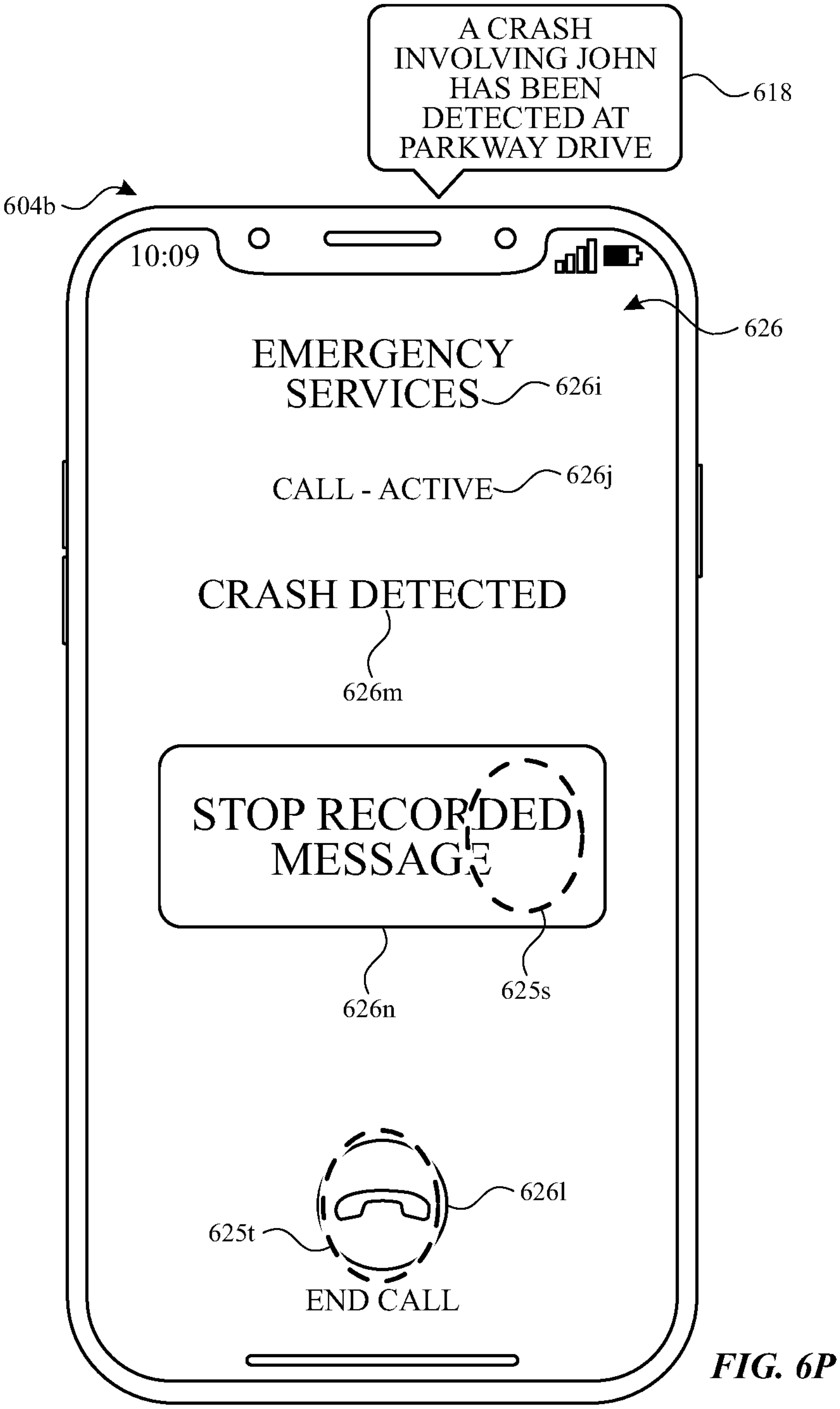

In response to establishing the call with emergency services (e.g., when emergency services answers the call and/or the call becomes active), computer system 604*b* updates call status indicator 626*j* (e.g., to "Call—Active") and displays crash detected indicator 626*m*, as shown in FIG. 6P.

In some embodiments, as shown in FIG. 6P, when the call to emergency services is established, computer system 604*b* plays message 618 on the call to emergency services, described above with reference to FIG. 6E. In some embodiments, computer system 604*b* plays message 618 only if the call to emergency services was initiated automatically (e.g., without detecting user input such as selection of communication option 626*c*). Playing message 618 when the call is initiated automatically enables computer system 604*b* to provide information about the crash to emergency services in the event that a user of computer system 604*b* is unable to provide information (e.g., is injured and/or unable to locate computer system 604*b*) and/or does not know that the call has been placed.

In some embodiments, when computer system 604*b* plays message 618, computer system 604*b* displays stop message option 626*n*, as shown in FIG. 6P. In some embodiments, displaying stop message option 626*n* includes ceasing display of (e.g., removing) call management options 626*k* (e.g., replacing call management options 626*k* with stop message option 626*n*).

In response to detecting selection 625*s* of stop message option 626*n*, computer system 604*b* stops playing message 618. In some embodiments, in response to detecting selection 625*s* of stop message option 626*n*, computer system 604*b* ceases display of stop message option 626*n* and, optionally, displays (e.g., re-displays) call management options 626*k*, as shown in FIG. 6O.

In response to detecting selection 625*t* of end call option 6261, computer system 604*b*, initiates a process for ending the call with emergency services. In some embodiments, in response to detecting selection 625*t* of end call option 6261, computer system 604*b* ends the call with emergency services without detecting further input. In some embodiments, in response to detecting selection 625*t* of end call option 6261, computer system 604*b* displays a prompt (e.g., prompt 612*m*) for a user to confirm whether or not to end the call with emergency services and options for continuing the call with emergency services (e.g., continue call option 612*n*) and/or for ending the call with emergency services (e.g., confirm option 6120).

In some embodiments, after ending the call with emergency services (e.g., in response to selection of end call option 6261 in FIG. 6O or FIG. 6P), computer system 604*b* displays an indication that a crash was detected and, optionally, an indication of a device that detected the crash and/or an indication of when the crash was detected. For example, as shown in FIG. 6Q, after ending the call with emergency services, computer system 604*b* displays context indicator 626*o* (e.g., "Phone detected a crash 1 minute ago"), which indicates that a crash was detected, that the crash was detected by computer system 604*b*, and that the crash was detected one minute ago.

In some embodiments, after ending the call with emergency services (e.g., in response to selection of end call option 6261 in FIG. 6O or FIG. 6P), computer system 604*b* provides an option to initiate (e.g., re-initiate) communication with emergency services and/or an option to provide information of a user associated with computer system 604*b* that can be relevant to a medical condition of the user (e.g., name, age, weight, height, blood type, medications, allergies, medical conditions, a designated contact, and/or contact information of the designated contact). For example, as shown in FIG. 6Q, after ending the call with emergency services, computer system 604*b* displays communication option 626*c* and medical ID option 626*e*. In response to detecting selection of communication option 626*c* (e.g., a tap and/or swipe on communication option 626*c*), computer system 604*b* attempts to initiate (e.g., re-initiate) a call to emergency services. In response to detecting selection of medical ID option 626*e* (e.g., a tap and/or swipe on medical ID option 626*e*), computer system 604*b* displays information of a user associated with computer system 604*b* that can be relevant to a medical condition of the user (e.g., name, age, weight, height, blood type, medications, allergies, medical conditions, a designated contact, and/or contact information of the designated contact).

Figure 6R:
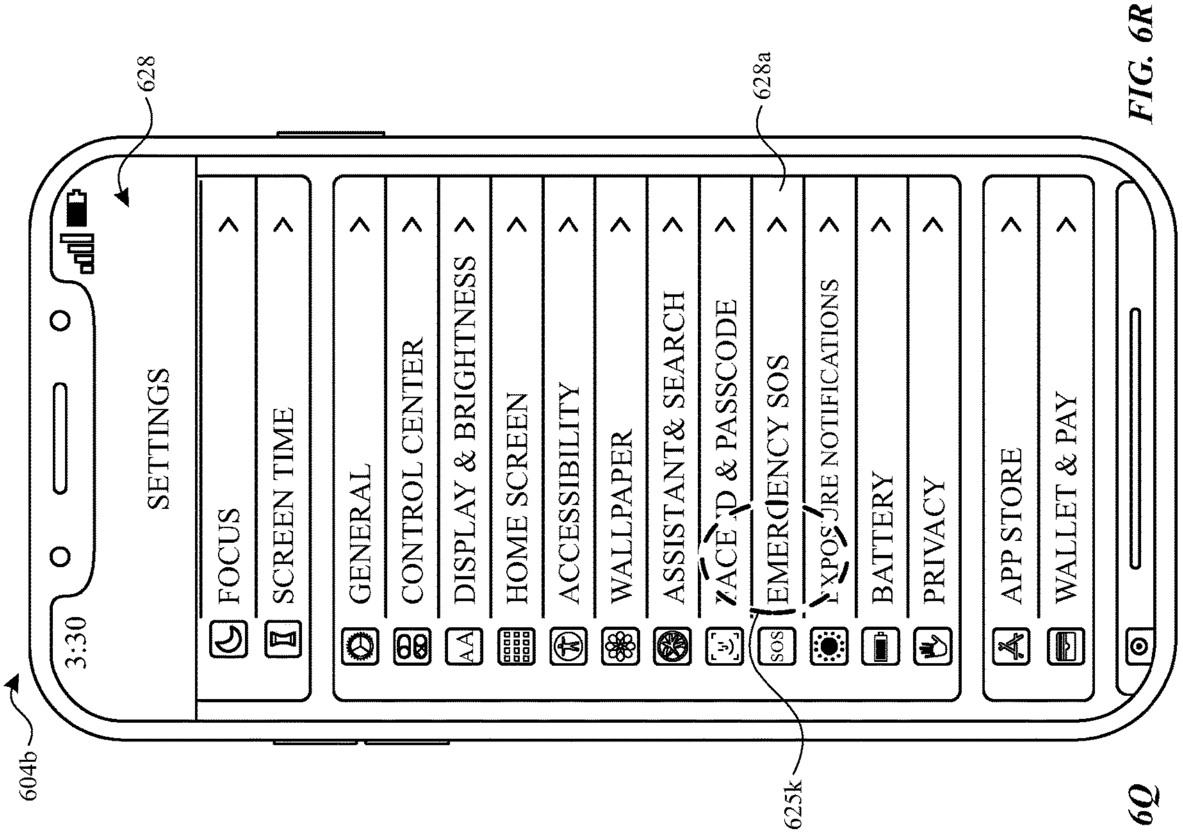
Figure 6Q:
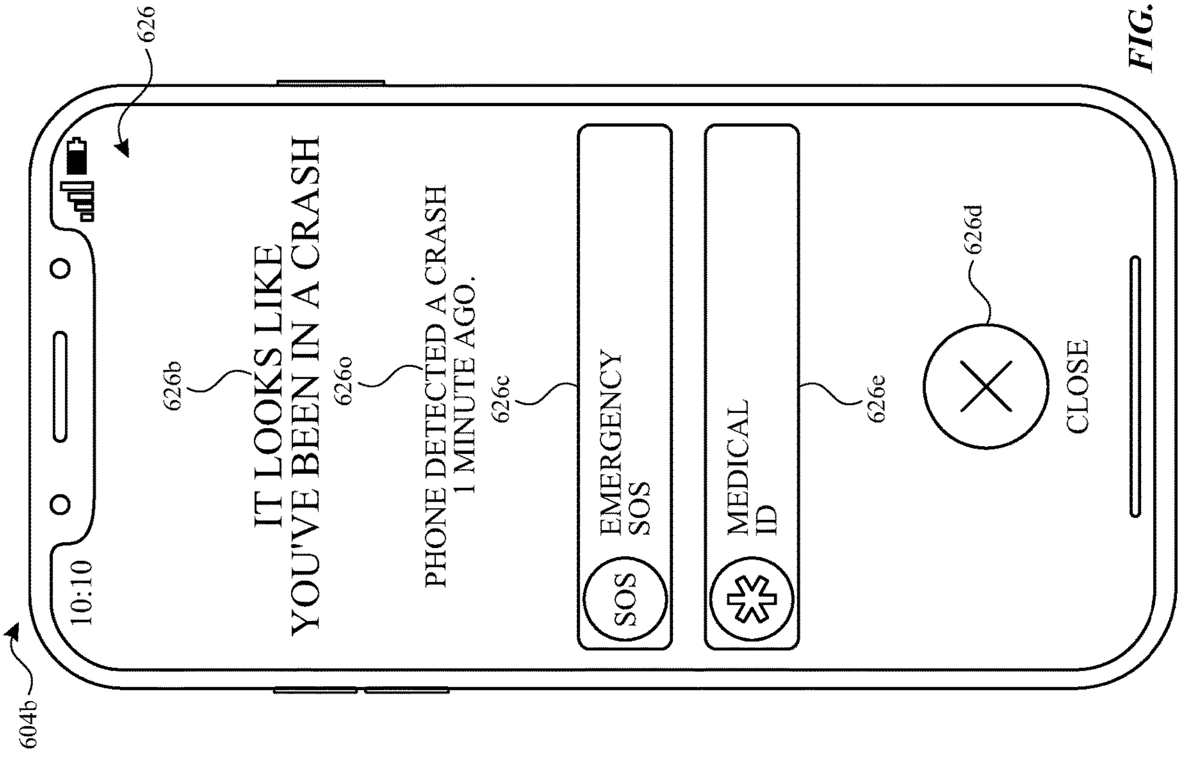

FIGS. 6R-6U illustrate exemplary user interfaces for enabling and/or disabling a crash detection feature, such as the feature described with reference to FIGS. 6A-6H and/or the feature described with reference to FIGS. 6M-6Q. In FIG. 6R, computer system 604*b* displays settings interface 628. Settings interface 628 includes a menu of items associated with various features, functions, and/or applications of computer system 604*b*, including emergency settings option 628*a*.

Figure 6T:
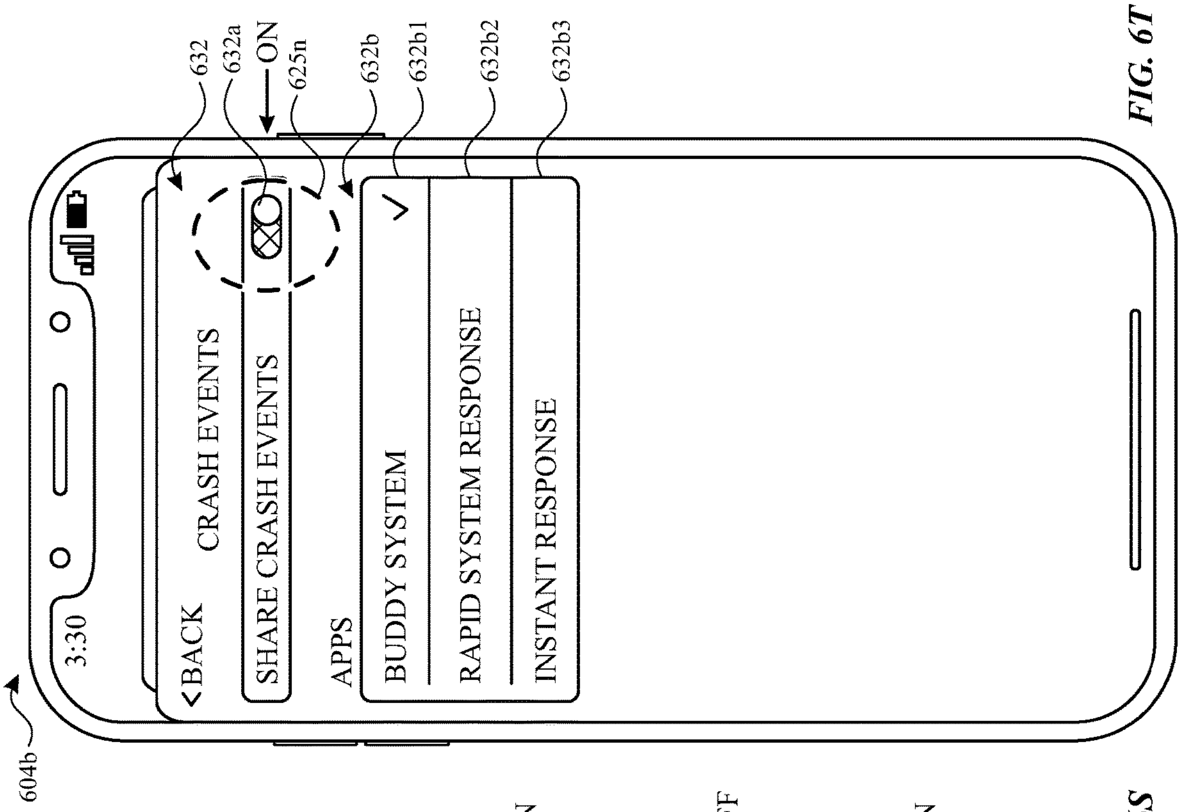
Figure 6S:
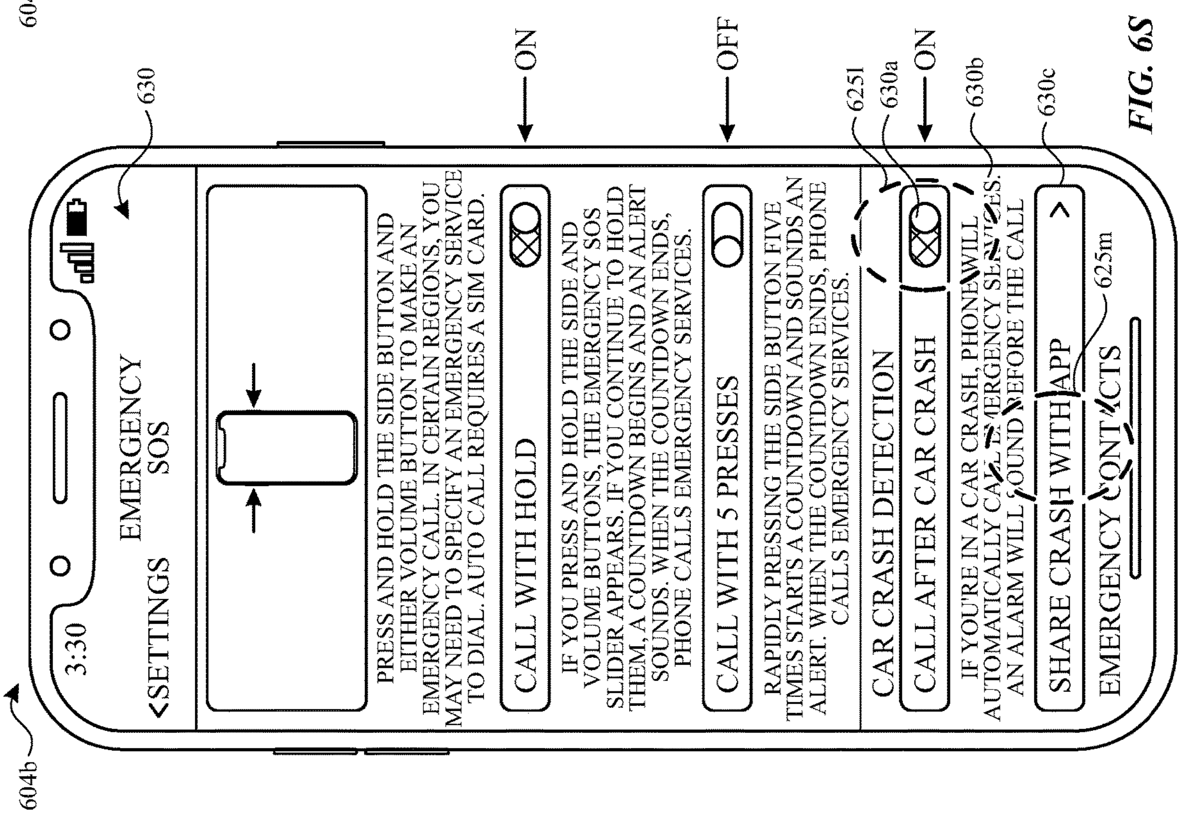

In response to detecting selection 625*k* of emergency settings option 628*a*, computer system 604*b* displays emergency settings interface 630 as shown in FIG. 6S. Emergency settings interface 630 includes options associated with various emergency features of computer system 604*b*, including a crash detection feature. In some embodiments, the crash detection feature of computer system 604*b* includes the ability of computer system 604*a* to detect a crash, to determine that a crash has occurred, and/or to perform the features described with reference to FIGS. 6B-6H after a crash is detected, such as making a call to emergency services (e.g., in response to obtaining an indication that a crash has occurred or been detected).

Emergency settings interface 630 includes options for selecting, setting, and/or changing one or more settings and/or parameters associated with emergency features of computer system 604*b*. For example, in FIG. 6S, emergency settings interface 630 includes text "Car Crash Detection" and "Call after car crash" to indicate the crash detection feature and a call after crash state option 630*a* (e.g., a toggle button and/or a switch) and feature description 630*b*. Feature description 630*b* describes the crash detection feature associated with call after crash state option 630*a* (e.g., "If you're in a car crash, phone will automatically call emergency services. An alarm will sound before the call.").

In response to detection selection 625*l* of call after crash state option 630*a*, computer system 604*b* sets a state of the crash detection feature (or call after crash feature). For example, in FIG. 6S, since the crash detection feature is in an enabled (or on) state, computer system 604*b* disables (or turns off) the crash detection feature in response to detecting selection of call after crash state option 630*a* and, optionally, changes the appearance of call after crash state option 630*a* (e.g., moves the circle to the left side of call after crash state option 630*a*).

In some embodiments, computer system 604*b* can share data about a detected crash (also referred to as "crash data") with an application (e.g., a native application or a third party application) on computer system 604*b*. In FIG. 6S, emergency settings interface 630 includes crash data sharing option 630*c* associated with settings for sharing crash data with an application. In response to detecting selection 625*m* of crash data sharing option 630*c*, computer system 604*b* displays crash data sharing settings interface 632 shown in FIG. 6T. Crash data sharing settings interface 632 includes sharing state option 632*a*. Sharing state option 632*a* can be selected to set, change, or select a state of the ability of computer system 604*b* to share crash data with an application.

In FIG. 6T, the capability of computer system 604*b* to share crash data with an application is enabled (e.g., turned on). When the capability of computer system 604*b* to share crash data with an application is enabled, crash data sharing settings interface 632 includes application menu 632*b*, which includes a set (e.g., a list) of application options 632*b*1, 632*b*2, and 632*b*3 corresponding to respective applications with which computer system 604*b* can share crash data. The check mark in application option 632*b*1 indicates that computer system 604*b* is configured to share crash data with an application called "Buddy System" if a crash is detected. In some embodiments, in response to selection of an application option (e.g., a tap on an application option or other input selecting an application option), computer system 604*b* selects the corresponding application to share crash data with if a crash is detected. For example, in response to detecting selection of application option 632*b*2 (e.g., a tap on application option 632*b*2 and/or other input selecting application option 632*b*2), computer system 604*b* is configured to share crash data with an application named "Rapid System Response" and, optionally, visually indicates that application option 632*b*2 is selected (e.g., displays a check mark on the right side of application option 632*b*2). In some embodiments, computer system 604*b* is configured to (or is capable of) sharing crash data with only a single application. For example, in response to detecting selection of an application option other than a currently designated application option, computer system 604*b* de-selects the currently designated application option and designates the selected application option.

In response to detecting selection 625*n* of sharing state option 632*a* in FIG. 6T, because the ability to share crash data with an application is enabled, computer system 604*b* disables the ability to share crash data with an application. In some embodiments, as shown in FIG. 6U, when the ability to share crash data with an application is disabled, crash data sharing settings interface 632 does not display applications menu 632*b* (e.g., computer system 604*b* removes display of application menu 632*b* in response to the ability to share crash data with an application being disabled).

Figure 6V:
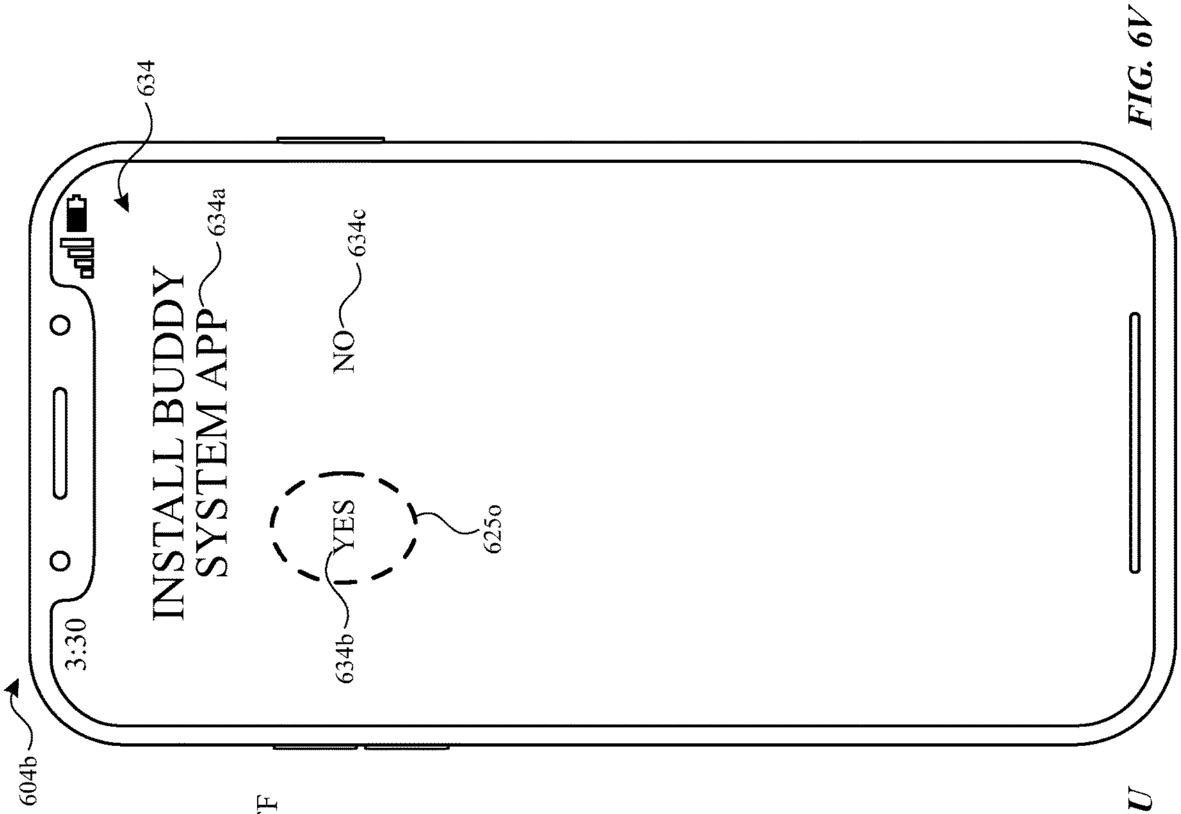
Figure 6U:
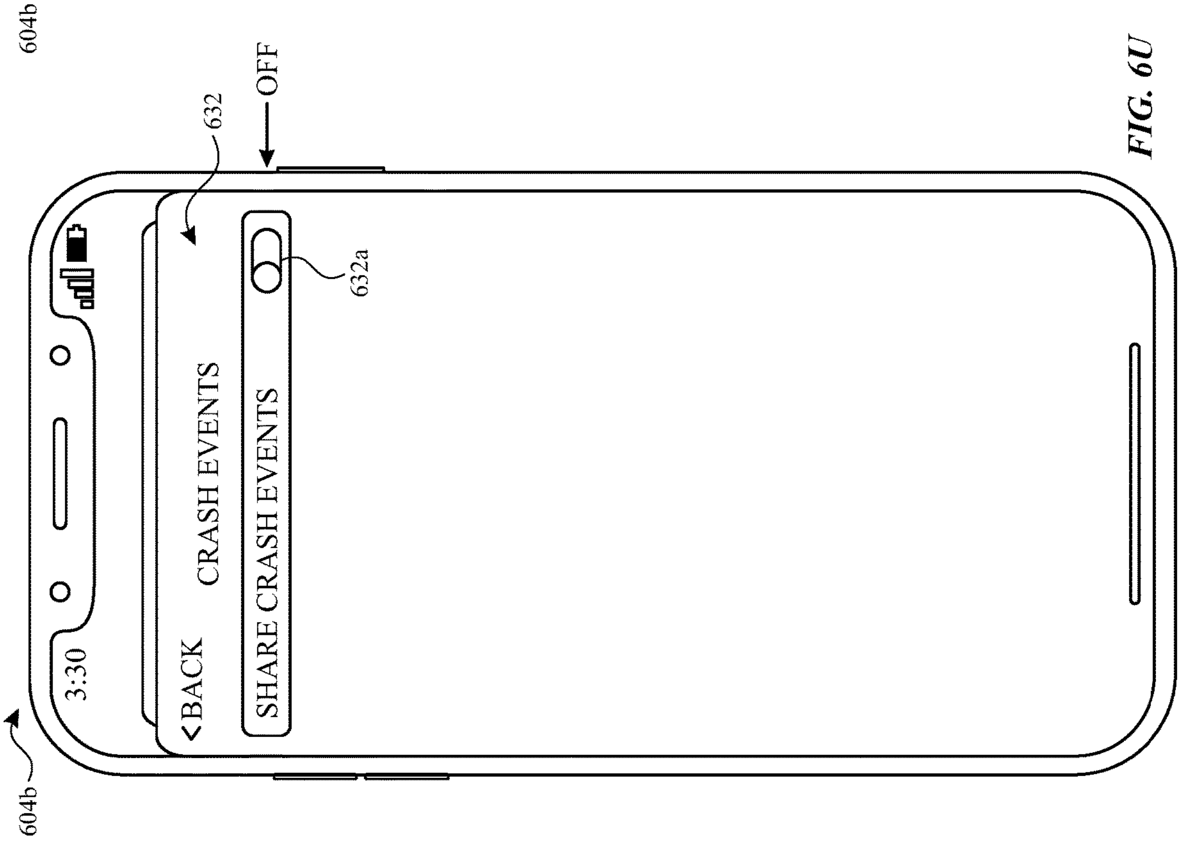
Figure 6W:
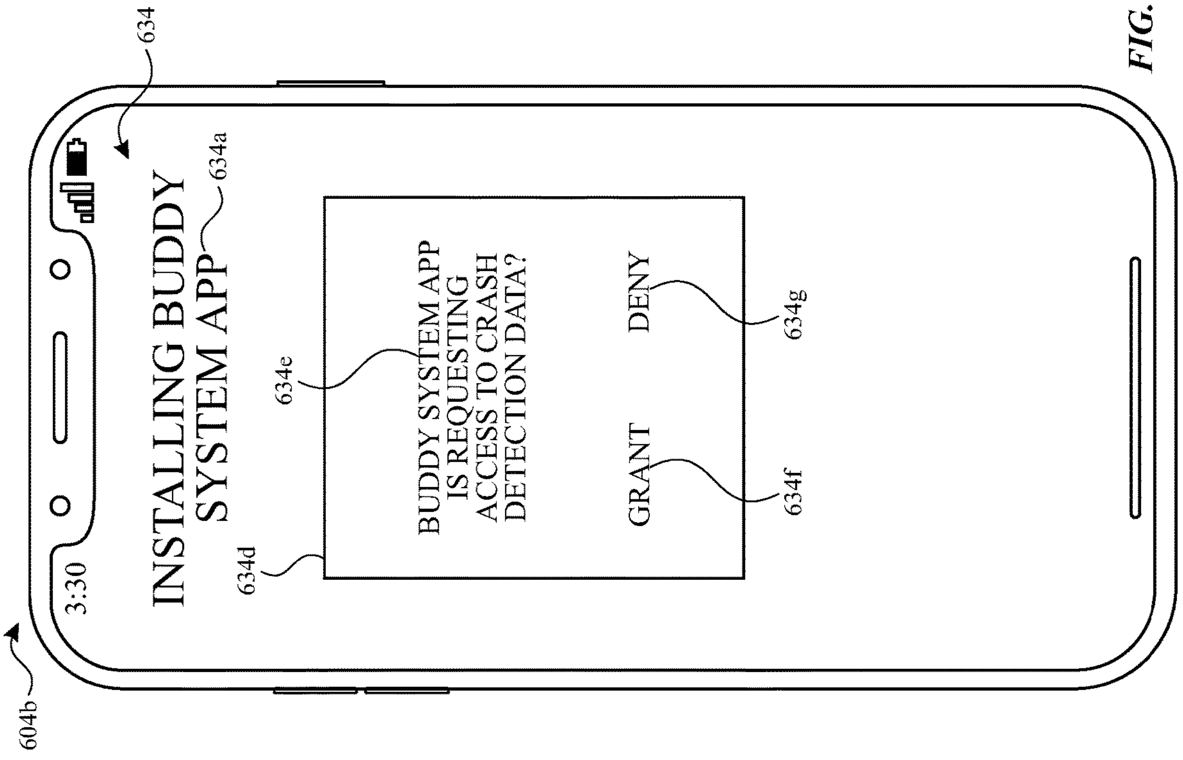

FIGS. 6V-6W illustrate exemplary user interfaces for granting or denying a request by an application to receive crash data from computer system 604*b* (e.g., a request for computer system 604*b* to share crash data with an application when a crash is detected). In FIG. 6V, computer system 604*b* displays application installation confirmation interface 634 corresponding to an application called Buddy System. In some embodiments, computer system 604*b* displays application installation confirmation interface 634 in response to a request (e.g., a user request or a system request) to install the corresponding application. Application installation confirmation interface 634 includes application identifier 634*a*, install option 634*b*, and decline option 634*c*. Application identifier 634*a* indicates the application that is being requested to be installed. In response to detecting selection of decline option 634*c* (e.g., a tap on decline option 634*c* and/or other input selecting decline option 634*c*), computer system 604*b* does not install the application. In response to detecting selection 625*o* of install option 634*b*, computer system 604*b* proceeds with a process of installing the application.

In some embodiments, the process of installing the application includes a request by the application being installed to access crash data (e.g., for computer system 604*b* to share crash data with the application being installed). In response to receiving the request to access crash data, computer system 604*b* prompts the user to grant or deny the request to access crash data. For example, in response to receiving the request to access crash data, computer system 604*b* displays prompt 634*d* shown in FIG. 6W. Prompt 634*d* includes description 634*e*, grant option 634*f*, and deny option 634*g*. Description 634*e* describes what the user is being prompted to do. In response to selection of deny option 634*g* (e.g., a tap on deny option 634*g* and/or other input selecting deny option 634*g*), computer system 604*b* does not configure computer system 604*b* to be able to share crash data with the application being installed. For example, if deny option 634*g* is selected, the application being installed is not displayed in application menu 632*b*. In response to detecting selection of grant option 634*f* (e.g., a tap on grant option 634*f* and/or other input selecting grant option 634*f*), computer system 604*b* is configured to share crash data with the application being installed (e.g., the application being installed is displayed in application menu 632*b*. In some embodiments, in response to detecting selection of grant option 634*f*, computer system 604*b* designates the application being installed as the application with which crash data will be shared if a crash is detected (e.g., a de-selects a previously designated application).

In some embodiments, computer system 604*b* performs a setup process that includes displaying a set of one or more user interfaces that inform a user about features available on computer system 604*b*. In some embodiments, the setup process is performed when computer system 604*b* is initially turned on, when computer system 604*b* is first used after an upgrade (e.g., a software and/or operating system upgrade), and/or when computer system is first used after being reset.

Figure 6X:
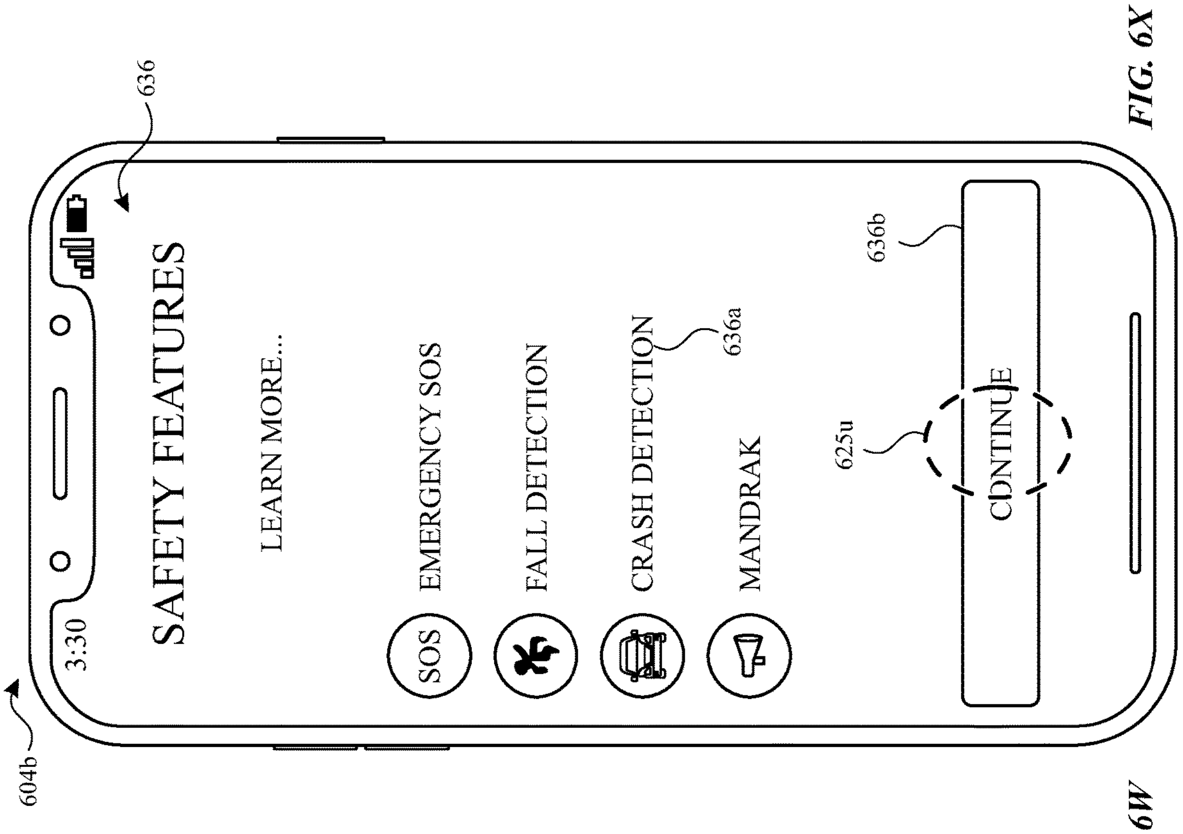

FIG. 6X illustrates exemplary safety features interface 636 displayed during a setup process. Safety features interface 636 includes a list of safety features available on computer system 604*b*, including crash detection option 636*a* corresponding to the crash detection features described herein. In some embodiments, in response to detecting selection of crash detection option 636*a* (e.g., a tap on crash detection option 636*a* and/or other input selecting crash detection option 636*a*), computer system 604*b* displays emergency settings interface 630 described with reference to FIG. 6S or crash detection interface 640 described with reference to FIG. 6Z.

Figure 6Z:
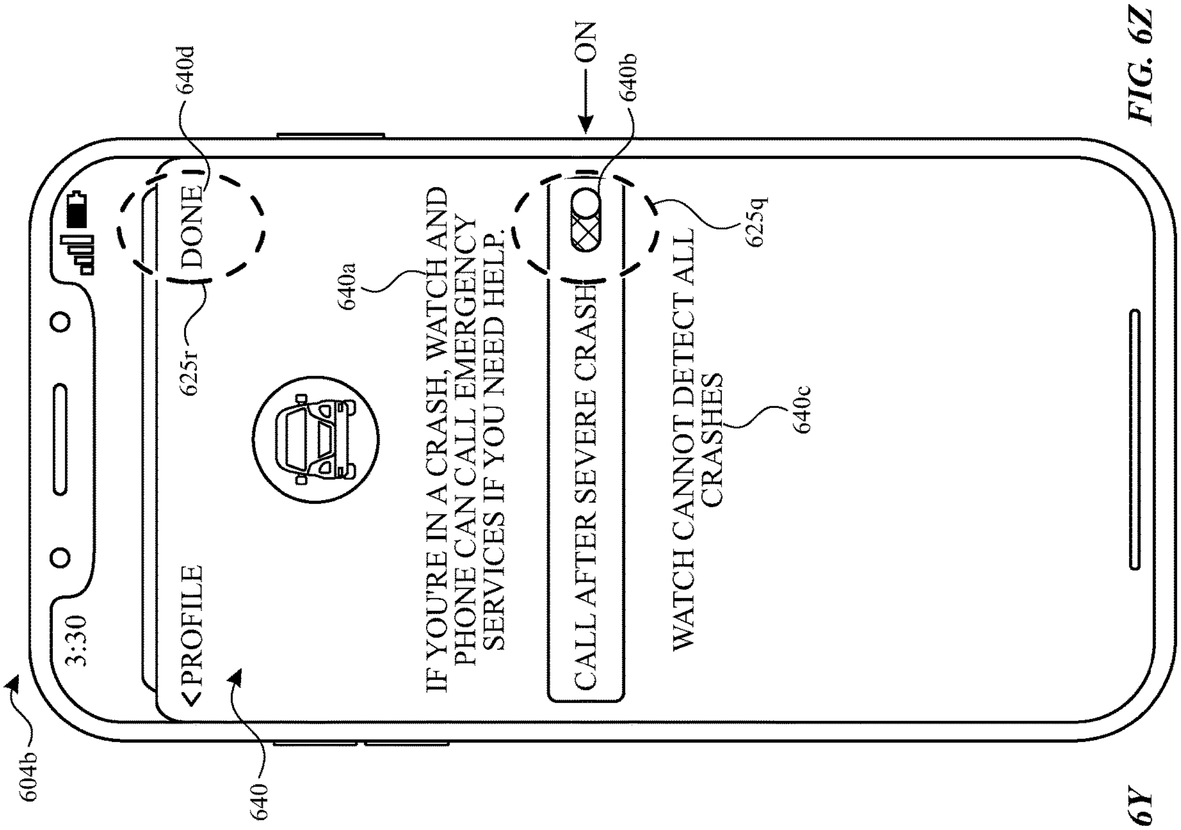
Figure 6Y:
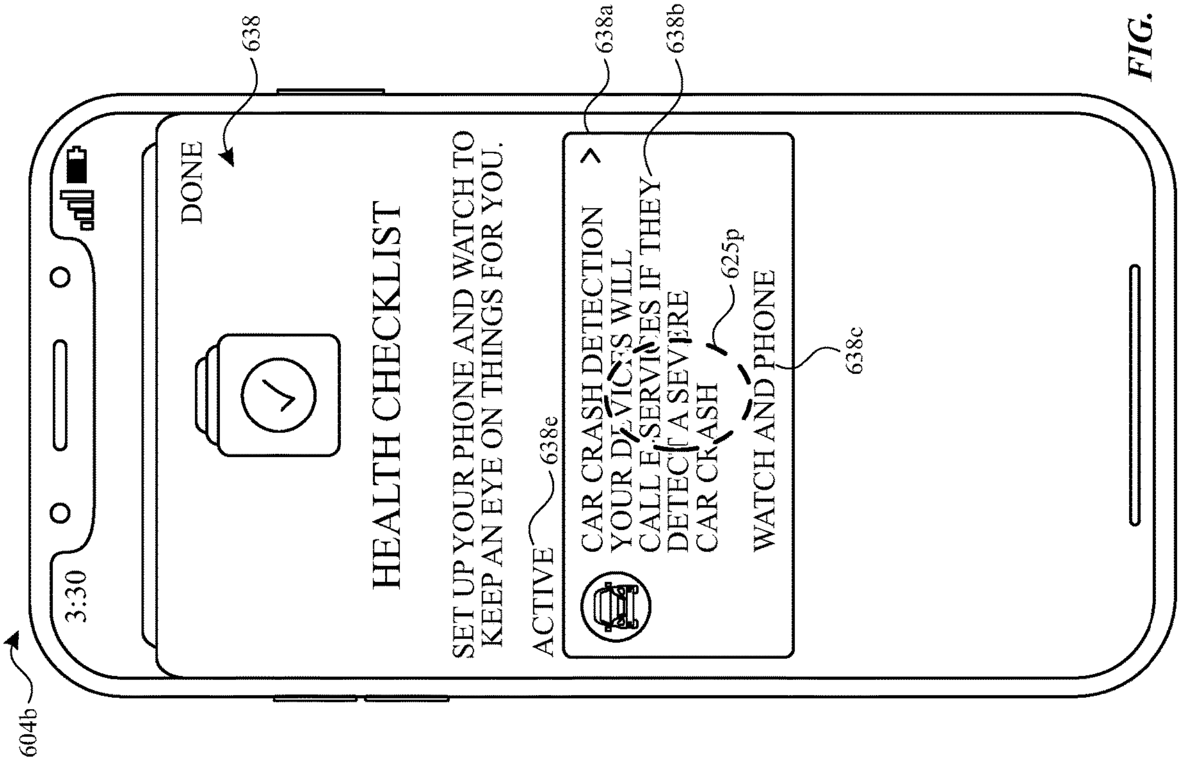
Figure 6A:
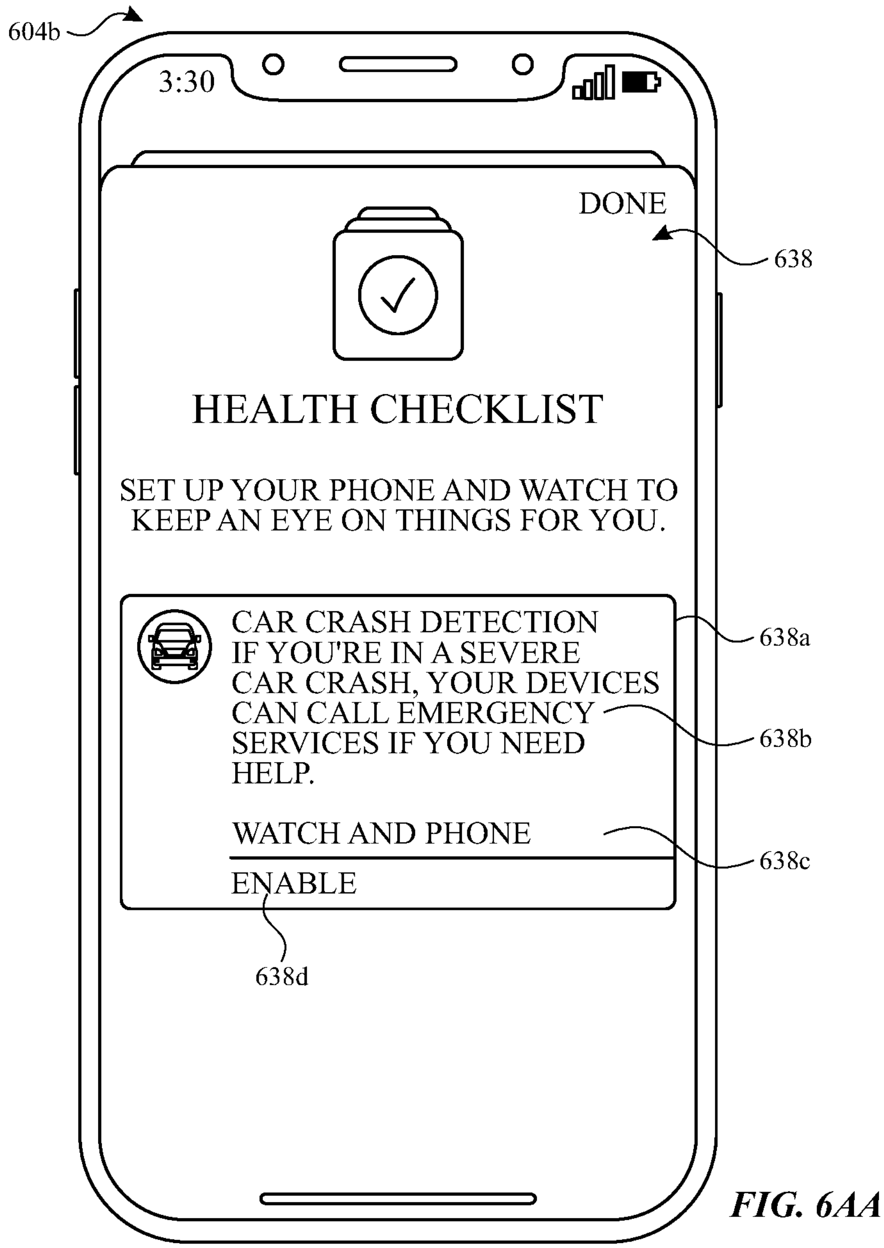

FIG. 6Y illustrates exemplary health checklist interface 638 displayed during a setup process. In some embodiments, computer system 604*b* displays health checklist interface 638 in response to detecting selection 625*u* of continue option 636*b* in safety features interface 636. Health checklist interface 638 displays information and/or options for features related to the health of a user. For example, health checklist interface 638 includes crash detection element 638*a*, description 638*b* describing that emergency services will be called if a crash is detected, and device indicator 638*c*. Feature status indicator 638*e* indicates that the crash detection feature represented by crash detection element 638*a* is active (e.g., enabled and/or turned on). Device indicator 638*c* includes a representation (e.g., text and/or an image) of one or more devices that are capable of detecting a crash and/or initiating a call to emergency services after a crash is detected, if enabled to do so. In FIG. 6Y, device indicator 638*c* indicates that a watch (e.g., computer system 604*a*) and a phone (e.g., computer system 604*b*) are capable of being enabled to detect a crash and/or initiate a call to emergency services after a crash is detected.

In response to detecting selection 625*p* of crash detection element 638*a*, computer system 604*b* displays crash detection interface 640, as shown in FIG. 6Z. Crash detection interface 640 includes description 640*a* of the crash detection feature (e.g., "If you're in a crash, watch and phone can call emergency services if you need help"), call after crash status option 640*b*, and device capability indicator 640*c*. Call after crash status option 604*b* indicates that the ability to detect a crash and/or initiate a call to emergency services after a crash is detected is enabled. Description 640*a* indicates that computer system 604*a* (e.g., watch) and computer system 604*b* (e.g., phone) can call emergency services, and device capability indicator 640*c* indicates that computer system 604*a* (e.g., watch) cannot detect all crashes.

In response to detecting selection 625*q* of call after crash status option 640*b*, computer system 604*b* disables the capability to detect a crash and/or call emergency services after a crash is detected. After disabling the capability to detect a crash and/or call emergency services after a crash is detected, computer system detects selection 625*r* of done option 640*d*. In response to detecting selection 625*r* of done option 640*d*, computer system 604*b* displays (e.g., returns to) health checklist interface 638, as shown in FIG. 6AA. In FIG. 6AA, because the capability to detect a crash and/or call emergency services after a crash is detected is disabled, computer system 604*b* does not display feature status indicator 638*e* (or, optionally, displays feature status indicator 638*e* with a status of, e.g., "Inactive" or "Disabled"), and description 638*b* reflects that emergency services can (e.g., as opposed to "will") be called. Device indicator 638*c* indicates that a watch (e.g., computer system 604*a*) and a phone (e.g., computer system 604*b*) are capable of being enabled to detect a crash and/or initiate a call to emergency services after a crash is detected. Because the capability to detect a crash and/or call emergency services after a crash is detected is disabled, computer system 604*b* displays (e.g., in crash detection element 638*a*) enable option 638*d* for enabling the capability to detect a crash and/or call emergency services after a crash is detected. In some embodiments, computer system 604*b* enables the capability to detect a crash and/or call emergency services after a crash is detected in response to detecting selection of enable option 638*d* (e.g., a tap on enable option 638*d* and/or other input selecting enable option 638*d*). In some embodiments, computer system 604*b* displays crash detection interface 640 in response to detecting selection of enable option 638*d*, with call after crash status option 640*b* indicating that the capability to detect a crash and/or call emergency services after a crash is detected is disabled (e.g., call after crash status option 640*b* is in the off state).

FIG. 7 is a flow diagram illustrating a method for initiating communication in the event of a crash using a computer system in accordance with some embodiments. Method 700 is performed at a computer system (e.g., 100, 300, 500, 604*a*, 604*b* a smartphone, a smartwatch, a vehicle display system, a vehicle information system, a vehicle infotainment system, a tablet computer, a desktop computer, a laptop computer, and/or a head-mounted device (e.g., a head-mounted augmented reality and/or extended reality device)) that is in communication with (e.g., includes and/or is connected to) a display generation component (e.g., 606*a*, 606*b*, a display, a touch-sensitive display, a monitor, a display controller, a touch-sensitive display system, a projector, a holographic display, and/or a head-mounted display system) and one or more input devices (e.g., 606*a*, 606*b*, a touch-sensitive surface, a keyboard, a mouse, a trackpad, a joystick, a remote control, a microphone, one or more optical sensors for detecting gestures, one or more capacitive sensors for detecting hover inputs, an accelerometer, a gyroscope, and/or an inertial measurement unit). Some operations in method 700 are, optionally, combined, the orders of some operations are, optionally, changed, and some operations are, optionally, omitted.

As described below, method 700 provides an intuitive way for initiating communication in the event of a crash. The method reduces the cognitive burden on a user for initiating communication in the event of a crash, thereby creating a more efficient human-machine interface. For battery-operated computing devices, enabling a user to initiate communication in the event of a crash faster and more efficiently conserves power and increases the time between battery charges.

The computer system obtains (702) (e.g., receives or detects) data indicating that a crash (e.g., a crash, accident, and/or impact involving a vehicle such as, for example, a car, truck, motorcycle, scooter, bus, bike, boat, train, plane, wheelchair, golf cart, or all-terrain vehicle (ATV); the crash illustrated in 600 of FIG. 6A) has occurred (or, in some embodiments, that a crash has been detected). In some embodiments, obtaining the data indicating that a crash has occurred includes detecting a crash and/or determining that a crash has occurred (e.g., based on detected motion, parameters, and/or conditions). In some embodiments, detecting a crash includes detecting (e.g., via one or more sensors, such as a motion sensor, accelerometer, gyroscope, inertial measurement unit, biometric sensor, and/or microphone) motion (e.g., linear and/or angular velocity and/or linear and/or angular acceleration), sound, biometric parameters (e.g., blood pressure, blood oxygen level, pulse, and/or heart rate), and/or other parameters or conditions. In some embodiments, determining that a crash has occurred includes determining that detected parameters or conditions satisfy a set of crash criteria (e.g., a motion threshold, a motion profile, a velocity threshold, a velocity profile, an acceleration threshold, an acceleration profile, a blood pressure threshold, a blood oxygen threshold, a pulse threshold, a heart rate threshold, a sound profile, a sound amplitude threshold, a sound frequency, and/or a sound frequency range). In some embodiments, the computer system detects the crash (e.g., using sensors of the computer system; the crash is detected by the computer system). In some embodiments, the computer system determines that a crash has occurred. In some embodiments, one or more external devices (e.g., one or more remote sensors, servers, and/or computer systems) that are not part of the computer system (e.g., one or more remote devices) detect a crash and/or determine that a crash has occurred. In some embodiments, one or more external devices that detect a crash and/or determine that a crash has occurred send data indicating that a crash has occurred to the computer system and/or to a remote server. In some embodiments, obtaining data indicating that a crash has occurred includes receiving data indicating that a crash has occurred (e.g., from a remote server and/or from one or more remote devices that detected and/or determined that a crash has occurred). In some embodiments, the computer system is not capable of detecting a crash and/or determining that a crash has occurred. In some embodiments, the computer system is in communication (e.g., wired communication, wireless communication, Bluetooth communication, near-field communication, and/or Wi-Fi communication) with an external computer system (e.g., a smartphone, a smartwatch, a tablet computer, one or more sensors of a vehicle, and/or a computer system of a vehicle) that is capable of detecting a crash and/or determining that a crash has occurred. In some embodiments, the computer system obtains (e.g., receives or retrieves) data indicating that a crash has occurred from the external computer system.

In response to obtaining the data indicating that a crash has occurred, the computer system displays (704), via the display generation component, a call option (e.g., 612*c*, 626*c*, a selectable call option, an icon, a button, an affordance, and/or a user-interactive graphical user interface object). In some embodiments, the computer system initiates display of the call option in response to obtaining the data indicating that a crash has occurred (e.g., the call option is not provided, is not displayed, and/or is not available prior to obtaining the data indicating that a crash has occurred). In accordance with a determination that the call option (e.g., 612*c* or 626*c*) has been selected via the one or more input devices (e.g., in response to detecting selection of the call option, such as selection 625*a*), the computer system initiates (706) a process to call a predetermined number (or a contactable entity, such as a person, service, or business) associated with the call option. In some embodiments, the call option includes (e.g., is) a graphical object that moves (e.g., slides) in accordance with movement of an input (e.g., a swipe or touch and drag input). In some embodiments, selection of the call option requires moving (e.g., on a display) the graphical object by a predetermined amount and/or to a predetermined location (e.g., from a first position, such a first location and/or first orientation, to a second position, such as a predefined location and/or a predefined orientation). In some embodiments, selection of the call option requires moving the graphical object from a first position (such as a first side, left side, top side, or upper side) on a predefined region or path to a second position (such as an opposite side, right side, bottom side, or lower side) of the predefined region or path. In some embodiments, in response to detecting selection of the call option, the computer system initiates a call to the predetermined number immediately (e.g., without a predetermined delay and/or countdown) and/or automatically without requiring further input (e.g., without requiring confirmation). In some embodiments, in response to detecting selection of the call option, the computer system initiates a call to the predetermined number and displays a call user interface (e.g., without displaying an intermediate or intervening user interface). In some embodiments, the call option is associated with an emergency service, an emergency number, and/or an emergency contact (e.g., a contactable user designated as an emergency contact). Examples of numbers associated with an emergency service include 911 in the United States, 999 in the United Kingdom, 112 in Europe, 110 and/or 119 in Japan, and 000 in Australia. Displaying a call option to initiate a process to call a predetermined number in response to obtaining data indicating that a crash has occurred automatically provides a user with an option to contact the predetermined number in the event of a crash, which makes it easier and faster to contact the predetermined number with fewer inputs and reduces the chance of mistakes, particularly in an emergency, which provides improved feedback to the user, reduces the number of inputs needed to perform an operation, provides additional control options without cluttering the user interface with additional displayed controls, and performs an operation when a set of conditions has been met without requiring further user input. Providing quick and efficient access to a predetermined number enables the computer system to be more quickly and efficiently controlled, which is particularly important in emergency situations and/or when a crash has occurred because a user may be stressed and more prone to making mistakes.

In some embodiments, after (e.g., in response to) obtaining the data indicating that a crash has occurred, the computer system provides (e.g., displays and/or outputs) an indication (e.g., 612*b*, 614, 612*e*, 612*p*, 626*b*, text, an audio output, and/or a haptic output) that a crash has been detected. In some embodiments, the computer system provides the indication that a crash has been detected while concurrently displaying the call option. In some embodiments, after (e.g., in response to) obtaining the data indicating that a crash has occurred, the computer system displays a cancel option (e.g., a selectable cancel option, an icon, a button, an affordance, and/or a user-interactive graphical user interface object), e.g., concurrently with the call option, and optionally, while concurrently providing the indication that a crash has been detected. In response to detecting selection of the cancel option, the computer system ceases display of the call option, ceases attempting to call the predetermined number, and/or ceases providing the indication that a crash has been detected. Providing an indication that a crash has been detected informs the user that the computer system has detected a crash and is operating accordingly so that the user does not make additional unnecessary inputs, which provides improved feedback to the user and reduces the number of inputs needed to perform an operation. Providing quick and efficient access to a respective number enables the computer system to be more quickly and efficiently controlled, which is particularly important in a crash situation because a user may be stressed and more prone to making mistakes.

In some embodiments, after obtaining the data indicating that a crash has occurred, in accordance with a determination that a first threshold (e.g., non-zero) amount of time has elapsed (e.g., since obtaining the data indicating that a crash has occurred or since initiating display of the call option) (and, optionally, that the call option has not been selected), the computer system initiates a call to the predetermined number associated with the call option without detecting selection of the call option. In some embodiments, the first threshold amount of time is, e.g., 5 seconds, 10 seconds, 15 seconds, 30 seconds, or one minute. In some embodiments, the computer system automatically initiates a call to the predetermined number associated with the call option at a first predetermined time after obtaining the data indicating that a crash has occurred (e.g., at a non-zero amount of time, such as 5 seconds, 10 seconds, 15 seconds, 30 seconds, or one minute, after obtaining the data indicating that a crash has occurred). Initiating a call to the predetermined number without detecting selection of the call option in accordance with a determination that a threshold amount of time has elapsed automatically initiates communication with the predetermined number without requiring feedback or input from the user, which provides improved feedback to the user, reduces the number of inputs needed to perform an operation, and performs an operation when a set of conditions has been met without requiring further user input.

In some embodiments, after obtaining the data indicating that a crash has occurred (and before initiating the call to the predetermined number associated with the call option without detecting selection of the call option): in accordance with a determination that a second threshold (e.g., non-zero) amount of time has elapsed (e.g., since obtaining the data indicating that a crash has occurred or since initiating display of the call option) (and, optionally, that the call option has not been selected), the computer system starts a countdown (e.g., 612*f* and/or 626*g*) for initiating a call to the predetermined number associated with the call option without detecting selection of the call option, wherein the second threshold amount of time is less than (e.g., 3 seconds less than, 5 second less than, 10 seconds less than, or 30 seconds less than) the first threshold amount of time, and wherein the first threshold amount of time has elapsed when the countdown expires. In some embodiments, the second threshold amount of time is, e.g. 5 seconds, 10 seconds, 15 seconds, 30 seconds, or one minute). In some embodiments, the computer system automatically initiates a call to the predetermined number associated with the call option when the countdown expires. In some embodiments, after obtaining the data indicating that a crash has occurred and in accordance with a determination that the second threshold amount of time has elapsed, the computer system provides a haptic notification that a call to the predetermined number associated with the call option will be initiated without detecting selection of the call option and/or audio indicating that a call to the predetermined number associated with the call option will be initiated without detecting selection of the call option (e.g., an audio message announcing that a call to the predetermined number associated with the call option will be initiated without detecting selection of the call option). Starting a countdown for initiating a call to the predetermined number in accordance with a determination that a second threshold amount of time has elapsed enables the computer system to automatically initiate communication with the predetermined number if, e.g., the user is unable to locate or use the computer system after a crash has occurred, which provides improved feedback to the user, reduces the number of inputs needed to perform an operation, and performs an operation when a set of conditions has been met without requiring further user input.

In some embodiments, after initiating a call to the predetermined number associated with the call option without detecting selection of the call option (e.g., after a call to the predetermined number is initiated automatically due to not receiving user input such as selection of the call option or user input that acknowledges that the user is alright (e.g., selection of an "I'm okay" option) or does not want to call the predetermined number (e.g., selection of a cancel option)): after establishing a call with the predetermined number in response to initiating a call to the predetermined number associated with the call option without detecting selection of the call option (e.g., when the call is answered), the computer system outputs (e.g., plays) an audio message (e.g., 618, a predetermined audio message, a voice message, and/or a recorded audio message) that indicates that a crash has been detected. In some embodiments, the computer system plays a recorded message when the call is made automatically (e.g., in case the user of the computer system is not responsive). In some embodiments, the audio message includes information about the crash such as, e.g., that a crash was detected, a location of the crash, a time of the crash, and/or people involved in the crash. In some embodiments, while outputting the audio message, the computer system displays a selectable option (e.g., a button, icon, affordance, or user-interactive graphical object), that when selected, causes the computer system to stop playback of the audio message. Outputting an audio message that indicates that a crash has been detected informs the recipient of the call about the circumstances if, e.g., the user of the computer system is unable to communicate or locate the computer system after a crash has occurred, which reduces the number of inputs needed to perform an operation.

In some embodiments, after obtaining the data indicating that a crash has occurred, the computer system sends a communication (e.g., a text message and/or audio message) to one or more (e.g., one, two, three, four, or five) designated contacts (e.g., a person or number designated as an emergency contact) (e.g., send the communication to one or more designated contacts in response to selection 625*f* of 612*o* in FIG. 6G). In some embodiments, the computer system sends the communication automatically (e.g., without user input) when a call to the predetermined number ends (e.g., in response to a determination that the call has ended). Sending a communication to a designated contact after obtaining the data indicating that a crash has occurred enables the computer system to automatically inform contacts that, e.g., a user has specified to be contacted in an emergency, which reduces the number of inputs needed to perform an operation.

In some embodiments, in response to a determination that a call to the predetermined number has ended (and, optionally, in accordance with a determination that the call to the predetermined number was initiated automatically (e.g., without user input, such as selection of the call option)), the computer system displays an indication (e.g., 612*p*, 626*b*, 626*o*, text and/or a graphic) that a crash was detected. In some embodiments, the indication that a crash was detected includes an indication (e.g., text and/or a graphic) of a device (e.g., the computer system or an external computer system in communication with the computer system) that detected the crash. In some embodiments, the computer system causes display of an indication that a crash was detected on an external computer system (e.g., a device in communication with the computer system, such as a smartwatch or smartphone that is paired (e.g., has a dedicated communication channel) with the computer system). Displaying an indication that a crash was detected in response to a determination that a call to the predetermined number has ended informs the user that the computer system has detected a crash and is operating accordingly to prevent the user from making additional unnecessary or incorrect inputs, which provides improved feedback to the user and reduces the number of inputs needed to perform an operation.

In some embodiments, displaying the indication that a crash was detected includes displaying an indication of a time at which the crash was detected (e.g., "1 minute ago" in 612*p*, "1 minute ago" in 626*o*, an absolute time, such as 1:35, or a relative time, such as 15 minutes ago). Displaying an indication of a time at which the crash was detected informs the user when the crash occurred in the event that the user was unconscious for a period of time after the crash to prevent the user from making additional unnecessary on incorrect inputs, which provides improved feedback to the user and reduces the number of inputs needed to perform an operation.

In some embodiments, after obtaining the data indicating that a crash has occurred: in response to a determination that a call to the predetermined number has ended (and, optionally, in accordance with a determination that the call to the predetermined number was initiated automatically (e.g., without user input, such as selection of the call option)), the computer system displays a second call option (e.g., 612*c* in FIG. 6H, 626*c* in FIG. 6Q, a selectable call option, an icon, a button, an affordance, and/or a user-interactive graphical user interface object) that, when selected, causes the computer system to initiate a process to call the predetermined number. In some embodiments, the computer system causes display of an option to call the predetermined number on an external computer system (e.g., a device in communication with the computer system, such as a smartwatch or smartphone that is paired (e.g., has a dedicated communication channel) with the computer system). In some embodiments, the option to call the predetermined number is displayed by the computer system and the external computer system. Displaying an option to call the predetermined number in response to a determination that a call to the predetermined number has ended enables the user to quickly and easily re-initiate communication with the predetermined number in case the initial call gets disconnected or ended accidentally, which reduces the number of inputs needed to perform an operation.

In some embodiments, after obtaining the data indicating that a crash has occurred: in response to a determination that a call to the predetermined number has ended (and, optionally, in accordance with a determination that the call to the predetermined number was initiated automatically (e.g., without user input, such as selection of the call option)), the computer system displays a medical ID option (e.g., 612*q* in FIG. 6H, 626*e* in FIG. 6Q, a selectable option, an icon, a button, an affordance, and/or a user-interactive graphical user interface object) that, when selected, causes the computer system to display information of a user who is associated with the computer system. In some embodiments, the information of the user includes the user's name, the user's age, the user's weight, the user's height, a designated contact (e.g., a name of an emergency contact), and/or contact information (e.g., a phone number) of the designated contact. In some embodiments, the computer system causes display of the medical ID option on an external computer system (e.g., a device in communication with the computer system, such as a smartwatch or smartphone that is paired (e.g., has a dedicated communication channel) with the computer system). In some embodiments, the medical ID option is displayed by the computer system and the external computer system. Displaying a medical ID option in response to a determination that a call to the predetermined number has ended enables the user of the computer system to quickly and easily show responders to the crash the user's information or for the responders to access the user's information if the user is unable to do so, which provides improved feedback to the user and reduces the number of inputs needed to perform an operation.

In some embodiments, after obtaining the data indicating that a crash has occurred, the computer system disables a voice assistant functionality on the computer system (e.g., a voice assistant functionality is disabled in FIGS. 6B-6H. FIGS. 6D-6H, FIGS. 6B-6G, FIGS. 6D-6G, FIGS. 6M-6Q, or FIGS. 6O-6Q). In some embodiments, the computer system disables the voice assistant functionality in response to obtaining the data indicating that a crash has occurred. In some embodiments, the computer system disables the voice assistant functionality in response to a determination that a call to the predetermined number has been initiated (e.g., either automatically or manually). In some embodiments, the computer system enables (or re-enables) the voice assistant functionality when the call to the predetermined number ends or when a user interface associated with the crash or an option to notify contact an emergency service is no longer displayed. Disabling a voice assistant functionality on the computer system after obtaining the data indicating that a crash has occurred prevents inadvertent and incorrect inputs to the voice assistant after a crash when there is high likelihood of confusion, noise, and other people that can interrupt the voice assistant functionally, which reduces the number of inputs needed to perform an operation and reduces mistakes.

In some embodiments, after initiating (e.g., either automatically or manually) a call with the predetermined number, the computer system detects a request to end the call with the predetermined number; and in response to detecting the request to end the call with the predetermined number, the computer system displays, without ending the call with the predetermined number, an option (e.g., 612*m*, 612*o*, a prompt, a selectable option, an icon, a button, an affordance, and/or a user-interactive graphical user interface object) to confirm the request to end the call with the predetermined number that, when selected, causes the computer system to end the call with the predetermined number. In some embodiments, the computer system concurrently displays the option to confirm the request to end the call with the predetermined number and an option to cancel the request to end the call with the predetermined number (e.g., to continue the call with the predetermined number). In some embodiments, in response to a request to exit a crash detection user interface (e.g., a user interface displayed in response to obtaining data indicating that a crash has occurred), the computer system displays, without exiting the crash detection user interface, an option to confirm the request to exit the crash detection user interface that, when selected, causes the computer system to exit (e.g., cease display of) the crash detection user interface. Displaying an option to confirm a request to end the call, without ending the call, prevents the user from inadvertently ending the call prematurely and having to provide additional inputs to re-initiate the call, which provides improved feedback to the user, reduces the number of inputs needed to perform an operation, and reduces errors.

In some embodiments, the computer system displays an enable-crash-detection option (e.g., 624*a*, 630*a*, 640*b*, a toggle button, a switch, an affordance, and/or a user interactive graphical object) that, when selected, sets a state (e.g., enabled, disabled, on, or off) of a capability (e.g., of the computer system or an external computer system) to display the call option in response to obtaining data indicating that a crash has occurred. In some embodiments, in response to detecting input selecting the enable-crash-detection option while the state of the capability to display the call option is in a first state, the computer system sets the capability to display the call option to a second state different from the first state; and in response to detecting input selecting the enable-crash-detection option while the state of the capability to display the call option is in the second state, the computer system sets the capability to display the call option to the first state. In some embodiments, the call option is displayed in response to obtaining data indicating that a crash has occurred in accordance with a determination that the capability to display the call option is in a first state (e.g., enabled or on). In some embodiments, in response to obtaining data indicating that a crash has occurred, the computer system foregoes displaying the call option in accordance with a determination that the capability to display the call option is in a second state (e.g., disabled, not enabled, or off) that is different from the first state. In some embodiments, the enable-crash-detection option is displayed on an external computer system (e.g., a device in communication with the computer system, such as a smartwatch or smartphone that is paired (e.g., has a dedicated communication channel) with the computer system). In some embodiments, the enable-crash-detection option is displayed on the external computer system in a companion application that provides selectable options for selecting settings and/or operational parameters of the computer system. In some embodiments, the enable-crash-detection option is displayed during an initialization or onboarding process (e.g., at the computer system or an external computer system that is configured to communicate with the computer system). In some embodiments, the enable-crash-detection option is displayed as part of a process of presenting safety features of the computer system and/or an external computer system in communication with the computer system. In some embodiments, the enable-crash-detection option is not displayed if the computer system is not capable of detecting that a crash has occurred (e.g., even if the computer system is capable of displaying the call option in response to obtaining data indicating that a crash detected by an external computer system has occurred. In some embodiments, the state (e.g., enabled or disabled) of the capability to display the call option in response to obtaining data indicating that a crash has occurred for the computer system is based on a setting of the state of the capability for another (e.g., an external) computer system (e.g., the state of the capability is mirrored between devices). Displaying an option to set a state of the capability to display the call option in response to obtaining data indicating that a crash has occurred provides a quick and efficient means for the user to enable or disable the capability, which reduces the number of inputs needed to perform an operation.

In some embodiments, the computer system displays a user interface (e.g., 638 and/or 640) of a health application that includes information associated with health of a user (e.g., activity data, body measurements, cycle data, hearing data, heart data, mindfulness data, mobility data, nutrition data, respiratory data, sleep data, health symptoms, vitals data, and/or health records), where displaying the enable-crash-detection option (e.g., 640*b*) includes displaying the enable-crash-detection option in the user interface of the health application (e.g., as part of a checklist of health-related items, such as a sequence of information, options, features, and/or user interfaces associated with health-related items). In some embodiments, the user interface of the health application includes an option that, when selected, displays a set of options related to detecting a crash, including the enable-crash detection option. In some embodiments, the set of options related to detecting a crash is a subset of a set of options related to emergency features (e.g., options for emergency SOS features that are available in a menu of emergency features, including the enable-crash detection option). Displaying the enable-crash-detection option in the user interface of the health application informs the user of the crash detection capability in a relevant location and provides a quick and efficient means for the user to enable or disable the capability, which provides improved feedback to the user and reduces the number of inputs needed to perform an operation.

In some embodiments, the enable-crash-detection option, when selected, enables a capability of the computer system to display the call option in response to obtaining data indicating that a crash has occurred without enabling a capability of a second computer system to display the call option in response to obtaining data indicating that a crash has occurred (e.g., 624*a* controls the capability of computer system 604*a*, but not the capability of computer system 604*b*; and/or 630*a* controls the capability of computer system 604*b*, but not the capability of computer system 604*a*). In some embodiments, the computer system displays a second enable-crash-detection option that, when selected, enable a capability of an external computer system to display the call option in response to obtaining data indicating that a crash has occurred (e.g., the computer system concurrently displays device-specific options for enables a capability to display the call option in response to obtaining data indicating that a crash has occurred). In some embodiments, the computer system displays the state of the capability to display the call option in response to obtaining data indicating that a crash has occurred for a first device (e.g., the computer system) and, optionally, concurrently displays the state of the capability to display the call option in response to obtaining data indicating that a crash has occurred for a second device (e.g., an external device) different from the first device (e.g., the computer system displays the state of a crash detection capability by device). Enabling a capability of the computer system to display the call option in response to obtaining data indicating that a crash has occurred without enabling a capability of a second computer system to display the call option in response to obtaining data indicating that a crash has occurred provides the user with greater control over the crash detection functionality and reduces the change of error, which provides improved feedback to the user and reduces the number of inputs needed to perform an operation.

In some embodiments, after obtaining data indicating that a crash has occurred, the computer system provides (e.g., shares) data associated with the crash to an application (e.g., an application designated in 632*b* in FIG. 6T, a third-party application, an application other than an application that detected the crash, and/or an application provided and/or created by an entity other than an entity that created the computer system or an operating system on the computer system). In some embodiments, the data associated with the crash includes data indicating that a crash has occurred, a time of the crash, a location of the crash, and/or people involved in the crash. In some embodiments, in response to a request by an application (e.g., a third-party application) to be provided with data associated with a crash if a crash is determined to have occurred, the computer system displays an option to grant or deny the application access to data associated with the crash (e.g., to provide or not provide data associated with a crash if a crash is determined to have occurred). In some embodiments, the computer system provides data associated with a crash with an application (e.g., a third-party application) even if a capability of the computer system to display the call option in response to obtaining data indicating that a crash has occurred is disabled (e.g., a crash detection user interface is disabled). In some embodiments, the computer system provides an application (e.g., a third-party application) with data associated with crash if a crash is determined to have occurred if the computer system is a predetermined type of device (e.g., a smartphone). In some embodiments, only a computer system of a particular type can share crash detection data with a third-party application (e.g., a smartphone can share crash detection data with a third-party application, but a smartwatch that is in communication with the smartphone cannot share crash detection data with the third-party application). Providing data associated with the crash to an application enables the computer system to automatically share data about the crash with an application that provides a functionality that a user desires after a crash so that the user does not have to perform additional inputs to provide the data to the application, which reduces the number of inputs needed to perform an operation.

In some embodiments, providing data associated with the crash to an application includes providing data associated with the crash to a first application without providing data associated with the crash to a second application that is different from the first application, wherein the first application and the second application have been authorized to be provided with data associated with a crash after a crash is determine to have occurred (e.g., the computer system provides data associated with the crash to only one application listed in 632*b*; and/or the computer system provides data associated with the crash to only one application, even if multiple applications have been granted access to receive crash detection data). In some embodiments, the computer system provides the data associated with the crash to the first application instead of the second application in accordance with a determination that the first application was granted access to receive crash detection data more recently than the second application. Providing data associated with the crash to a first application without providing data associated with the crash to a different application avoids multiple applications providing redundant services and/or functionality after a crash and reduces the amount of data that has to be shared, which conserves computing resources and saves battery life.

In some embodiments, the computer system displays a sharing option (e.g., 632*a*, a toggle button, a switch, an affordance, and/or a user interactive graphical object) that, when selected (e.g., 625*n*), sets a state (e.g., enabled, disabled, on, or off) of a parameter for providing data associated with the crash to an application; and after (e.g., in response to) obtaining the data indicating that a crash has occurred: in accordance with a determination that the state of the parameter is a first state (e.g., on or enabled), the computer system provides data associated with the crash to an application; and in accordance with a determination that the stat of the parameter is a second state (e.g., off or disabled) different from the first state, the computer system forgoes providing data associated with the crash to an application. In some embodiments, in response to detecting input selecting the sharing option while the state of the parameter for providing data associated with the crash to an application is in a first state, the computer system sets the state of the parameter for providing data associated with the crash to an application to a second state different from the first state; and in response to detecting input selecting the sharing option while the state of the parameter for providing data associated with the crash to an application is in the second state, the computer system sets the state of the parameter for providing data associated with the crash to an application to the first state. In some embodiments, if the state of the parameter is the first state (e.g., on or enabled), the computer system displays (e.g., concurrently with the sharing option) a list of applications with which the data associated with the crash can be provided. In some embodiments, in response to input selecting an application from the list of applications, the computer system designates the selected application (e.g., visually, such as with highlighting and/or a checkmark, and/or in memory). In some embodiments, providing data associated with the crash to an application in accordance with a determination that the state of the parameter is a first state includes providing data associated with the crash to the designated application in accordance with the selected application. Displaying the share option enables a user to quickly and easily select whether or not to share data after a crash to prevent unnecessarily sharing data, which conserves computing resources and saves battery life.

Note that details of the processes described above with respect to method 700 (e.g., FIG. 7) are also applicable in an analogous manner to the methods described below. For example, method 900 optionally includes one or more of the characteristics of the various methods described above with reference to method 700. For brevity, these details are not repeated below.

FIGS. 8A-8N illustrate exemplary user interfaces for sending a communication using an alternative communication network in the event of a crash, in accordance with some embodiments. The user interfaces in these figures are used to illustrate the processes described below, including the processes in FIG. 9.

FIG. 8A illustrates computer system 604*b* described above with reference to, e.g., FIG. 6A. In FIG. 8A, computer system 604*b* displays crash detection interface 626 described above with reference to FIG. 6M. For example, computer system 604*b* displays crash detection interface 626 while attempting to initiate a call with emergency services after obtaining an indication that a crash has occurred. In some embodiments, computer system 604*b* attempts to initiate a call with emergency services and displays crash detecting interface 626 in response to detecting selection of communication option 626*c* (e.g., shown in FIG. 6M and FIG. 6N), which computer system 604*b* displays in response to obtaining an indication that a crash has occurred. In some embodiments, computer system 604*b* attempts to initiate a call with emergency services and displays crash detecting interface 626 in response to obtaining an indication that a crash has occurred without detecting user input (e.g., in response to countdown 626*g* shown in FIG. 6N expiring).

In FIG. 8A, computer system 604*b* is unable to connect to a terrestrial wireless communication network, such as, e.g., a cellular network or a Wi-Fi network. For example, computer system 604*b* may be in a remote location where a cellular network is not available. Because computer system 604*b* is unable to connect to a terrestrial wireless communication network, computer system 604*b* displays network status indicator 605 with an appearance that indicates that no terrestrial wireless communication network is available. For example, instead of displaying cellular status indicator 605*a* (e.g., a series of vertical bars of varying length), network status indicator 605 includes cellular status indicator 605*c* (e.g., a horizontal broken line), which indicates that a cellular network is not available. Emergency capability indicator 605*d* indicates that computer system 604*b* is capable of performing emergency communication even though a cellular network is not available. In some embodiments, emergency communication is limited to phone and/or text communication with a designated entity or number (e.g., emergency services and/or 911). In some embodiments, computer system 604*b* displays emergency capability indicator 605*d* with a first appearance (e.g., bold and/or not greyed out) if a cellular network other than a primary cellular network associated with computer system 604*b* is available for emergency communication, and displays emergency capability indicator 605*d* with a second appearance (e.g., dimmed and/or not greyed out) if no cellular network is available. In FIG. 8A, no cellular network is available.

Although no cellular network is available, computer system 604*b* is capable of communicating via an alternative communication network, such as, e.g., a satellite communication network, which is indicated by display of satellite communication capability indicator 605*e*. Because computer system 604*b* is capable of satellite communication, in response to a determination that the call to emergency services attempted in FIG. 8A has failed (e.g., due to the lack of cellular network availability), computer system 604*b* provides an option to initiate communication via satellite. For example, as shown in FIG. 8B, in response to a determination that there is no cellular connection (e.g., as indicated by call status indicator 626*j*), computer system 604*b* displays satellite communication option 802. In the embodiment illustrated in FIG. 8B, computer system 604*b* moves end call option 6261 to the left on crash detection interface 626 and displays satellite communication option 802 to the right of end call option 6261. Displaying satellite communication option 802 provides a user with an alternative communication option after a crash has occurred if no cellular network is available.

In some embodiments, in response to detecting selection 825*a* of satellite communication option 802, computer system 604*b* attempts to send a message to emergency services via satellite automatically (e.g., without further user input). In some embodiments, computer system 604*b* attempts to send a message to emergency services via satellite automatically (e.g., without further user input) if computer system 604*b* does not detect a user input within a predetermined amount of time after displaying satellite communication option 802 (or, optionally, after the call to emergency services fails). In some embodiments, the message to emergency services is generated automatically with information such as, e.g., a name or identity of a user associated with computer system 604*b*, a location of computer system 604*b*, and/or an indication that a crash has been detected.

In some embodiments, computer system 604*b* must be connected (e.g., via wireless communication) to a satellite in order to send a message via satellite. In some embodiments, if computer system 604*b* is connected to a satellite when the attempt to send the message to emergency services is made, then computer system 604*b* sends the message via satellite and displays (e.g., updates) crash detection interface 626 as shown in FIG. 8C.

Figure 8C:
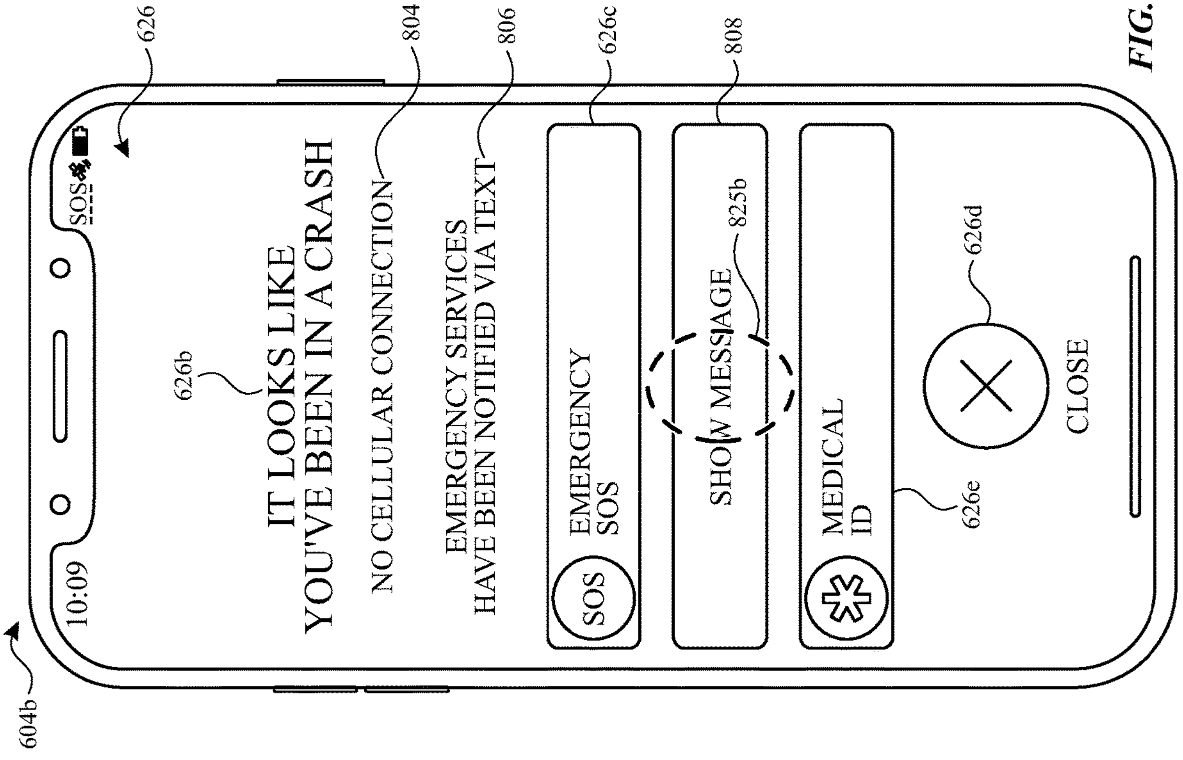
Figure 8F:
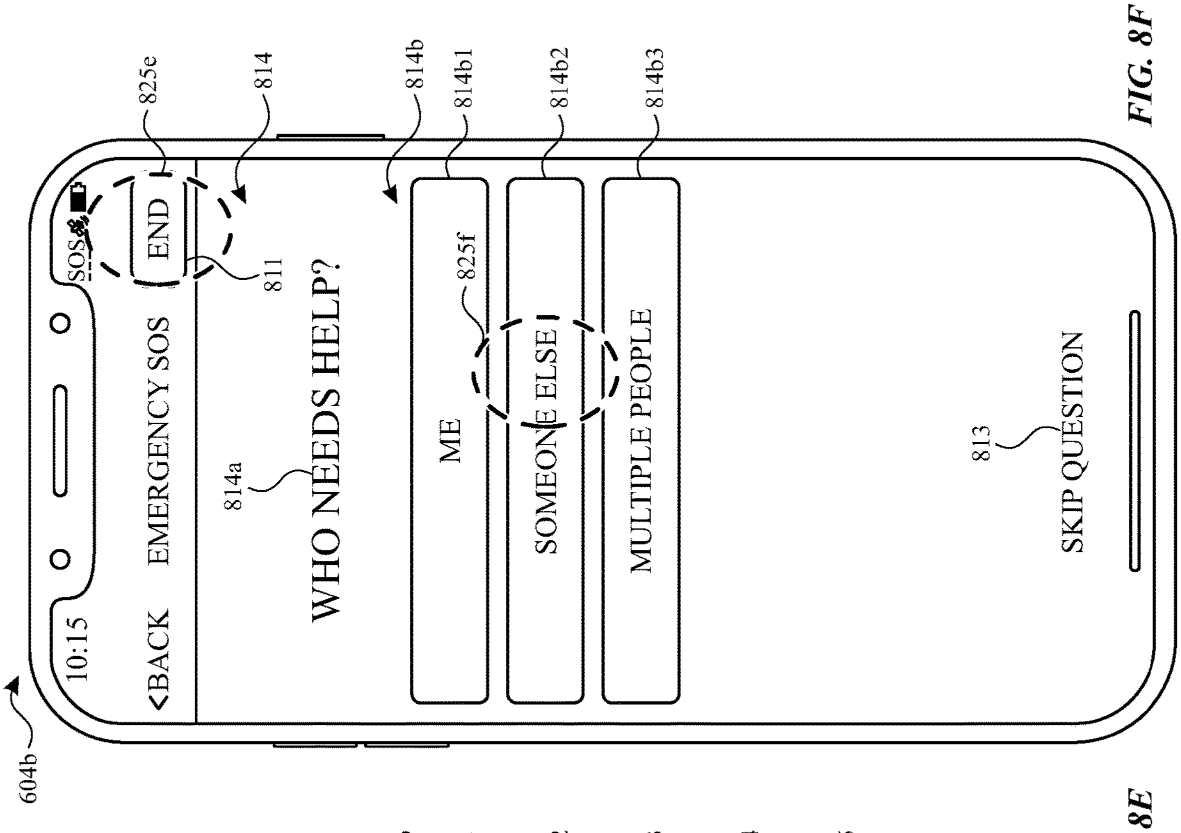

In FIG. 8C, crash detection interface 626 includes no cellular connection indication 804, message status indication 806, and show message option 808 (e.g., along with crash detection indicator 626*b*, communication option 626*c*, close option 626*d*, and medical ID option 626*e* described above with reference to FIGS. 6M, 6N, and 6Q). No cellular connection indication 804 indicates (e.g., via text, such as "No cellular connection," and/or a graphic) that computer system 604*b* does not have a cellular connection. Message status indication 806 indicates (e.g., via text, such as "Emergency services have been notified via text," and/or a graphic) that emergency services has been notified about the detected crash via a text message. Show message option 808 provides the ability for the user to quickly and easily view the message that was sent to emergency services. For example, in response to detection selection 825*b* of show message option 808, computer system 604*b* displays the message that was sent to emergency services. In some embodiments, in response to detection selection 825*b* of show message option 808, computer system 604*b* displays a user interface (e.g., messaging interface 818) of a messaging application for sending, receiving, and/or displays messages between emergency services and computer system 604*b* (or a user associated with computer system 604*b*), as shown, e.g., in FIG. 8L.

In some embodiments, if computer system 604*b* is not connected to a satellite when the attempt to send the message to emergency services is made, computer system 604*b* initiates a process of sending a communication via satellite. In some embodiments, the process of sending a communication via satellite includes displaying an information and/or instruction interface, such as, e.g., information interface 810 shown in FIG. 8D.

In some embodiments, in response to detecting selection 825*a* of satellite communication option 802, computer system 604*b* initiates a process for sending a communication to emergency services via satellite without attempting to send an automatically-generated message. For example, computer system 604*b* can prompt a user for information to generate a message prior to attempting to send a message, as shown and described with reference to FIGS. 8D-8G.

Information interface 810 includes information about generating a message to send via satellite, connecting to a satellite, and/or sending a message via satellite. In some embodiments, computer system 604*b* (or a portion thereof, such as an antenna) has to be physically aligned with a satellite in order to connect with the satellite for communication. Graphic 810*b* illustrates a user aligning a device with a satellite. In some embodiments, graphic 810*b* includes an animation of a graphical representation of a satellite and/or a graphical representation of a user's hand and/or device moving (e.g., from side to side) to indicate that a user may have to move computer system 604*b* to align with a satellite.

Feature indicator 810*c* indicates that information interface 810 relates to a feature of texting emergency services via satellite. Instructions 810*d* instructs a user to be outside to connect with a satellite (e.g., so that computer system 604*b* is not obstructed from a satellite by a building). Alert 810*e* indicates that messages sent via satellite will take longer to send than messages sent via a cellular network. Prompt 810*f* prompts the user to answer questions to get a faster response. Content indicator 810*g* indicates that a location and medical information may be shared when a message is sent.

In FIG. 8D, computer system 604*b* displays end option 811 that, when selected (e.g., via selection 825*e* in FIG. 8F or selection 825*j* in FIG. 8L), causes computer system 604*b* to end the process of sending a communication via satellite. In some embodiments, computer system 604*b* maintains display of end option 811 throughout the process of sending a communication via satellite (e.g., as shown in FIGS. 8D-8L).

In response to detecting selection 825*c* of report emergency option 810*h*, computer system 604*b* continues the process of sending a communication via satellite. In some embodiments the process of sending a communication via satellite includes providing one or more sets of options that a user can select to generate content of a message.

Figure 8E:
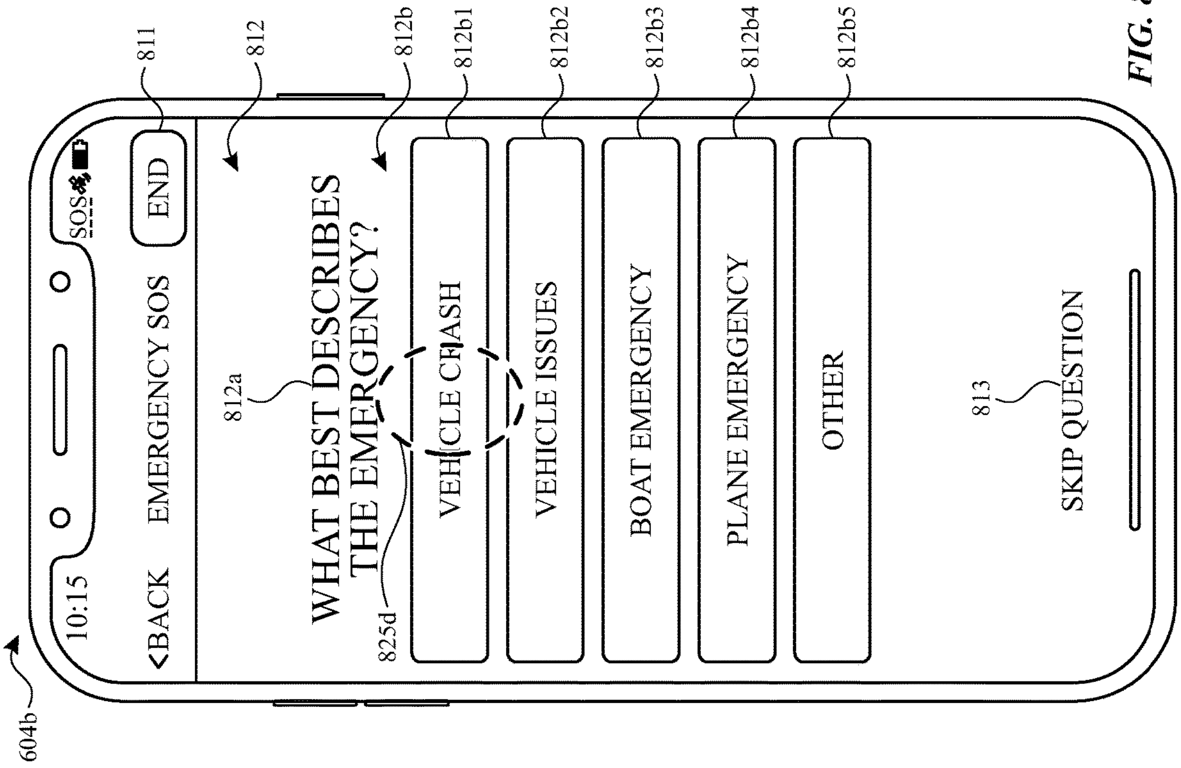

For example, in response to detecting selection 825*c* of report emergency option 810*h*, computer system 604*b* displays first report generation interface 812, which includes prompt 812*a* and first set of options 812*b* for responding to prompt 812*a*, as shown in FIG. 8E. First set of options 812*b* includes options 812*bl*-812*b*5 that correspond to respective responses to prompt 812*a*.

In some embodiments, the options for generating the message are based on a crash being detected. For example, in accordance with a determination that a crash was detected, computer system 604*b* displays one set of options (e.g., options that are likely to be related to a crash); and in accordance with a determination that a crash was not detected, computer system 604*b* displays a different set of options (e.g., a set of options that includes options related to other types of emergencies that are not related to a crash, such as being lost or trapped, a crime, a fire, or a sickness). For example, because a crash was detected, options 812*b*1-812*b*4 for describing the emergency are related to emergencies that may involve a crash.

In some embodiments, in response to detecting selection of option 812*b*5 (e.g., a tap on option 812*b*5 and/or other input selecting option 812*b*5), computer system 604*b* displays a message compose field and a keyboard that can be used to generate a custom message.

Report generation interface 812 includes skip question option 813. In some embodiments, in response to detecting selection of skip question option 813 (e.g., a tap on skip question option 813 and/or other input selecting skip question option 813), computer system 604*b* proceeds with the process of sending a communication via satellite without an option of set of option 812*b* being selected.

In response to detecting selection 825*d* of option 812*b*1 (e.g., corresponding to a response that the emergency is best described as a vehicle crash), computer system 604*b* displays second report generation interface 814, which includes prompt 814*a* and second set of options 814*b* for responding to prompt 814*a*, as shown in FIG. 8F. Second set of options 814*b* includes options 814*bl*-814*b*3 that correspond to respective responses to prompt 814*a*. In some embodiments, prompt 814*a* and second set of option 814*b* are based on which option is selected from first set of options 812*b*. For example, computer system 604*b* displays the particular prompt 814*a* and set of options 814*b* because option 812*b*1 was selected. In some embodiments, computer system 604*b* displays a different prompt and/or different set of options from prompt 814*a* and second set of option 814*b*, respectively, shown in FIG. 8F in response to selection of a different option in first set of options 812*b* (e.g., in response to selection of option 812*b*2, option 812*b*3, or option 812*b*4).

In response to detecting selection 825*f* of option 814*b*2 (e.g., corresponding to a response that someone else needs help), computer system 604*b* continues the process of sending a communication via satellite. For example, in response to selection 825*f* of option 814*b*2, computer system 604*b* displays report summary interface 816, which includes a summary of a report that is generated based on a user's responses to the prompts in report generation interfaces 812 and 814 (e.g., based on selection 825*d* of option 812*b*1 and selection 825*f* of option 814*b*2). Report summary interface 816 includes notification 816*a*, location information 816*b*, response summary 816*c*, countdown 816*d*, send option 816*e*, and don't send option 816*f*. Notification 816*a* indicates that the information in report summary interface 816 will be sent to emergency services. Location information 816*b* indicates a location that will be included in the information sent to emergency services. Response summary 816*c* indicates emergency information based on the user's responses (e.g., selection 825*d* of option 812*b*1 and selection 825*f* of option 814*b*2) that will be included in the information sent to emergency services. Countdown 816*d* indicates an amount of time (e.g., number of seconds) until sending of the information in report summary interface 816 to emergency services will be automatically initiated (e.g., without further user input).

In response to detecting selection of don't send option 816*f* (e.g., a tap on don't send option 816*f* and/or other input selecting don't send option 816*f*), computer system 604*b* ceases display of report summary interface 816 without attempting to send the information in report summary interface 816 (e.g., computer system 604*b* displays information interface 810 shown in FIG. 8D or crash detection interface 626 shown in FIG. 8B).

In response to detecting selection 825*g* of send option 816*e*, or in response to a determination that countdown 816*d* has ended, computer system 604*b* attempts to send a message to emergency services via satellite that includes the information shown in report summary interface 816.

Figure 8H:
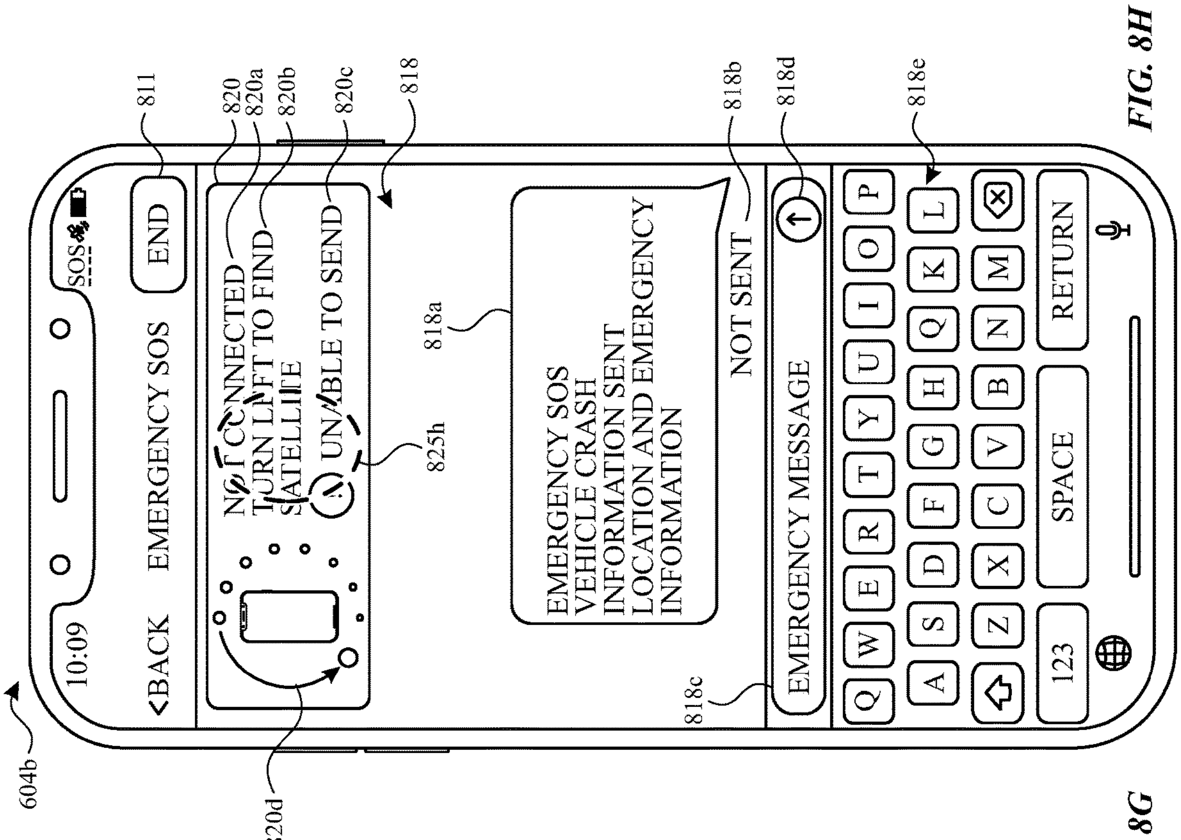
Figure 8G:
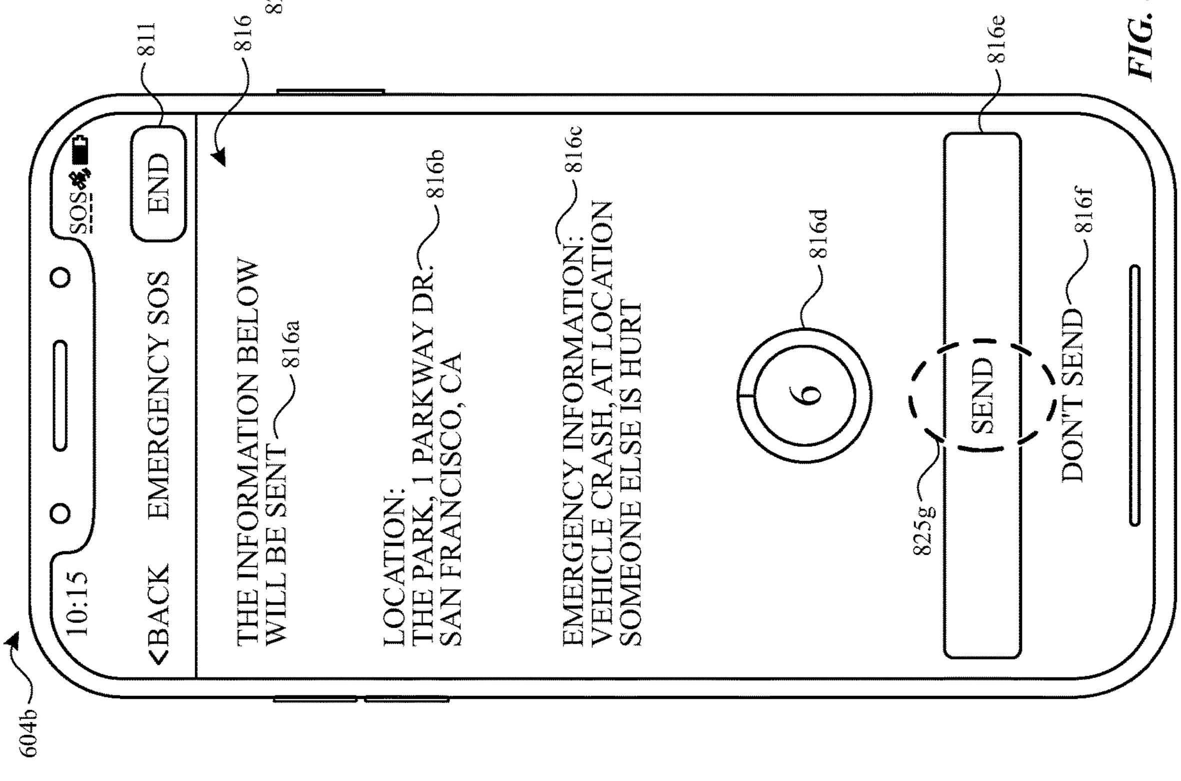

In some embodiments, when computer system 604*b* attempts to send the message, computer system 604*b* displays a user interface of a messaging application, such as, e.g., messaging interface 818 shown in FIG. 8H. Messaging interface 818 includes one or more messages between emergency services and a user associated with computer system 604*b*, including message 818*a* that includes the information in report summary interface 816. Messaging interface 818 includes message compose field 818*c*, send option 818*d*, and keyboard 818*d* for composing and sending additional messages to emergency services.

In FIG. 8H, message status indicator 818*b* indicates that message 818*a* has not been sent. In the embodiment illustrated in FIG. 8H, message 818*a* has not been sent because computer system 604*b* is not aligned with (and not connected to) a satellite. In FIG. 8H, computer system 604*b* displays connection element 820, which includes information related to aligning with a satellite, connecting to a satellite, and/or message status.

Connection element 820 includes connection status indicator 820*a*, alignment instructions 820*b*, message status 820*c*, and alignment element 820*d*. Connection status indicator 820*a* indicates a status of a connection between computer system 604*b* and a satellite. In FIG. 8H, connection status indicator 820*a* indicates that computer system 604*b* is not connected to a satellite. Alignment instructions 820*b* indicate an action that a user can take to align with a satellite or stay aligned with a satellite. In FIG. 8H, alignment instructions 820*b* indicate that computer system 604*b* can be turned left to align with a satellite. Message status 820*c* indicates a status of a message such as, e.g., unable to send, sending, sent, or waiting to receive. In FIG. 8H, message status 820*c* indicates that message 818*a* is unable to be sent. Alignment element 820*d* includes a graphical representation of the connection state of computer system 604*b* and an action that can be taken to align computer system 604*b* with a satellite or to remain aligned with a satellite. In FIG. 8H, consistent with connection status indicator 820*a* and alignment instructions 820*b*, alignment element 820*d* includes an arrow pointing in the counter-clockwise direction, which indicates that computer system 604*b* is not aligned with a satellite and can be turned left to align with a satellite.

Figure 8I:
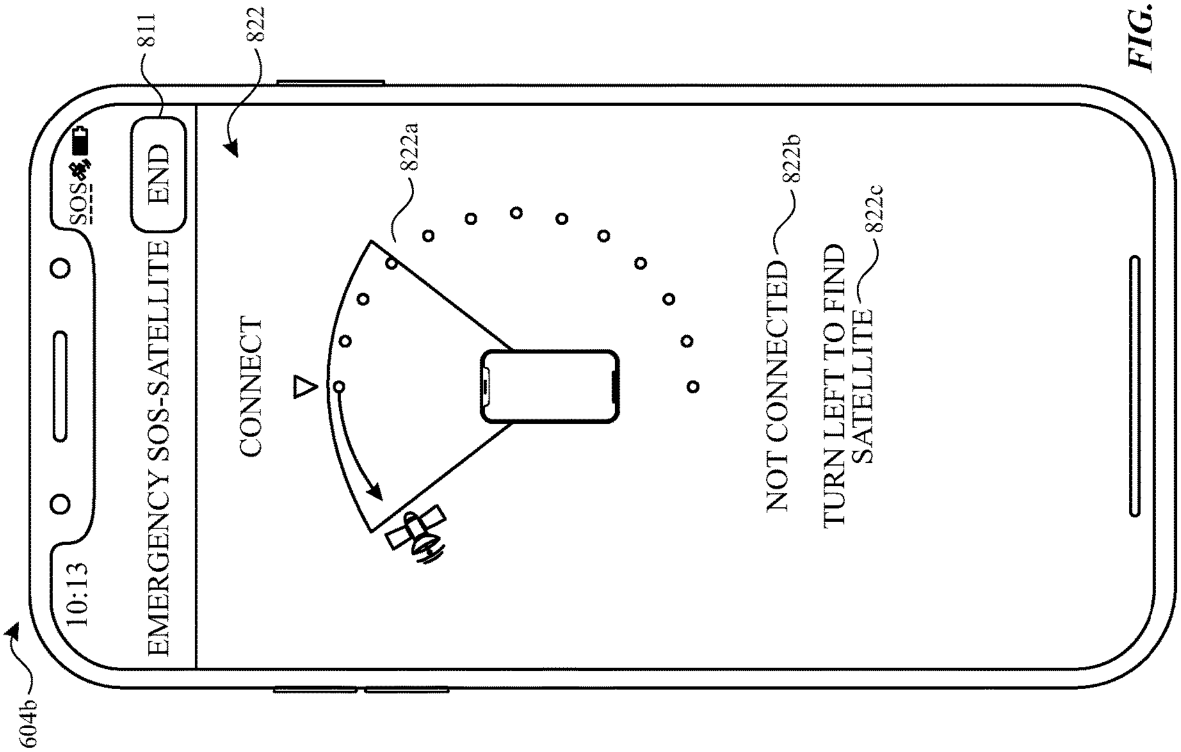

In response to detecting selection 825*h* of connection element 820, computer system 604*b* displays connection assistant interface 822 shown in FIG. 8I. Similar to connection element 820, the appearance of connection assistant interface 822 is based on a current status of computer system 604*b* relative to a satellite. Compared to connection element 820, connection assistant interface 822 provides a larger interface for assisting a user in connecting computer system 604*b* with a satellite.

Connection assistant interface 822 includes alignment element 822*a*, connection status indicator 822*b*, and alignment instructions 822*c*. Alignment element 822*a* includes a graphical representation of a satellite, a graphical representation of computer system 604*b*, and a graphical representation of an alignment window in which computer system 604*b* is aligned with a satellite. The position of the representation of the satellite relative to the representation of computer system 604*b* provides an indication of the actual physical location of a satellite relative to computer system 604*b*. In FIG. 8I, the representation of the satellite is on the left side of the representation of computer system 604*b* and to the left of the representation of the alignment window, which indicates that computer system 604*b* is not aligned with the satellite and that computer system 604*b* can be turned left to align with the satellite. Alignment element 822*a* includes an arrow indicating that computer system can be turned left to align with the satellite. Connection status indicator 822*b* indicates a status of a connection between computer system 604*b* and a satellite. In FIG. 8I, connection status indicator 822*b* indicates that computer system 604*b* is not connected to a satellite. Alignment instructions 822*c* indicate an action that a user can take to align with a satellite or stay aligned with a satellite. In FIG. 8I, consistent with alignment element 822*a*, alignment instructions 822*b* indicate that computer system 604*b* can be turned left to align with a satellite.

Figure 8J:
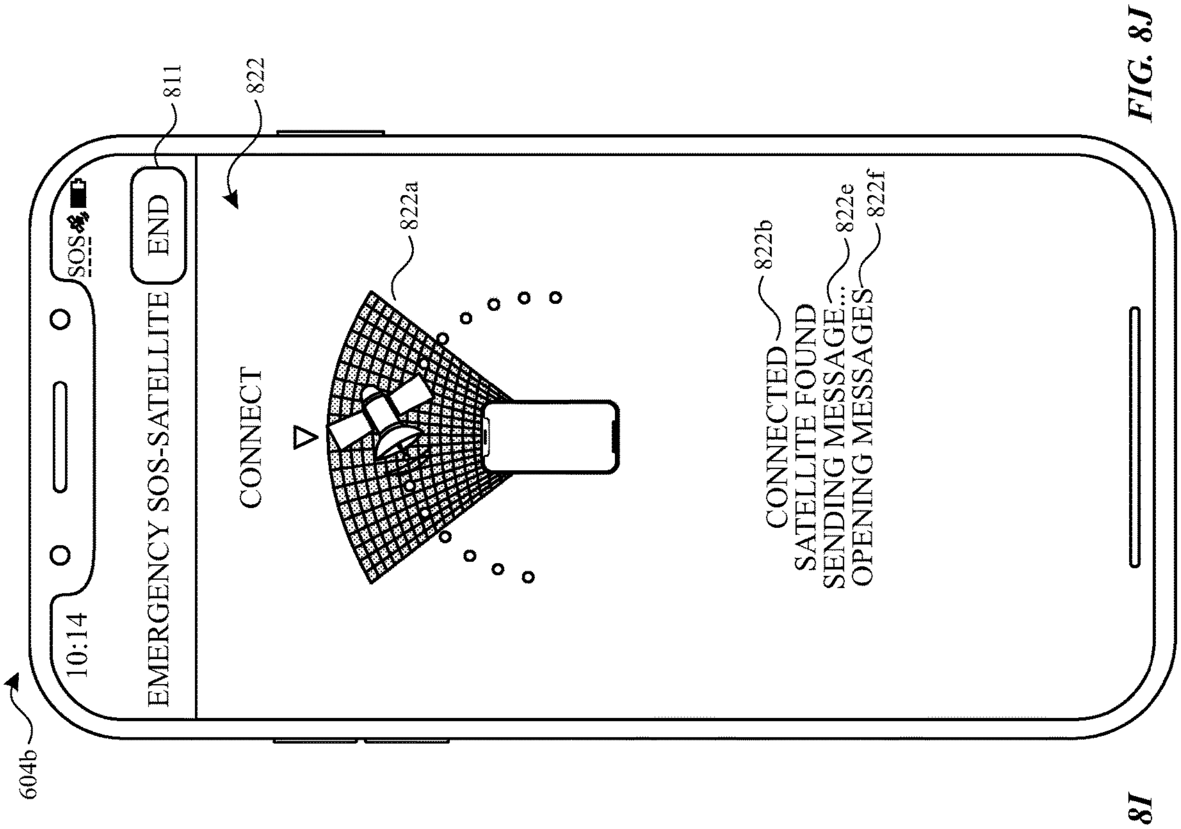
Figure 8L:
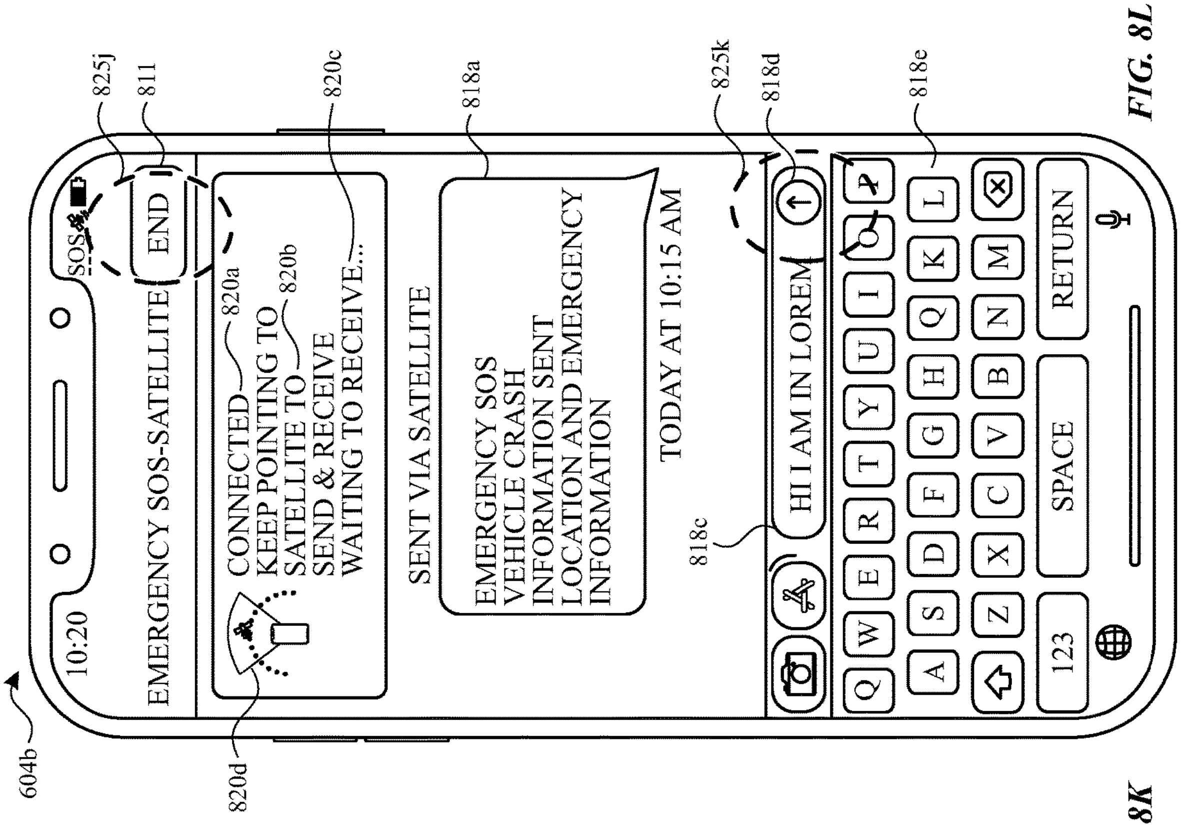

Turning to FIG. 8J, computer system 604*b* has been turned left relative to the position of computer system 604*b* in FIG. 8I. As a result, computer system 604*b* is aligned with the satellite. In response to the change in alignment between computer system 604*b* and the satellite, computer system 604*b* displays (e.g., updates) connection assistant interface 822 to reflect the current status of computer system 604*b* relative to the satellite. In FIG. 8J, the representation of the satellite is within the representation of the alignment window and the appearance of the alignment window is changed, which indicate that computer system 604*b* is aligned with the satellite. Connection status indicator 822*b* indicates that computer system 604*b* is connected with the satellite. Message status indicator 822*e* indicates that message 818*a* is being sent since computer system 604*b* is connected with the satellite. Action indicator 822*f* indicates that computer system 604*b* is opening a messages application.

Figure 8K:
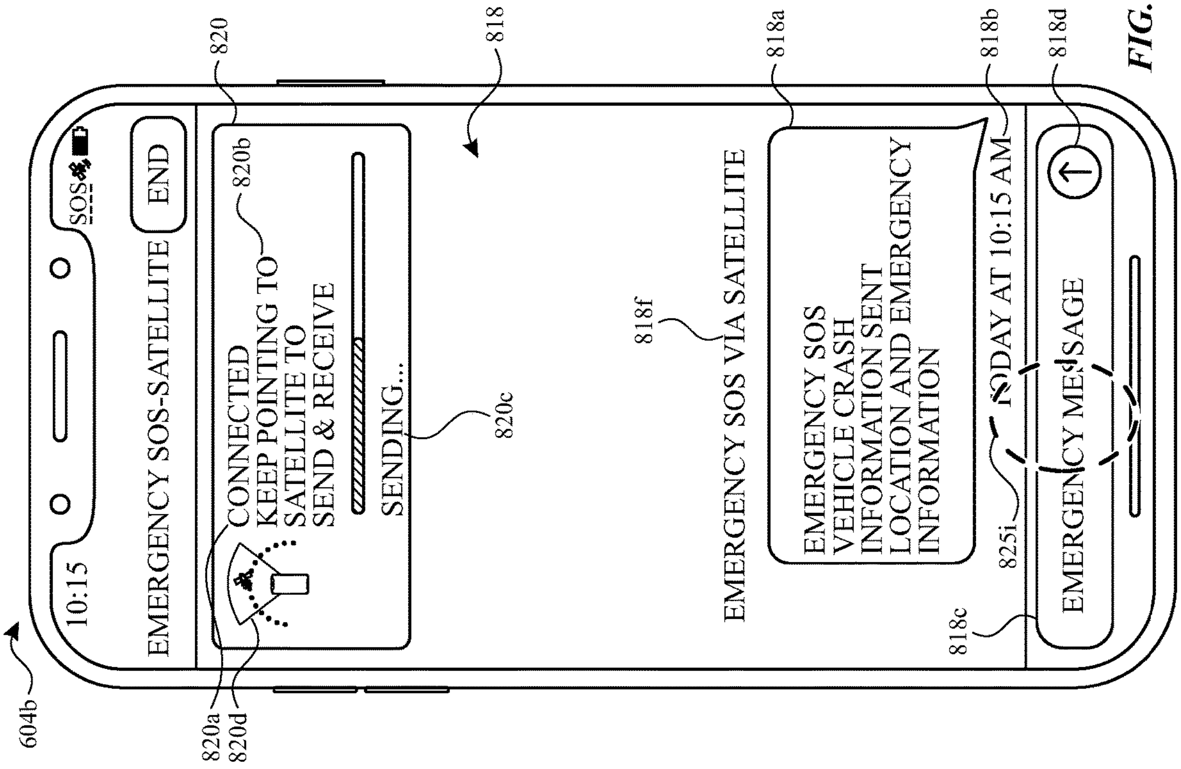

In response to a determination that computer system 604*b* is connected to the satellite, computer system 604*b* sends message 818*a* and displays messaging interface 818 and connection element 820 as shown in FIG. 8K. In FIG. 8K, message status indicator 818*b* indicates that the message was sent (e.g., "Today at 10:15 AM") and computer system 604*b* displays connection element 820 based on the current alignment and/or connection status between computer system 604*b* and the satellite. Connection status indicator 820*a* indicates that computer system 604*b* is connected to the satellite. Alignment instructions 820*b* indicates that a user can keep pointing computer system 604*b* to the satellite (e.g., in the current direction) to send and receive messages via the satellite. Message status 820*c* indicates that computer system 604*b* is sending message 818*a*. Alignment element 820*d* indicates that computer system 604*b* is aligned with the satellite.

In FIG. 8K, computer system 604*b* displays messaging interface 818 without keyboard 818*e*. In response to detecting selection 825*i* of message compose field 818*c*, computer system 604*b* displays keyboard 818*e*, as shown in FIG. 8L. In some embodiments, computer system 604*b* provides the capability to send one or more additional messages to emergency services via satellite using messaging interface 818. For example, in response to detecting input(s) on keyboard 818*e*, computer system 604*b* populates message compose field 818*c*, as shown in FIG. 8L. In response to detecting selection 825*k* of send option 818*d*, computer system 604*b* sends a message to emergency services via satellite with the content that is in message compose field 818*c* at the time of selection 825*k*. In FIG. 8L, message 818*a* has completed sending, which is reflected in connection element 820 by message status 820*c* indicating that computer system 604*b* is waiting to receive (e.g., as opposed to "Sending" in FIG. 8K).

In some embodiments, computer system 604*b* displays connection assistant interface 822 prior to displaying interfaces for generating and/or sending a message (e.g., report generation interface 812, report generation interface 814, and/or report summary interface 816). For example, in some embodiments, computer system 604*b* displays connection assistant interface 822 in response to detecting selection 825*a* of satellite communication option 802 or in response to selection 825*c* of report emergency option 810*h*. In some embodiments, computer system 604*b* displays interfaces for generating and/or sending a message (e.g., report generation interface 812, report generation interface 814, and/or report summary interface 816) in response to a determination that computer system 604*b* is connected to a satellite (e.g., after displaying connection assistant interface 822 shown in FIG. 8J).

Figure 8M:
Figure 8N:
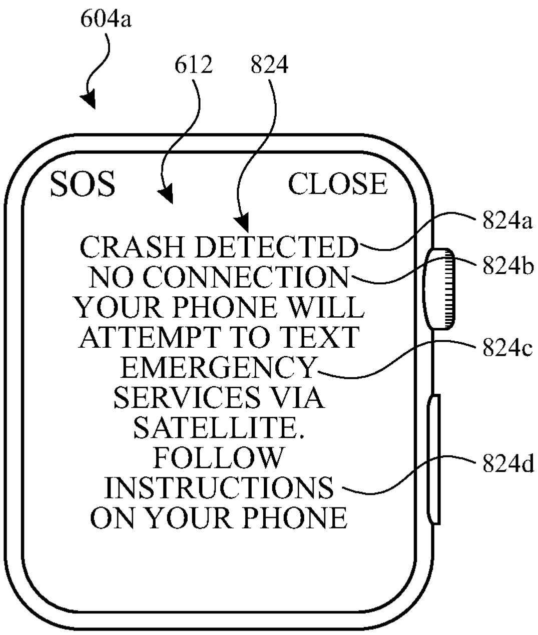
Figure 9:
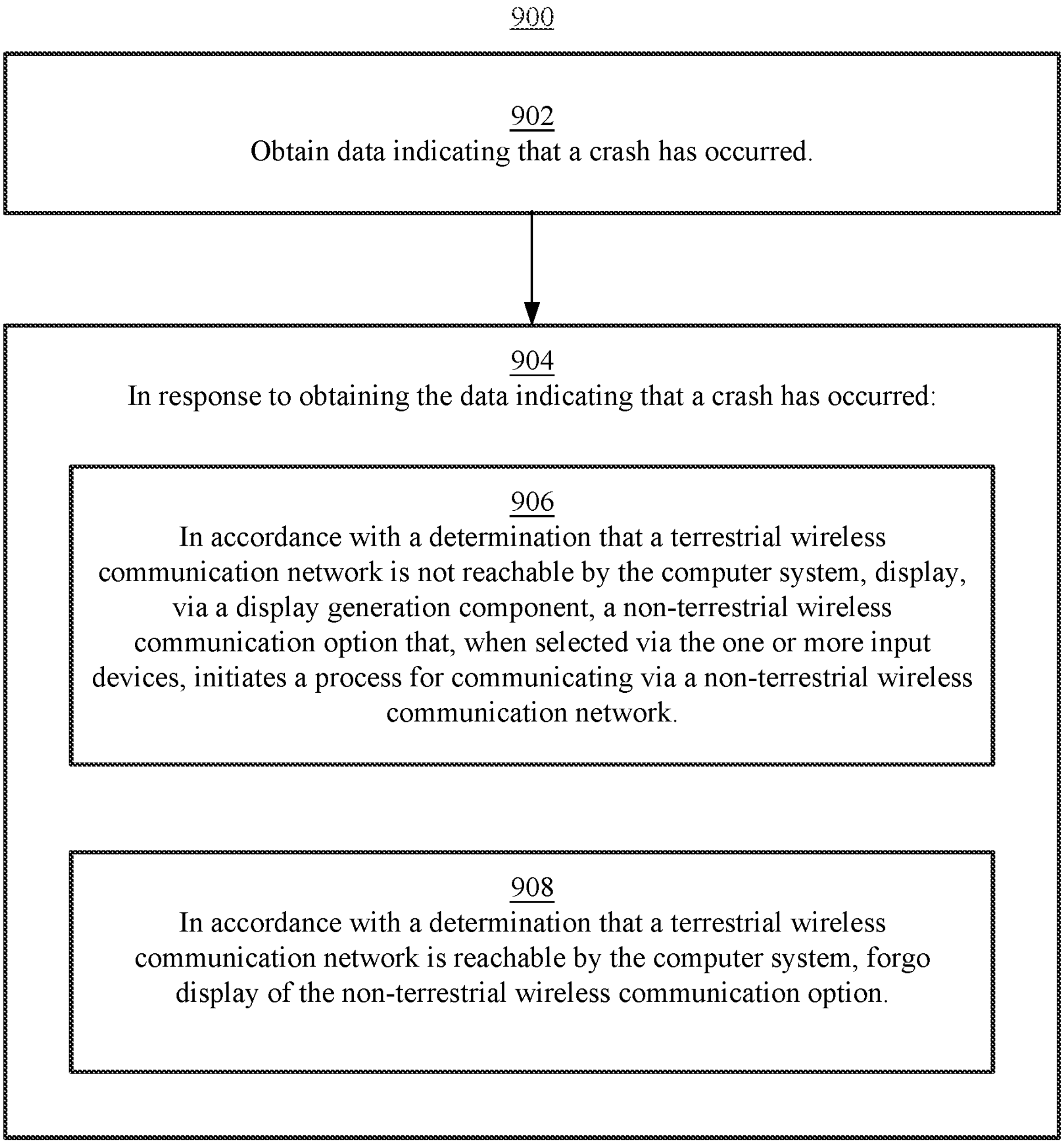
FIG. 9 is a flow diagram illustrating method for sending a communication using an alternative communication network in the event of a crash in accordance with some embodiments.

FIGS. 8M and 8N illustrate exemplary user interfaces displayed by computer system 604*a* after a crash is detected and no terrestrial wireless communication network is available. In FIG. 8M, computer system 604*a* displays crash detection interface 612 when computer system 604*a* is attempting to call emergency services after a crash is detected (e.g., as described with reference to FIG. 6D). In response to a determination that no terrestrial wireless communication network is available, computer system 604*a* displays prompt 824.

Prompt 824 includes: crash detection indicator 824*a* (e.g., "Crash Detected"), which indicates that a crash has been detected; connection status indicator 824*b* (e.g., "No Connection"), which indicates that there is no connection; satellite communication indication 824*c* (e.g., "Your phone will attempt to text emergency services via satellite"), which indicates that computer system 604*b* will attempt to text emergency services via satellite; and instructions 824*d* (e.g., “Follow instructions on your phone”) which includes a prompt to follow instructions on computer system 604*b*.

FIG. 9 is a flow diagram illustrating a method for sending a communication via an alternative communication network in the event of a crash using a computer system in accordance with some embodiments. Method 900 is performed at a computer system (e.g., 100, 300, 500, 604*a*, 604*b* a smartphone, a smartwatch, a vehicle display system, a vehicle information system, a vehicle infotainment system, a tablet computer, a desktop computer, a laptop computer, and/or a head-mounted device (e.g., a head-mounted augmented reality and/or extended reality device)) that is in communication with (e.g., includes and/or is connected to) a display generation component (e.g., 606*a*, 606*b*, a display, a touch-sensitive display, a monitor, a display controller, a touch-sensitive display system, a projector, a holographic display, and/or a head-mounted display system) and one or more input devices (e.g., 606*a*, 606*b*, a touch-sensitive surface, a keyboard, a mouse, a trackpad, a joystick, a remote control, a microphone, one or more optical sensors for detecting gestures, one or more capacitive sensors for detecting hover inputs, an accelerometer, a gyroscope, and/or an inertial measurement unit). Some operations in method 900 are, optionally, combined, the orders of some operations are, optionally, changed, and some operations are, optionally, omitted.

As described below, method 900 provides an intuitive way for sending a communication using an alternative communication network in the event of a crash. The method reduces the cognitive burden on a user for sending a communication using an alternative communication network in the event of a crash, thereby creating a more efficient human-machine interface. For battery-operated computing devices, enabling a user to send a communication using an alternative communication network in the event of a crash faster and more efficiently conserves power and increases the time between battery charges.

The computer system obtains (902) (e.g., receives or detects) data indicating that a crash (e.g., a crash, accident, and/or impact involving a vehicle such as, for example, a car, truck, motorcycle, scooter, bus, bike, boat, train, plane, wheelchair, golf cart, or all-terrain vehicle (ATV)) has occurred. In some embodiments, obtaining the data indicating that a crash has occurred includes detecting a crash and/or determining that a crash has occurred (e.g., based on detected motion, parameters, and/or conditions). In some embodiments, detecting a crash includes detecting (e.g., via one or more sensors, such as a motion sensor, accelerometer, gyroscope, inertial measurement unit, biometric sensor, and/or microphone) motion (e.g., linear and/or angular velocity and/or linear and/or angular acceleration), sound, biometric parameters (e.g., blood pressure, blood oxygen level, pulse, and/or heart rate), and/or other parameters or conditions. In some embodiments, determining that a crash has occurred includes determining that detected parameters or conditions satisfy a set of crash criteria (e.g., a motion threshold, a motion profile, a velocity threshold, a velocity profile, an acceleration threshold, an acceleration profile, a blood pressure threshold, a blood oxygen threshold, a pulse threshold, a heart rate threshold, a sound profile, a sound amplitude threshold, a sound frequency, and/or a sound frequency range). In some embodiments, the computer system detects the crash (e.g., using sensors of the computer system; the crash is detected by the computer system). In some embodiments, the computer system determines that a crash has occurred. In some embodiments, one or more external devices (e.g., one or more remote sensors, servers, and/or computer systems) that are not part of the computer system (e.g., one or more remote devices) detect a crash and/or determine that a crash has occurred. In some embodiments, one or more external devices that detect a crash and/or determine that a crash has occurred send data indicating that a crash has occurred to the computer system and/or to a remote server. In some embodiments, obtaining data indicating that a crash has occurred includes receiving data indicating that a crash has occurred (e.g., from a remote server and/or from one or more remote devices that detected and/or determined that a crash has occurred). In some embodiments, the computer system is not capable of detecting a crash and/or determining that a crash has occurred. In some embodiments, the computer system is in communication (e.g., wired communication, wireless communication, Bluetooth communication, near-field communication, and/or Wi-Fi communication) with an external computer system (e.g., a smartphone, a smartwatch, a tablet computer, one or more sensors of a vehicle, and/or a computer system of a vehicle) that is capable of detecting a crash and/or determining that a crash has occurred. In some embodiments, the computer system obtains (e.g., receives or retrieves) data indicating that a crash has occurred from the external computer system.

In response (904) to obtaining the data indicating that a crash has occurred: in accordance with a determination that a terrestrial wireless communication network (e.g., a cellular network) is not reachable by the computer system (e.g., a terrestrial wireless communication network is not available to the computer system, the computer system is not in communication with a terrestrial wireless communication network, the computer system is not connected or is unable to connect to a terrestrial wireless communication network, the computer system is not receiving a signal from a terrestrial wireless communication network that satisfies strength and/or consistency criteria for performing communication, and/or there is no terrestrial wireless communication network via which the computer system can currently perform communication either because there is no terrestrial wireless communication network with which the computer system can connect or via which the computer system is authorized to communicate), the computer system displays (906), via the display generation component, a non-terrestrial wireless communication option (e.g., 802, a selectable option, an icon, an affordance, a button, and/or a user-interactive graphical user interface object) that, when selected via the one or more input devices, initiates a process (e.g., the process described in FIGS. 8C-8L) for communicating via a non-terrestrial wireless communication network (e.g., via one or more satellites, a satellite communication network, a low-bandwidth communication network, and/or a communication protocol that does not require cellular service and/or a terrestrial wireless communication network); and in accordance with a determination that a terrestrial wireless communication network (e.g., a cellular network) is reachable by the computer system (e.g., a terrestrial wireless communication network is available to the computer system, the computer system is in communication with a terrestrial wireless communication network, the computer system is connected or is able to connect to a terrestrial wireless communication network, the computer system is receiving a signal from a terrestrial wireless communication network that satisfies strength and/or consistency criteria for performing communication, and/or there is a terrestrial wireless communication network via which the computer system can currently perform communication), the computer system forgoes (908) display of the non-terrestrial wireless communication option. Displaying the non-terrestrial wireless communication option based on whether or not a terrestrial wireless communication network is reachable by the computer system informs the user that an alternative communication network is available even when a terrestrial wireless communication network is not available, enables the user to quickly and efficiently initiate communication via the non-terrestrial wireless communication network, and avoids displaying the option when unnecessary, which provides improved feedback to the user, reduces the number of inputs needed to perform an operation, provides additional control options without cluttering the user interface with additional displayed controls, and performs an operation when a set of conditions has been met without requiring further user input.

In some embodiments, communicating via a non-terrestrial wireless communication network includes a phone call, text message, email, audio message, video message, and/or video conference. In some embodiments, the communication is a live or real-time (e.g., full duplex real-time) communication. In some embodiments, the terrestrial wireless communication network is a cellular network associated with the computer system (e.g., provided by a cellular service provider associated with the computer system and/or a user associated with the computer system) or another cellular network (e.g., provided by another cellular service provider). In some embodiments, for a call to a designated entity (e.g., a call to an emergency service or emergency contact), the computer system can use a network provided by a network provider other than a provider associated with the computer system. In some embodiments, in response to obtaining the data indicating that a crash has occurred and in accordance with a determination that a terrestrial wireless communication network is reachable by the computer system, the computer system displays a call option (e.g., 626*c*) that, when selected, initiates a process to call a predetermined number via terrestrial wireless communication, without displaying the non-terrestrial wireless communication option. In some embodiments, the call option includes a selectable call option, an icon, a button, an affordance, and/or a user-interactive graphical user interface object. In some embodiments, the computer system initiates display of the call option in response to obtaining the data indicating that a crash has occurred and in accordance with a determination that a terrestrial wireless communication network is reachable by the computer system (e.g., the call option is not provided, is not displayed, and/or is not available prior to obtaining the data indicating that a crash has occurred). In some embodiments, the call option includes (e.g., is) a graphical object that moves (e.g., slides) in accordance with movement of an input (e.g., a swipe or touch and drag input). In some embodiments, selection of the call option requires moving (e.g., on a display) the graphical object by a predetermined amount and/or to a predetermined location (e.g., from a first position, such a first location and/or first orientation, to a second position, such as a predefined location and/or a predefined orientation). In some embodiments, selection of the call option requires moving the graphical object from a first position (such as a first side, left side, top side, or upper side) on a predefined region or path to a second position (such as an opposite side, right side, bottom side, or lower side) of the predefined region or path. In some embodiments, in response to detecting selection of the call option, the computer system initiates a call to the predetermined number immediately (e.g., without a predetermined delay and/or countdown) and/or automatically without requiring further input (e.g., without requiring confirmation). In some embodiments, in response to detecting selection of the call option, the computer system initiates a call to the predetermined number and displays a call user interface (e.g., without displaying an intermediate or intervening user interface).

In some embodiments, in response to obtaining the data indicating that a crash has occurred, and before displaying the non-terrestrial wireless communication option, the computer system attempts to initiate a call (e.g., as described in FIG. 8A) to a designated entity (e.g., a predetermined entity, a predetermined number, an emergency service, an emergency number, or an emergency contact). Examples of numbers associated with an emergency service include 911 in the United States, 999 in the United Kingdom, 112 in Europe, 110 and/or 119 in Japan, and 000 in Australia. Attempting to initiate a call to a designated entity in response to obtaining the data indicating that a crash has occurred and before displaying the non-terrestrial wireless communication option enables the computer system to attempt using a communication method that uses less energy, is quicker, and requires fewer user inputs than communication via the non-terrestrial wireless communication network, which reduces the number of inputs needed to perform an operation, reduces energy consumption, and saves battery life.

In some embodiments, after initiating display of the non-terrestrial wireless communication option: in accordance with a determination that a threshold amount of time has elapsed without detecting selection of the non-terrestrial wireless communication option and that the non-terrestrial wireless communication network is reachable by the computer system, the computer system sends (e.g., the computer system automatically sends, without detecting user input), via the non-terrestrial wireless communication network, a communication (e.g., a text and/or audio communication) to the designated entity (e.g., as described with reference to FIG. 8C), wherein the text communication includes information related to the crash (e.g., location of the crash, time of the crash, that the crash occurred, and/or people involved in the crash). Sending a communication to a designated entity via the non-terrestrial wireless communication network in accordance with a determination that a threshold amount of time has elapsed enables the computer system to automatically send a communication after a crash without requiring user input, which reduces the number of inputs needed to perform an operation and performs an operation when a set of conditions has been met without requiring further user input. In some embodiments, after sending the communication to the designated entity, the computer system displays a view-message option (e.g., 808); the computer system detects an input (e.g., 825*b*) corresponding to selection of the view-message option; and in response to detecting the input corresponding to selection of the view-message option, the computer system displays the communication (e.g., 818*a*) to the designated entity. In some embodiments, displaying the communication to the designated entity includes displaying a user interface of a messaging application (e.g., a text messaging application) that includes a message conversation between a user of the computer system and the designated entity (including the communication to the designated entity, any responses from the designated entity, and any additional messages from the user of the computer system to the designated entity). In some embodiments, the user interface of the messaging application includes selectable elements (e.g., a keyboard and/or send button) for sending additional messages to the designated entity. In some embodiments, after sending the communication to the designated entity, the computer system displays a selectable option that, when selected, causes the computer system to attempt (or re-attempt) to initiate a call with the designated entity. Displaying a selectable option to display the communication to the designated entity provides feedback to the user that the communication was sent and provides a quick and efficient method for displaying the communication, to which provides improved feedback to the user and reduces the number of inputs needed to perform an operation, and provides additional control options without cluttering the user interface with additional displayed controls.

In some embodiments, after initiating display of the non-terrestrial wireless communication option: in accordance with a determination that a threshold amount of time has elapsed without detecting selection of the non-terrestrial wireless communication option and that the non-terrestrial wireless communication network is not reachable by the computer system, the computer system displays an option (e.g., 626*c*) that, when selected, causes the computer system to attempt (e.g., re-attempt) to initiate a call to the designated entity. In some embodiments, after initiating display of the non-terrestrial wireless communication option: in accordance with a determination that a threshold amount of time has elapsed without detecting selection of the non-terrestrial wireless communication option and that the non-terrestrial wireless communication network is not reachable by the computer system, the computer system displays an indication that the designated entity has not been contacted (e.g., a communication has not been sent to the designated entity). Displaying an option to initiate a call to a designated entity in accordance with a determination that a threshold amount of time has elapsed without detecting selection of the non-terrestrial wireless communication option enables the computer system to automatically call the designated entity without requiring user input after a crash, which reduces the number of inputs needed to perform an operation and performs an operation when a set of conditions has been met without requiring further user input.

In some embodiments, in accordance with a determination that a terrestrial wireless communication network (e.g., a cellular network) is not reachable by the computer system, the computer system causes display of (e.g., on the computer system and/or on an external computer system) an indication (e.g., 824*b*) that a terrestrial wireless communication network is not reachable by the computer system. In some embodiments, in response to obtaining the data indicating that a crash has occurred and in accordance with a determination that a terrestrial wireless communication network is not reachable (e.g., by the computer system or an external computer system in communication with the computer system), the computer system indicates that a crash has been detected, indicates that the external computer system will attempt to send a communication to a designated entity, and/or provides a prompt for a user to use the external computer system to communicate with the designated entity via a non-terrestrial wireless communication network. Displaying an indication that a terrestrial wireless communication network is not reachable by the computer system in accordance with a determination that a terrestrial wireless communication network is not reachable by the computer system informs the user that the terrestrial wireless communication network is not reachable and enables the user to use the computer system more efficiently by not attempting to perform communication via the terrestrial wireless communication network when it is not reachable, which provides improved feedback to the user, reduces the number of inputs needed to perform an operation, and performs an operation when a set of conditions has been met without requiring further user input.

In some embodiments, while displaying the non-terrestrial wireless communication option (e.g., 802), the computer system detects an input (e.g., 825*a*) corresponding to selection of the non-terrestrial wireless communication option; and in response to detecting the input corresponding to selection of the non-terrestrial wireless communication option (and, optionally, in accordance with a determination that the computer system is connected to the non-terrestrial wireless communication network), the computer system sends (e.g., the computer system automatically sends, without detecting user input), via the non-terrestrial wireless communication network, a communication (e.g., a text and/or audio communication) to the designated entity, wherein the communication includes information related to the crash (e.g., location of the crash, time of the crash, that the crash occurred, and/or people involved in the crash). Sending a communication to a designated entity with information related to the crash in response to detecting selection of the non-terrestrial wireless communication option enables the user to quickly and efficiently communicate after a crash when a terrestrial wireless communication network is not reachable, which reduces the number of inputs needed to perform an operation and saves battery life.

In some embodiments, while displaying the non-terrestrial wireless communication option (e.g., 802), the computer system detects an input (e.g., 825*a*) corresponding to selection of the non-terrestrial wireless communication option; in response to detecting the input corresponding to selection of the non-terrestrial wireless communication option (and, optionally, in accordance with a determination that the computer system is connected to the non-terrestrial wireless communication network), the computer system displays a set of selectable message-content options (e.g., 812*b* and/or 814*b*); the computer system detects one or more user inputs (e.g., 825*d* and/or 825*f*) that correspond to selection of one or more message-content options of the set of selectable content options; and after detecting the one or more inputs (e.g., in response to a request to send a communication via the non-terrestrial wireless communication network), the computer system sends a communication via the non-terrestrial wireless communication network that includes content corresponding to the selected one or more message-content options. Displaying a set of selectable options for generating a communication provides a quick and efficient method for a user to create a message after a crash and enables the computer system to create a low-bandwidth communication that requires less bandwidth and/or energy to send, which provides improved feedback to the user, reduces the number of inputs needed to perform an operation, and saves battery life.

In some embodiments, any of the selections, requests, and/or inputs described herein (e.g., selections 625*a*-625*u* and/or selections 825*a*-825*k*) is or includes a touch input (e.g., a tap gesture and/or a swipe gesture). In some embodiments, any of the selections, requests, and/or inputs described herein (e.g., selections 625*a*-625*u* and/or selections 825*a*-825*k*) is or includes a voice input (e.g., a voice command to select a user interface element or to activate a feature or perform a function, such as a feature or function associated with a user interface element). In some embodiments, any of the selections, requests, and/or inputs described herein (e.g., selections 625*a*-625*u* and/or selections 825*a*-825*k*) is or includes a gesture (e.g., an air gesture to select a user interface element or to activate a feature or perform a function, such as a feature or function associated with a user interface element). In some embodiments, any of the selections, requests, and/or inputs described herein (e.g., selections 625*a*-625*u* and/or selections 825*a*-825*k*) is or includes activation (e.g., a press, a rotation, and/or a movement) of a hardware device (e.g., a button, a rotatable input mechanism, a rotatable and depressible input mechanism, a mouse button, a button of a remote control, and/or a joystick). In some embodiments, any of the user interface elements described as being selected herein (e.g., an icon, affordance, button, and/or selectable option) is selected by activating a hardware device while the user interface element is in focus (e.g., highlighted, bolded, outlined, visually distinguished from other user interface elements, and/or located at or near a cursor).

Note that details of the processes described above with respect to method 900 (e.g., FIG. 9) are also applicable in an analogous manner to the methods described above. For example, method 700 optionally includes one or more of the characteristics of the various methods described above with reference to method 900. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of crash detection data or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, social network IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of crash detection, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, crash detection data can be selected and delivered to users by inferring preferences based on non-personal information data or a bare minimum amount of personal information, such as the content being requested by the device associated with a user, other non-personal information available to the crash detection function, or publicly available information.

What is claimed is:

1. A computer system configured to communicate with a display generation component and one or more input devices, comprising:

one or more processors; and memory storing one or more programs configured to be executed by the one or more processors, the one or more programs including instructions for:

detecting, via the one or more input devices, a user input corresponding to a selection of one or more designated contacts to be contacted in an emergency;

subsequent to detecting the user input corresponding to the selection of the one or more designated contacts, obtaining data indicating that a crash has occurred;

in response to obtaining the data indicating that the crash has occurred, displaying, via the display generation component, a call option;

while displaying the call option:

in accordance with a determination that the call option has been selected via the one or more input devices, initiating a first process to call a predetermined number associated with the call option; and in accordance with a determination that the call option has not been selected after a first threshold amount of time has elapsed, initiating a second process to call the predetermined number associated with the call option after a second threshold amount of time has elapsed; and in response to a determination that the call to the predetermined number has ended, sending a communication to the one or more user designated contacts.

2. The computer system of claim 1, the one or more programs further including instructions for:

after obtaining the data indicating that a crash has occurred, providing an indication that a crash has been detected.

3. The computer system of claim 1, wherein the second threshold amount of time is less than the first threshold amount of time.

4. The computer system of claim 1, the one or more programs further including instructions for:

after initiating a call to the predetermined number associated with the call option without detecting selection of the call option:

after establishing a call with the predetermined number in response to initiating a call to the predetermined number associated with the call option without detecting selection of the call option, outputting an audio message that indicates that a crash has been detected.

5. The computer system of claim 1, the one or more programs further including instructions for:

in response to a determination that a call to the predetermined number has ended, displaying an indication that a crash was detected.

6. The computer system of claim 5, wherein displaying the indication that a crash was detected includes displaying an indication of a time at which the crash was detected.

7. The computer system of claim 1, the one or more programs further including instructions for:

after obtaining the data indicating that a crash has occurred:

in response to a determination that a call to the predetermined number has ended, displaying a second call option that, when selected, causes the computer system to initiate a process to call the predetermined number.

8. The computer system of claim 1, the one or more programs further including instructions for:

after obtaining the data indicating that a crash has occurred:

in response to a determination that a call to the predetermined number has ended, displaying a medical ID option that, when selected, causes the computer system to display information of a user who is associated with the computer system.

9. The computer system of claim 1, the one or more programs further including instructions for:

after obtaining the data indicating that a crash has occurred, disabling a voice assistant functionality on the computer system.

10. The computer system of claim 1, the one or more programs further including instructions for:

after initiating a call with the predetermined number, detecting a request to end the call with the predetermined number; and in response to detecting the request to end the call with the predetermined number, displaying, without ending the call with the predetermined number, an option to confirm the request to end the call with the predetermined number that, when selected, causes the computer system to end the call with the predetermined number.

11. The computer system of claim 1, the one or more programs further including instructions for:

displaying an enable-crash-detection option that, when selected, sets a state of a capability to display the call option in response to obtaining data indicating that a crash has occurred.

12. The computer system of claim 11, the one or more programs further including instructions for:

displaying a user interface of a health application that includes information associated with health of a user, wherein displaying the enable-crash-detection option includes displaying the enable-crash-detection option in the user interface of the health application.

13. The computer system of claim 11, wherein the enable-crash-detection option, when selected, enables a capability of the computer system to display the call option in response to obtaining data indicating that a crash has occurred without enabling a capability of a second computer system to display the call option in response to obtaining data indicating that a crash has occurred.

14. The computer system of claim 1, the one or more programs further including instructions for:

after obtaining data indicating that a crash has occurred, providing data associated with the crash to an application.

15. The computer system of claim 14, wherein providing data associated with the crash to the application includes providing data associated with the crash to a first application without providing data associated with the crash to a second application that is different from the first application, wherein the first application and the second application have been authorized to be provided with data associated with a crash after a crash is determine to have occurred.

16. The computer system of claim 14, the one or more programs further including instructions for:

displaying a sharing option that, when selected, sets a state of a parameter for providing data associated with the crash to the application; and after obtaining the data indicating that a crash has occurred:

in accordance with a determination that the state of the parameter is a first state, providing data associated with the crash to the application; and in accordance with a determination that the state of the parameter is a second state different from the first state, forgoing providing data associated with the crash to the application.

17. A non-transitory computer-readable storage medium storing one or more programs configured to be executed by one or more processors of a computer system that is in communication with a display generation component and one or more input devices, the one or more programs including instructions for:

detecting, via the one or more input devices, a user input corresponding to a selection of one or more designated contacts to be contacted in an emergency;

subsequent to detecting the user input corresponding to the selection of the one or more designated contacts, obtaining data indicating that a crash has occurred;

in response to obtaining the data indicating that the crash has occurred, displaying, via the display generation component, a call option;

while displaying the call option:

in accordance with a determination that the call option has been selected via the one or more input devices, initiating a first process to call a predetermined number associated with the call option; and in accordance with a determination that the call option has not been selected after a first threshold amount of time has elapsed, initiating a second process to call the predetermined number associated with the call option after a second threshold amount of time has elapsed; and in response to a determination that the call to the predetermined number has ended, sending a communication to the one or more user designated contacts.

18. The non-transitory computer-readable storage medium of claim 17, the one or more programs further including instructions for:

after obtaining the data indicating that a crash has occurred, providing an indication that a crash has been detected.

19. The non-transitory computer-readable storage medium of claim 17, wherein the second threshold amount of time is less than the first threshold amount of time.

20. The non-transitory computer-readable storage medium of claim 17, the one or more programs further including instructions for:

after initiating a call to the predetermined number associated with the call option without detecting selection of the call option:

after establishing a call with the predetermined number in response to initiating a call to the predetermined number associated with the call option without detecting selection of the call option, outputting an audio message that indicates that a crash has been detected.

21. The non-transitory computer-readable storage medium of claim 17, the one or more programs further including instructions for:

in response to a determination that a call to the predetermined number has ended, displaying an indication that a crash was detected.

22. The non-transitory computer-readable storage medium of claim 21, wherein displaying the indication that a crash was detected includes displaying an indication of a time at which the crash was detected.

23. The non-transitory computer-readable storage medium of claim 17, the one or more programs further including instructions for:

after obtaining the data indicating that a crash has occurred:

in response to a determination that a call to the predetermined number has ended, displaying a second call option that, when selected, causes the computer system to initiate a process to call the predetermined number.

24. The non-transitory computer-readable storage medium of claim 17, the one or more programs further including instructions for:

after obtaining the data indicating that a crash has occurred:

in response to a determination that a call to the predetermined number has ended, displaying a medical ID option that, when selected, causes the computer system to display information of a user who is associated with the computer system.

25. The non-transitory computer-readable storage medium of claim 17, the one or more programs further including instructions for:

after obtaining the data indicating that a crash has occurred, disabling a voice assistant functionality on the computer system.

26. The non-transitory computer-readable storage medium of claim 17, the one or more programs further including instructions for:

after initiating a call with the predetermined number, detecting a request to end the call with the predetermined number; and in response to detecting the request to end the call with the predetermined number, displaying, without ending the call with the predetermined number, an option to confirm the request to end the call with the predetermined number that, when selected, causes the computer system to end the call with the predetermined number.

27. The non-transitory computer-readable storage medium of claim 17, the one or more programs further including instructions for:

displaying an enable-crash-detection option that, when selected, sets a state of a capability to display the call option in response to obtaining data indicating that a crash has occurred.

28. The non-transitory computer-readable storage medium of claim 27, the one or more programs further including instructions for:

displaying a user interface of a health application that includes information associated with health of a user, wherein displaying the enable-crash-detection option includes displaying the enable-crash-detection option in the user interface of the health application.

29. The non-transitory computer-readable storage medium of claim 27, wherein the enable-crash-detection option, when selected, enables a capability of the computer system to display the call option in response to obtaining data indicating that a crash has occurred without enabling a capability of a second computer system to display the call option in response to obtaining data indicating that a crash has occurred.

30. The non-transitory computer-readable storage medium of claim 17, the one or more programs further including instructions for:

after obtaining data indicating that a crash has occurred, providing data associated with the crash to an application.

31. The non-transitory computer-readable storage medium of claim 30, wherein providing data associated with the crash to the application includes providing data associated with the crash to a first application without providing data associated with the crash to a second application that is different from the first application, wherein the first application and the second application have been authorized to be provided with data associated with a crash after a crash is determine to have occurred.

32. The non-transitory computer-readable storage medium of claim 30, the one or more programs further including instructions for:

displaying a sharing option that, when selected, sets a state of a parameter for providing data associated with the crash to the application; and after obtaining the data indicating that a crash has occurred:

in accordance with a determination that the state of the parameter is a first state, providing data associated with the crash to the application; and in accordance with a determination that the state of the parameter is a second state different from the first state, forgoing providing data associated with the crash to the application.

33. A method, comprising:

at a computer system that is in communication with a display generation component and one or more input devices:

detecting, via the one or more input devices, a user input corresponding to a selection of one or more designated contacts to be contacted in an emergency;

subsequent to detecting the user input corresponding to the selection of the one or more designated contacts, obtaining data indicating that a crash has occurred;

in response to obtaining the data indicating that the crash has occurred, displaying, via the display generation component, a call option;

while displaying the call option:

in accordance with a determination that the call option has been selected via the one or more input devices, initiating a first process to call a predetermined number associated with the call option; and in accordance with a determination that the call option has not been selected after a first threshold amount of time has elapsed, initiating a second process to call the predetermined number associated with the call option after a second threshold amount of time has elapsed; and in response to a determination that the call to the predetermined number has ended, sending a communication to the one or more user designated contacts.

34. The method of claim 33, further comprising:

after obtaining the data indicating that a crash has occurred, providing an indication that a crash has been detected.

35. The method of claim 33, wherein the second threshold amount of time is less than the first threshold amount of time.

36. The method of claim 33, further comprising:

after initiating a call to the predetermined number associated with the call option without detecting selection of the call option:

after establishing a call with the predetermined number in response to initiating a call to the predetermined number associated with the call option without detecting selection of the call option, outputting an audio message that indicates that a crash has been detected.

37. The method of claim 33, further comprising:

in response to a determination that a call to the predetermined number has ended, displaying an indication that a crash was detected.

38. The method of claim 37, wherein displaying the indication that a crash was detected includes displaying an indication of a time at which the crash was detected.

39. The method of claim 33, further comprising:

after obtaining the data indicating that a crash has occurred:

in response to a determination that a call to the predetermined number has ended, displaying a second call option that, when selected, causes the computer system to initiate a process to call the predetermined number.

40. The method of claim 33, further comprising:

after obtaining the data indicating that a crash has occurred:

in response to a determination that a call to the predetermined number has ended, displaying a medical ID option that, when selected, causes the computer system to display information of a user who is associated with the computer system.

41. The method of claim 33, further comprising:

after obtaining the data indicating that a crash has occurred, disabling a voice assistant functionality on the computer system.

42. The method of claim 33, further comprising:

after initiating a call with the predetermined number, detecting a request to end the call with the predetermined number; and in response to detecting the request to end the call with the predetermined number, displaying, without ending the call with the predetermined number, an option to confirm the request to end the call with the predetermined number that, when selected, causes the computer system to end the call with the predetermined number.

43. The method of claim 33, further comprising:

displaying an enable-crash-detection option that, when selected, sets a state of a capability to display the call option in response to obtaining data indicating that a crash has occurred.

44. The method of claim 43, further comprising:

displaying a user interface of a health application that includes information associated with health of a user, wherein displaying the enable-crash-detection option includes displaying the enable-crash-detection option in the user interface of the health application.

45. The method of claim 43, wherein the enable-crash-detection option, when selected, enables a capability of the computer system to display the call option in response to obtaining data indicating that a crash has occurred without enabling a capability of a second computer system to display the call option in response to obtaining data indicating that a crash has occurred.

46. The method of claim 33, further comprising:

after obtaining data indicating that a crash has occurred, providing data associated with the crash to an application.

47. The method of claim 46, wherein providing data associated with the crash to the application includes providing data associated with the crash to a first application without providing data associated with the crash to a second application that is different from the first application, wherein the first application and the second application have been authorized to be provided with data associated with a crash after a crash is determine to have occurred.

48. The method of claim 46, further comprising:

displaying a sharing option that, when selected, sets a state of a parameter for providing data associated with the crash to the application; and after obtaining the data indicating that a crash has occurred:

in accordance with a determination that the state of the parameter is a first state, providing data associated with the crash to the application; and in accordance with a determination that the state of the parameter is a second state different from the first state, forgoing providing data associated with the crash to the application.

* * * * *